US007873541B1

(12) United States Patent
Klar et al.

(10) Patent No.: US 7,873,541 B1
(45) Date of Patent: Jan. 18, 2011

(54) SYSTEM AND METHOD FOR AGGREGATING ADVERTISING PRICING DATA

(75) Inventors: Neil Klar, Katonah, NY (US);
Lawrence Fried, Demarest, NJ (US);
Donald J. Holtz, Fairfield, CT (US);
Lauren Bush, West Haven, CT (US)

(73) Assignee: SQAD, Inc., Tarrytown, NY (US)

( * ) Notice: Subject to any disclaimer, the term of this patent is extended or adjusted under 35 U.S.C. 154(b) by 1377 days.

(21) Appl. No.: 11/056,601

(22) Filed: Feb. 11, 2005

Related U.S. Application Data

(60) Provisional application No. 60/543,899, filed on Feb. 11, 2004.

(51) Int. Cl.
*G06Q 30/00* (2006.01)
*G06Q 20/00* (2006.01)
(52) U.S. Cl. .................. 705/20; 705/335; 705/14.1; 705/14.36; 705/10
(58) Field of Classification Search .................. 705/10, 705/14, 14.1, 14.36, 20, 335, FOR. 100
See application file for complete search history.

(56) References Cited

U.S. PATENT DOCUMENTS

| 6,092,017 | A | * | 7/2000 | Ishida et al. ............... 701/106 |
| 7,010,494 | B2 | * | 3/2006 | Etzioni et al. .............. 705/10 |
| 7,363,246 | B1 | * | 4/2008 | Van Horn et al. ........... 705/26 |
| 7,370,002 | B2 | * | 5/2008 | Heckerman et al. ......... 705/10 |
| 2002/0052882 | A1 | * | 5/2002 | Taylor ..................... 707/104.1 |
| 2002/0053078 | A1 | * | 5/2002 | Holtz et al. ................ 725/14 |
| 2002/0072975 | A1 | * | 6/2002 | Steele et al. ............... 705/14 |
| 2003/0154142 | A1 | * | 8/2003 | Ginsburg et al. ........... 705/28 |
| 2004/0024720 | A1 | * | 2/2004 | Fairweather ................ 706/46 |
| 2004/0122730 | A1 | * | 6/2004 | Tucciarone et al. ......... 705/14 |

\* cited by examiner

*Primary Examiner*—John G Weiss
*Assistant Examiner*—Adam Chornesky
(74) *Attorney, Agent, or Firm*—Stroock & Stroock & Lavan LLP

(57) ABSTRACT

The present invention relates to a method and system for aggregating advertising pricing data and providing that data to one or more clients. This data may be provided to the client in the form of various reports that allow a client to gauge the advertisement market more accurately and make a better informed decision when deciding to purchase advertisements. In one embodiment, a client is also able to access forecasting reports that predict the future of the advertisement market so that the client can more accurately make a decision about purchasing advertisement slots in advance.

31 Claims, 38 Drawing Sheets

| SOURCE_1 | SOURCE_2 | SOURCE_3 |
|---|---|---|
| EST_CD | EST_CD | EST_CD |
| NETWORK_CD | NETWORK_CD | NETWORK_CD |
| PACKAGE_CD | PACKAGE_CD | PACKAGE_CD |
| PROGRAM_CD | PROGRAM_CD | PROGRAM_CD |
| DAYPART_CD | DAYPART_CD | DAYPART_CD |
| UNIT_ID | UNIT_ID | UNIT_ID |
| BROADCAST_DT | BROADCAST_DT | BROADCAST_DT |
| ROTATION_CD | ROTATION_CD | ROTATION_CD |
| START_TIME | START_TIME | START_TIME |
| END_TIME | END_TIME | END_TIME |
| UNIT_LENGTH | UNIT_LENGTH | UNIT_LENGTH |
| BUY_TYPE_CD | BUY_TYPE_CD | BUY_TYPE_CD |
| UNIT_STATUS | UNIT_STATUS | UNIT_STATUS |
| UNITS | UNITS | UNITS |
| UNIT_COST | UNIT_COST | UNIT_COST |
| HH_GRPS_NOG | DEMO_CD | HH_GRPS_NOG |
| HH_GRPS | IMPRESS | HH_GRPS |
| AD1217_GRPS_NOG | RATING | AD1217_GRPS_NOG |
| AD1217_GRPS |  | AD1217_GRPS |
| AD1824_GRPS_NOG |  | AD1824_GRPS_NOG |
| AD1824_GRPS |  | AD1824_GRPS |
| AD1834_GRPS_NOG |  | AD1834_GRPS_NOG |
| AD1834_GRPS |  | AD1834_GRPS |
| AD1849_GRPS_NOG |  | AD1849_GRPS_NOG |
| AD1849_GRPS |  | AD1849_GRPS |
| AD2554_GRPS_NOG |  | AD2454_GRPS_NOG |
| AD2554_GRPS |  | AD2454_GRPS |
| WM1824_GRPS_NOG |  | WM1824_GRPS_NOG |
| WM1824_GRPS |  | WM1824_GRPS |
| WM1834_GRPS_NOG |  | WM1834_GRPS_NOG |
| WM1834_GRPS |  | WM1834_GRPS |
| WM1849_GRPS_NOG |  | WM1849_GRPS_NOG |
| WM1849_GRPS |  | WM1849_GRPS |
| WM2554_GRPS_NOG |  | WM2554_GRPS_NOG |
| WM2554_GRPS |  | WM2554_GRPS |
| AD18+_GRPS_NOG |  | AD18+_GRPS_NOG |
| AD18+_GRPS |  | AD18+_GRPS |
| WM18+_GRPS_NOG |  | WM18+_GRPS_NOG |
| WM18+_GRPS |  | WM18+_GRPS |

Fig. 5A

SOURCE_4
MEDIA_CODE
BUY_DATE
EST_CODE
PKG_NME
PROGRAM_NM
NETWORK_NM
DAY_PART
LENGTH
UNIT_NUM
DAY_TIME
ROTATION_CD
BEGIN_TIME
END_TIME
TYPE_CODES
BUY_TYPE_CD
UNIT_ID
UNITS
UNIT_COST
HOMES_IMPRESS
W1849_IMPRESS
M1824_IMPRESS
M1849_IMPRESS
M2554_IMPRESS
M3554_IMPRESS
P2554_IMPRESS
P65PLUS IMPRESS

SOURCE_5
ESTIMATE_CD
NETWORK_CD
PACKAGE_CD
PROGRAM_CD
DAY_PART_CD
UNIT_ID
BROADCAST_DT
DAY_CD
ROTATION_CD
START_TIME
END_TIME
UNIT_LENGTH
BUY_TYPE_CD
UNIT_STATUS
UNITS
UNIT_COST
HH_IMPS
HH_GRPS
AD2554_IMPS
AD2554_GRPS

SOURCE_6
ESTIMATE_CD
NETWORK_CD
PACKAGE_CD
PROGRAM_CD
DAY_PART_CD
UNIT_ID
BROADCAST_DT
DAY_CD
ROTATION_CD
START_TIME
END_TIME
UNIT_LENGTH
BUY_TYPE_CD
UNIT_STATUS
UNITS
UNIT_COST

Fig. 5A
CONTINUED

| SOURCE_7 | SOURCE_8 | SOURCE_9 |
|---|---|---|
| ESTIMATE_CD | ESTIMATE_CD | ESTIMATE_CD |
| NETWORK_CD | NETWORK_CD | NETWORK_CD |
| PACKAGE_CD | PACKAGE_CD | PACKAGE_CD |
| PROGRAM_CD | PROGRAM_CD | PROGRAM_CD |
| DAY_PART_CD | DAY_PART_CD | DAY_PART_CD |
| UNIT_ID | UNIT_ID | UNIT_ID |
| BROADCAST_DT | BROADCAST_DT | BROADCAST_DT |
| DAY_CD | ROTATION_CD | DAY_CD |
| ROTATION_CD | START_TIME | ROTATION_CD |
| START_TIME | END_TIME | START_TIME |
| END_TIME | UNIT_LENGTH | END_TIME |
| UNIT_LENGTH | BUY_TYPE_CD | UNIT_LENGTH |
| BUY_TYPE_CD | UNIT_STATUS | BUY_TYPE_CD |
| UNIT_STATUS | UNITS | UNIT_STATUS |
| UNITS | UNIT_COST | UNITS |
| UNIT_COST | A2554_IMPS | UNIT_COST |
| A50PLUS_IMPS | A2554_GRPS | HH_IMPS |
| A50PLUS_GRPS | M2534_IMPS | HH_GRPS |
| W50PLUS_IMPS | M2534_GRPS | HH_NG_IMPS |
| W50PLUS_GRPS | | HH_NG_GRPS |
| W2554_IMPS | | M2554_IMPS |
| W2554_GRPS | | M2554_GRPS |
| | | M2554_NG_IMPS |
| | | M2554_NG_GRPS |
| | | W2554_IMPS |
| | | W2554_GRPS |
| | | W2554_NG_IMPS |
| | | W2554_NG_GRPS |

Fig. 5A
CONTINUED

| SOURCE_10 | SOURCE_11 | SOURCE_12 |
|---|---|---|
| EST_CD | UNIT_ID | UNIT_ID |
| NETWORK_CD | ESTIMATE | ESTIMATE |
| PACKAGE_CD | PACKAGE_CD | PACKAGE_CD |
| PROGRAM_CD | NETWORK_CD | NETWORK_CD |
| DAYPART_CD | PROGRAM_CD | PROGRAM_CD |
| UNIT_ID | DAY_PART_CD | DAY_PART_CD |
| BROADCAST_DT | UNIT_NUM | UNIT_NUM |
| ROTATION_CD | BROADCAST_DT | BROADCAST_DT |
| START_TIME | ROTATION_CD | ROTATION_CD |
| END_TIME | BEGIN_TIME | BEGIN_TIME |
| UNIT_LENGTH | END_TIME | END_TIME |
| BUY_TYPE_CD | LENGTH | LENGTH |
| UNIT_STATUS | UNITS | UNITS |
| UNITS | UNIT_COST | UNIT_COST |
| UNIT_COST | DEMO_CD1 | DEMO_CD1 |
| HH_GRPS_NOG | IMPRESS1 | RATING1 |
| HH_GRPS | DEMO_CD2 | DEMO_CD2 |
| AD1217_GRPS_NOG | IMPRESS2 | RATING2 |
| AD1217_GRPS | | |
| AD1824_GRPS_NOG | | |
| AD1824_GRPS | | |
| AD1834_GRPS_NOG | | |
| AD1834_GRPS | | |
| AD1849_GRPS_NOG | | |
| AD1849_GRPS | | |
| AD2554_GRPS_NOG | | |
| AD2554_GRPS | | |
| WM1824_GRPS_NOG | | |
| WM1824_GRPS | | |
| WM1834_GRPS_NOG | | |
| WM1834_GRPS | | |
| WM1849_GRPS_NOG | | |
| WM1849_GRPS | | |
| WM2554_GRPS_NOG | | |
| WM2554_GRPS | | |
| AD18+_GRPS_NOG | | |
| AD18+_GRPS | | |
| WM18+_GRPS_NOG | | |
| WM18+_GRPS | | |

Fig. 5A
CONTINUED

| SOURCE_13 | SOURCE_14 | SOURCE_15 |
|---|---|---|
| ESTIMATE_CD | ESTIMATE_CD | ESTIMATE_CD |
| NETWORK_CD | NETWORK_CD | NETWORK_CD |
| PACKAGE_CD | PACKAGE_CD | PACKAGE_CD |
| PROGRAM_CD | PROGRAM_CD | PROGRAM_CD |
| DAY_PART_CD | DAY_PART_CD | DAY_PART_CD |
| UNIT_ID | UNIT_ID | UNIT_ID |
| BROADCAST_DT | BROADCAST_DT | BROADCAST_DT |
| DAY_CD | DAY_CD | DAY_CD |
| ROTATION_CD | ROTATION_CD | ROTATION_CD |
| START_TIME | START_TIME | START_TIME |
| END_TIME | END_TIME | END_TIME |
| UNIT_LENGTH | UNIT_LENGTH | UNIT_LENGTH |
| BUY_TYPE_CD | BUY_TYPE_CD | BUY_TYPE_CD |
| UNIT_STATUS | UNIT_STATUS | UNIT_STATUS |
| UNITS | UNITS | UNITS |
| UNIT_COST | UNIT_COST | UNIT_COST |
| HH_IMPS_NOG | HH_IMPS_NOG | HH_IMPS_NOG |
| HH_GRPS_NOG | HH_GRPS_NOG | HH_GRPS_NOG |
| HH_IMPS | HH_IMPS | HH_IMPS |
| HH_GRPS | HH_GRPS | HH_GRPS |
| AD1849_IMPS_NOG | AD1834_IMPS_NOG | A1834_IMPS_NOG |
| AD1849_GRPS_NOG | AD1834_GRPS_NOG | A1834_GRPS_NOG |
| AD1849_IMPS | AD1834_IMPS | A1834_IMPS |
| AD1849_GRPS | AD1834_GRPS | A1834_GRPS |
| AD1834_IMPS_NOG | WM1849_IMPS_NOG | A1849_IMPS_NOG |
| AD1834_GRPS_NOG | WM1849_GRPS_NOG | A1849_GRPS_NOG |
| AD1834_IMPS | WM1849_IMPS | A1849_IMPS |
| AD1834_GRPS | WM1849_GRPS | A1849_GRPS |
| AD2134_IMPS_NOG | AD1849_IMPS_NOG | W1849_IMPS_NOG |
| AD2134_GRPS_NOG | AD1849_GRPS_NOG | W1849_GRPS_NOG |
| AD2134_IMPS | AD1849_IMPS | W1849_IMPS |
| AD2134_GRPS | AD1849_GRPS | W1849_GRPS |
| AD2554_IMPS_NOG | WM2554_IMPS_NOG | A35PLUS_IMPS_NOG |
| AD2554_GRPS_NOG | WM2554_GRPS_NOG | A35PLUS_GRPS_NOG |
| AD2554_IMPS | WM2554_IMPS | A35PLUS_IMPS |
| AD2554_GRPS | WM2554_GRPS | A35PLUS_GRPS |
| AD3554_IMPS_NOG | AD2554_IMPS_NOG | WM2554_IMPS_NOG |
| AD3554_GRPS_NOG | AD2554_GRPS_NOG | WM2554_GRPS_NOG |
| AD3554_IMPS | AD2554_IMPS | WM2554_IMPS |
| AD3554_GRPS | AD2554_GRPS | WM2554_GRPS |
| AD3564_IMPS_NOG | MN2554_IMPS_NOG | MN2554_IMPS_NOG |
| AD3564_GRPS_NOG | MN2554_GRPS_NOG | MN2554_GRPS_NOG |
| AD3564_IMPS | MN2554_IMPS | MN2554_IMPS |
| AD3564_GRPS | MN2554_GRPS | MN2554_GRPS |
| WM2554_IMPS_NOG | AD3564_IMPS_NOG | AD2554_IMPS_NOG |
| WM2554_GRPS_NOG | AD3564_GRPS_NOG | AD2554_GRPS_NOG |
| WM2554_IMPS | AD3564_IMPS | AD2554_IMPS |
| WM2554_GRPS | AD3564_GRPS | AD2554_GRPS |
| | | T1217_IMPS_NOG |
| | | T1217_GRPS_NOG |
| | | T1217_IMPS |
| | | T1217_GRPS |

Fig. 5A
CONTINUED

| SOURCE_16 | SOURCE_17 | SOURCE_18 |
|---|---|---|
| ESTIMATE_CD | QUARTER_DIM_ID | MEDIA_TYPE |
| NETWORK_CD | NETWORK_DIM_ID | BROADCAST_DT |
| PACKAGE_CD | PROGRAM_DIM_ID | ESTIMATE |
| PROGRAM_CD | DAY_PART_DIM_ID | BUY_TYPE |
| DAY_PART_CD | DAY_DIM_ID | PACKAGE_CD |
| UNIT_ID | START_TIME_DIM_ID | PACKAGE_NM |
| BROADCAST_DT | END_TIME_DIM_ID | PROGRAM_CD |
| ROTATION_CD | DEMO_DIM_ID | NETWORK_CD |
| START_TIME | QTR_NUM | DAY_PART_CD |
| END_TIME | QTR_YEAR | LENGTH |
| UNIT_LENGTH | NETWORK_NM | UNIT_NUM |
| BUY_TYPE_CD | PROGRAM_NM | UNIT_STATUS |
| UNIT_STATUS | DAY_NM | UNIT_ID |
| UNITS | START_TIME | DAY_TIME |
| UNIT_COST | END_TIME | UNITS |
| A1834_IMPS | DAY_PART_CD | UNIT_COST |
| A1834_GRPS | DEMO_CD | START_TIME |
| A1849_IMPS | UNIVERSE | END_TIME |
| A1849_GRPS | VPH | ROTATION |
| A2554_IMPS | IMPRESSION | HOMES_IMP |
| A2554_GRPS | SHARE | HOMES_RATING |
| A3564_IMPS | RATING | W1849_IMP |
| A3564_GRPS | HUT | W1849_RATING |
| A2549_IMPS | STATUS_CD | P2554_IMP |
| A2549_GRPS | STATUS_MSG | P2554_RATING |
| A2564_IMPS | WEEKEND WEEKDAY | P1849_IMP |
| A2564_GRPS | | P1849_RATING |
| M1824_IMPS | | M1849_IMP |
| M1824_GRPS | | M1849_RATING |
| M1849_IMPS | | PROGRAM_ID |
| M1849_GRPS | | |
| M2534_IMPS | | |
| M2534_GRPS | | |

Fig. 5A
CONTINUED

SOURCE 19
UNIT_ID
ESTIMATE_ID
START_DATE
END_DATE
FLIGHT_DATE
CALL_LETTERS
DAYS_OF_WEEK
START_TIME
END_TIME
DAYPART_CODE
UNIT_LENGTH
PROGRAM_NM
UNIT_COST
WEEK_NUMBER
UNITS
UNIT_STATUS
PRIM_DEMO_NAME
DEMO_NAME1
DEMO_NAME2
DEMO_NAME3
DEMO_NAME4
DEMO_NAME5
DEMO_NAME6
DEMO_NAME7
DEMO_NAME8
DEMO_NAME9
PRIMARY_DEMO_RATING
PRIM_DEMO_PERSONS
DEMO1_RATING
DEMO1_PERSONS
DEMO2_RATING
DEMO2_PERSONS
DEMO3_RATING
DEMO3_PERSONS
DEMO4_RATING
DEMO4_PERSONS
DEMO5_RATING
DEMO5_PERSONS
DEMO6_RATING
DEMO6_PERSONS
DEMO7_RATING
DEMO7_PERSONS
DEMO8_RATING
DEMO8_PERSONS
DEMO9_RATING
DEMO9_PERSONS

Primetime Pacing Report
2003 2nd Quarter

PRIME TIME - NETWORK - UPFRONT

| Week # | 1 | 2 | 3 | 4 | 5 | 6 | 7 | 8 | 9 | 10 | 11 | 12 | 13 |
|---|---|---|---|---|---|---|---|---|---|---|---|---|---|
| Week of (Current Year) | 2003-03-31 | 2003-04-07 | 2003-04-14 | 2003-04-21 | 2003-04-28 | 2003-05-05 | 2003-05-12 | 2003-05-19 | 2003-05-26 | 2003-06-02 | 2003-06-09 | 2003-06-16 | 2003-06-23 |
| Week of (Last Year) | 2002-04-01 | 2002-04-08 | 2002-04-15 | 2002-04-22 | 2002-04-29 | 2002-05-06 | 2002-05-13 | 2002-05-20 | 2002-05-27 | 2002-06-03 | 2002-06-10 | 2002-06-17 | 2002-06-24 |
| ABC - TV NETWORK ||||||||||||||
| 2003 | 7,595,600 | 7,047,207 | 7,113,271 | 7,771,276 | 6,872,732 | 6,287,826 | 5,134,258 | 7,365,044 | 3,220,550 | 1,601,134 | 2,330,820 | 4,343,983 | 4,629,728 |
| 2002 | 3,686,187 | 5,082,500 | 3,655,578 | 3,139,603 | 4,176,500 | 4,682,841 | 2,613,525 | 4,072,505 | 2,471,150 | 1,338,631 | 1,321,328 | 812,300 | 1,705,627 |
| +(-)$ | 3,909,413 | 1,964,707 | 3,457,693 | 4,631,673 | 2,696,232 | 1,604,985 | 2,520,733 | 3,292,539 | 749,400 | 262,503 | 1,009,492 | 3,531,683 | 2,924,101 |
| CBS - TV NETWORK ||||||||||||||
| 2003 | 11,737,959 | 7,376,406 | 11,430,183 | 8,869,228 | 12,996,710 | 13,634,477 | 10,435,905 | 8,758,896 | 6,477,398 | 6,547,560 | 6,731,727 | 7,303,699 | 5,529,277 |
| 2002 | 4,030,900 | 7,578,480 | 4,039,850 | 6,159,680 | 5,149,600 | 8,935,545 | 7,270,740 | 5,140,430 | 2,969,750 | 3,274,790 | 2,730,700 | 2,221,500 | 3,062,325 |
| +(-)$ | 7,707,059 | -202,074 | 7,390,333 | 2,709,548 | 7,846,110 | 4,698,932 | 3,165,165 | 3,618,466 | 3,507,648 | 3,272,770 | 4,001,027 | 5,082,199 | 2,466,952 |
| FOX NETWORK ||||||||||||||
| 2003 | 7,482,550 | 7,209,450 | 6,541,300 | 6,420,750 | 5,059,850 | 4,567,300 | 6,774,200 | 6,667,400 | 2,228,450 | 3,834,800 | 3,525,500 | 2,983,450 | 1,991,850 |
| 2002 | 2,077,500 | 2,093,550 | 1,356,950 | 1,048,800 | 2,423,200 | 2,466,025 | 1,715,200 | 1,326,600 | 952,500 | 930,800 | 1,277,650 | 497,300 | 1,952,600 |
| +(-)$ | 5,405,050 | 5,115,900 | 5,184,350 | 5,371,950 | 2,636,650 | 2,101,275 | 5,059,000 | 5,340,800 | 1,275,950 | 2,904,000 | 2,247,850 | 2,486,150 | 39,250 |
| NBC - TV NETWORK ||||||||||||||
| 2003 | 16,853,030 | 15,912,471 | 13,030,702 | 13,932,258 | 15,056,808 | 12,621,617 | 18,824,943 | 11,832,749 | 5,692,993 | 7,491,500 | 7,478,621 | 7,663,903 | 8,760,905 |
| 2002 | 8,491,500 | 7,203,000 | 5,353,400 | 5,700,600 | 5,456,600 | 7,626,650 | 3,226,300 | 5,441,700 | 1,333,100 | 2,814,900 | 2,467,100 | 1,766,750 | 3,117,150 |
| +(-)$ | 8,361,530 | 8,709,471 | 7,677,302 | 8,231,658 | 9,600,208 | 4,994,967 | 15,598,643 | 6,391,049 | 4,359,893 | 4,676,600 | 5,011,521 | 5,897,153 | 5,643,755 |

Schedule Analysis

Demo: A25-54 - Avg Comm. Min. Use + 3 Days
Pricing: UPFRONT
Total Client Expenditure: $241,000.00
Percent Client Dollars Matched: 0%

| Date | Network | Time | Program Name | Cost Basis | Market Cost | Client Cost | CPM A25-54 | Market Rating |
|---|---|---|---|---|---|---|---|---|
| 02/05/03 | ABC - TV NETWORK | 6:30PM | WORLD NEWS TONIGHT | 30 | $35,450 | $0 | $0.00 | 0.0 |
| 02/08/03 | ABC - TV NETWORK | 6:30PM | WORLD NEWS TONIGHT SATURDAY | 30 | $17,164 | $0 | $0.00 | 0.0 |
| 02/11/03 | ABC - TV NETWORK | 6:30PM | WORLD NEWS TONIGHT | 30 | $43,540 | $0 | $0.00 | 0.0 |
| 02/13/03 | ABC - TV NETWORK | 6:30PM | WORLD NEWS TONIGHT | 30 | $36,775 | $0 | $0.00 | 0.0 |
| 02/15/03 | ABC - TV NETWORK | 6:30PM | WORLD NEWS TONIGHT SATURDAY | 30 | $16,644 | $0 | $0.00 | 0.0 |
| 02/18/03 | ABC - TV NETWORK | 6:30PM | WORLD NEWS TONIGHT | 30 | $33,299 | $0 | $0.00 | 0.0 |
| | | | Totals Including No Change Units | | $0 | $0 | | |
| | | | Totals Excluding No Change Units | | $0 | | | |
| | | | Percent Variance of Market Cost | | -100% | | | |

NFL Event Report

2002 4th Quarter Demo: M18-49 - Program Avg Live

| Network Code & Program Name | Broadcast Date | Time Block | Avg $/:30 | Avg Ratings M18-49 | Avg CPM M18-49 |
|---|---|---|---|---|---|
| ABC - NFL FOOTBALL | 2002 4th Quarter | 9:00:00 PM | $351,370 | 0.0 | $0.00 |
| | 09/30/02 | | $379,381 | 0.0 | $0.00 |
| | 10/07/02 | | $329,100 | 0.0 | $0.00 |
| | 10/14/02 | | $345,724 | 0.0 | $0.00 |
| | 10/21/02 | | $346,992 | 0.0 | $0.00 |
| | 10/28/02 | | $341,243 | 0.0 | $0.00 |
| | 11/04/02 | | $352,545 | 0.0 | $0.00 |
| | 11/11/02 | | $364,711 | 0.0 | $0.00 |
| | 11/18/02 | | $357,436 | 0.0 | $0.00 |
| | 11/25/02 | | $351,389 | 0.0 | $0.00 |
| | 12/02/02 | | $347,496 | 0.0 | $0.00 |
| | 12/09/02 | | $367,496 | 0.0 | $0.00 |
| | 12/16/02 | | $353,850 | 0.0 | $0.00 |
| | 12/23/02 | | $342,963 | 0.0 | $0.00 |
| CBS - NFL FOOTBALL | 2002 4th Quarter | 12:30:00 PM | $362,965 | 0.0 | $0.00 |
| | 11/28/02 | | $362,965 | 0.0 | $0.00 |
| CBS - NFL FOOTBALL | 2002 4th Quarter | 1:00:00 PM | $183,292 | 1.6 | $182.13 |
| | 10/06/02 | | $163,329 | 0.0 | $0.00 |
| | 10/13/02 | | $152,887 | 8.6 | $28.24 |
| | 10/20/02 | | $161,718 | 0.0 | $0.00 |
| | 10/27/02 | | $132,372 | 0.0 | $0.00 |
| | 11/03/02 | | $212,056 | 0.0 | $0.00 |
| | 11/10/02 | | $141,531 | 0.0 | $0.00 |
| | 11/17/02 | | $169,423 | 6.9 | $39.00 |
| | 11/24/02 | | $253,794 | 0.0 | $0.00 |
| | 12/01/02 | | $227,000 | 0.0 | $0.00 |
| | 12/08/02 | | $178,168 | 7.0 | $40.72 |
| | 12/15/02 | | $250,080 | 0.0 | $0.00 |

Fig. 11B

DBO.D_DATASOURCE

| Column | Type |
|---|---|
| DATA_SOURCE_DIM_ID | INT IDENTITY |
| COMPANY_ID | INT |
| DATA_SOURCE_ID | VARCHAR (25) |
| DATA_SOURCE_NM | VARCHAR (50) |
| SYSTEM_NM | VARCHAR (50) |
| FTP_DIR_NM | VARCHAR (50) |
| FTP_USERNAME | VARCHAR (50) |
| FTP_PASSWORD | VARCHAR (50) |
| TECH_CONTACT_NM | VARCHAR (50) |
| TECH_EMAIL_ADDR | VARCHAR (150) |
| TECH_PHONE_NUM | VARCHAR (25) |
| PIPELINE_STATUS | VARCHAR (50) |
| STATUS_COMMENT | VARCHAR (500) |

DBO.D_WEEK

| Column | Type |
|---|---|
| WEEK_DIM_ID | INT IDENTITY |
| WEEK_NUM | INT |
| WEEK_IN_QUARTER | INT |
| MONTH_NUM | VARCHAR (50) |
| MONTH_NM | INT |
| QUARTER_DIM_ID | INT |
| QUARTER_NUM | VARCHAR (35) |
| QUARTER_NM | INT |
| YEAR_NUM | INT |

DBO.D_DATE

| Column | Type |
|---|---|
| DATE_DIM_ID | INT |
| THE_DATE | DATETIME |
| YEAR_NUM | INT |
| QUARTER_NUM | INT |
| QUARTER_NM | VARCHAR (25) |
| MONTH_YEAR | VARCHAR (35) |
| MONTH_NUM | INT |
| MONTH_NM | VARCHAR (25) |
| WEEK_OF_YEAR | INT |
| DAY_OF_YEAR | INT |
| DAY_OF_MONTH | INT |
| DAY_OF_THE_WEEK | INT |
| DAY_DIM_ID | INT |
| WEEKDAY_NM | VARCHAR (25) |
| WEEKEND_WEEKDAY | VARCHAR (25) |
| SPECIAL_OCCASION | VARCHAR (100) |
| BROADCAST_YEAR | INT |
| BROADCAST_QUARTER_DIM_ID | INT |
| BROADCAST_QTR_NUM | INT |
| BROADCAST_QTR_NM | VARCHAR (50) |
| BROADCAST_MONTH_DIM_ID | INT |
| BROADCAST_MONTH_NUM | INT |
| BROADCAST_MONTH_NM | VARCHAR (50) |
| BROADCAST_WEEK_DIM_ID | INT |
| BROADCAST_WEEK_NUM | INT |
| BROADCAST_SEASON | VARCHAR (25) |
| BROADCAST_PRICE_GROUP | INT |
| CREATE_AUDIT_ID | INT |
| UPDATE_AUDIT_ID | INT |

Fig. 16

| DBO.D_ROTATION | |
|---|---|
| 🔑 ROTATEION_DIM_ID | INT |
| ROTATION_CD | VARCHAR (25) |
| ROTATION_DESC | VARCHAR (100) |
| MONDAY_FLAG | INT |
| TUESDAY_FLAG | INT |
| WEDNESDAY_FLAG | INT |
| THURSDAY_FLAG | INT |
| FRIDAY_FLAG | INT |
| SATURDAY_FLAG | INT |
| SUNDAY_FLAG | INT |
| MATCH_CD | VARCHAR (25) |
| MATCH_VALUE | INT |

| DBO.D_BUY_TYPE | |
|---|---|
| 🔑 BUY_TYPE_DIM_ID | INT |
| BUY_TYPE_CD | VARCHAR (5) |
| BUY_TYPE_NM | VARCHAR (25) |
| BUY_TYPE_DESC | VARCHAR (100) |
| CREATE_AUDIT_ID | INT |
| UPDATE_AUDIT_ID | INT |

| DBO.D_TIME | |
|---|---|
| 🔑 TIME_DIM_ID | INT |
| THE_TIME | DATETIME |
| HOURS | INT |
| MINUTES | INT |
| AM_PM | VARCHAR (2) |
| TIME_OF_DAY | VARCHAR (15) |
| DAY_PART | VARCHAR (50) |
| TIME_HOUR_DIM_ID | INT |
| TIME_HOUR_BLOCK | DATETIME |
| TIME_HALF_DIM_ID | INT |
| TIME_HALF_BLOCK | DATETIME |
| CREATE_AUDIT_ID | INT |
| UPDATE_AUDIT_ID | INT |

| DBO.D_PROGRAM | |
|---|---|
| 🔑 PROGRAM_DIM_ID | INT IDENTITY |
| PROGRAM_CD | VARCHAR (50) |
| PROGRAM_NM | VARCHAR (50) |
| PROGRAM_CAT_DIM_ID | INT |
| PROGRAM_CATEGORY | VARCHAR (50) |
| PROGRAM_CAT_SUB_DIM_ID | INT |
| PROGRAM_CATEGORY_SUB | VARCHAR (50) |
| USERNAME | VARCHAR (50) |

Fig. 16
CONTINUED

| DBO.D_MONTH | |
|---|---|
| 🔑 MONTH_DIM_ID | INT IDENTITY |
| YEAR_NUM | INT |
| MONTH_NUM | INT |
| MONTH_NM | VARCHAR (50) |
| QUARTER_DIM_ID | INT |
| QTR_NUM | INT |
| QTR_NM | VARCHAR (50) |

| DBO.D_TIME_BLOCK | |
|---|---|
| 🔑 TIME_BLOCK_DIM_ID | INT |
| TIME_BLOCK | DATETIME |

| DBO.D_DAY_PART | |
|---|---|
| 🔑 DAY_PART_DIM_ID | INT IDENTITY |
| DAY_PART_CD | VARCHAR (10) |
| DAY_PART_DESC | VARCHAR (50) |
| WEEKEND_WEEKDAY | VARCHAR (10) |
| START_TIME | DATETIME |
| END_TIME | DATETIME |
| CREATE_AUDIT_ID | INT |
| UPDATE_AUDIT_ID | INT |

| DBO.D_NETWORK | |
|---|---|
| 🔑 NETWORK_DIM_ID | INT IDENTITY |
| NETWORK_CD | VARCHAR (25) |
| NETWORK_NM | VARCHAR (100) |
| NETWORK_TYPE | VARCHAR (50) |
| NETWORK_CATEGORY_CD | VARCHAR (15) |
| NETWORK_TIER_NUM | INT |
| USERNAME | VARCHAR (50) |
| NETWORK_PARENT_NM | VARCHAR (50) |

Fig. 16
CONTINUED

| DBO.F_UNIT | |
|---|---|
| 🔑 DATE_DIM_ID | INT |
| 🔑 BEGIN_TIME_DIM_ID | INT |
| 🔑 END_TIME_DIM_ID | INT |
| 🔑 PROGRAM_DIM_ID | INT |
| 🔑 NETWORK_DIM_ID | INT |
| 🔑 DAY_PART_DIM_ID | INT |
| 🔑 ROTATION_DIM_ID | VARCHAR(35) |
| 🔑 DATA_SOURCE_DIM_ID | INT |
| 🔑 BUY_TYPE_DIM_ID | INT |
| 🔑 UNIT_ID | VARCHAR(255) |
| UNIT_STATUS_FLG | VARCHAR(10) |
| GUARANTEE_FLG | VARCHAR(3) |
| UNIT_LENGTH | INT |
| UNIT | INT |
| NC_UNITS | NUMERIC(18,2) |
| UNIT_COST | MONEY(19,4) |
| NORMALIZED_UNIT_COST | MONEY(19,4) |
| GROSS_COST_AMT | MONEY(19,4) |
| NORMALIZED_COST_AMT | MONEY(19,4) |
| NC_NORMALIZED_COST_AMT | MONEY(19,4) |
| CREATE_AUDIT_ID | INT |
| NORMALIZED_UNIT_CST_LOG | NUMERIC(9,2) |
| STD_DEV_3_FLG | BIT |
| ESTIMATE_CD | VARCHAR(50) |
| PACKAGE_CD | VARCHAR(50) |
| FILE_NM | VARCHAR(100) |

| DBO.F_UNIT_DEMO | |
|---|---|
| DATE_DIM_ID | INT |
| BEGIN_TIME_DIM_ID | INT |
| END_TIME_DIM_ID | INT |
| PROGRAM_DIM_ID | INT |
| NETWORK_DIM_ID | INT |
| DAY_PART_DIM_ID | INT |
| DAYS_AIRED_DIM_ID | INT |
| 🔑 DATA_SOURCE_DIM_ID | INT |
| 🔑 BUY_TYPE_DIM_ID | INT |
| 🔑 DEMO_DIM_ID | INT |
| UNIT_ID | VARCHAR(150) |
| GUARANTEE_FLG | VARCHAR(3) |
| GUARANTEE_RATING | NUMERIC(15,5) |
| GUARANTEE_IMPRESS | BIGINT |
| GUARANTEE_CPM | MONEY(10,4) |
| GUARANTEE_NORM_CPM | MONEY(19,4) |
| GUARANTEE_CPP | MONEY(19,4) |
| GUARANTEE_NORM_CPP | MONEY(19,4) |
| NO_GUARANTEE_RATING | NUMERIC(15,5) |
| NO_GUARANTEE_IMPRESS | BIGINT |
| NO_GUARANTEE_CPM | MONEY(19,4) |
| NO_GUARANTEE_NORM_CPM | MONEY(19,4) |
| NO_GUARANTEE_CPP | MONEY(19,4) |
| NO_GUARANTEE_NORM_CPP | MONEY(19,4) |
| CREATE_AUDIT_ID | INT |
| IMPRESS_LOG | NUMERIC(9,2) |
| STD_DEV_3_FLG | BIT |

Fig. 16
CONTINUED

| DBO.F_RESEARCH | |
|---|---|
| QUARTER_DIM_ID | INT |
| NETWORK_DIM_ID | INT |
| PROGRAM_DIM_ID | INT |
| DAY_PART_DIM_ID | INT |
| DAY_DIM_ID | INT |
| START_TIME_DIM_ID | INT |
| END_TIME_DIM_ID | INT |
| DEMO_DIM_ID | INT |
| UNIVERSE | NUMERIC (18,5) |
| VPH | NUMERIC (18,5) |
| IMPRESSION | NUMERIC (18,5) |
| SHARE | NUMERIC (18,5) |
| RATING | NUMERIC (18,5) |
| HUT | NUMERIC (18,5) |

| DBO.F_TIME_ANALYSIS | |
|---|---|
| DATE_DIM_ID | INT |
| NETWORK_DIM_ID | INT |
| TIME_BLOCK_DIM_ID | INT |
| PROGRAM_DIM_ID | INT |
| BUY_TYPE_DIM_ID | INT |
| DATA_SOURCE_CD | VARCHAR (50) |
| WEEKDAY_NM | VARCHAR (25) |
| WEEKEND_WEEKDAY | VARCHAR (25) |
| TOTAL_UNITS | NUMERIC (10,2) |
| AVG_NORMALIZED_COST | MONEY (19,4) |

| DBO.F_DEMO_TEMP | |
|---|---|
| 🔑 DATE_DIM_ID | INT |
| 🔑 WEEK_DIM_ID | INT |
| 🔑 MONTH_DIM_ID | INT |
| 🔑 QUARTER_DIM_ID | INT |
| 🔑 NETWORK_DIM_ID | INT |
| 🔑 PROGRAM_DIM_ID | INT |
| 🔑 DAY_PART_DIM_ID | INT |
| 🔑 TIME_BLOCK_DIM_ID | INT |
| 🔑 DEMO_DIM_ID | INT |
| BLENDED_UNITS | NUMERIC (10,2) |
| BLENDED_RATING | NUMERIC (38,6) |
| BLENDED_IMPRESS | BIGINT |
| GUARANTEE_UNITS | NUMERIC (10,2) |
| GUARANTEE_RATING | NUMERIC (38,6) |
| GUARANTEE_IMPRESS | BIGINT |
| NO_GUARANTEE_UNITS | NUMERIC (10,2) |
| NO_GUARANTEE_RATING | NUMERIC (38,6) |
| NO_GUARANTEE_IMPRESS | BIGINT |
| ALL_SCATTER_UNITS | NUMERIC (10,2) |
| ALL_SCATTER_RATING | NUMERIC (38,6) |
| ALL_SCATTER_IMPRESS | BIGINT |
| UNIVERSE | INT |

Fig. 16
CONTINUED

| DBO.F_CPM_TREND | |
|---|---|
| DATE_DIM_ID | INT |
| WEEK_DIM_ID | INT |
| MONTH_DIM_ID | INT |
| QUARTER_DIM_ID | INT |
| NETWORK_DIM_ID | INT |
| DAY_PART_DIM_ID | INT |
| BUY_TYPE_DIM_ID | INT |
| AVG_COST | NUMERIC (15,5) |
| UNITS | NUMERIC (10,2) |

| DBO.F_UNIT_FIX | |
|---|---|
| DATA_SOURCE_DIM_ID | INT |
| UNIT_ID | VARCHAR (255) |

| DBO.F_MARKET_ANALYSIS | |
|---|---|
| 🔑 QUARTER_DIM_ID | INT |
| 🔑 NETWORK_DIM_ID | INT |
| 🔑 DAY_PART_DIM_ID | INT |
| 🔑 BUY_TYPE_DIM_ID | INT |
| NUMBER_OF_BUYS | INT |
| TOTAL_UNITS | NUMERIC (10,2) |
| TOTAL_COST_AMT | MONEY (19,4) |
| TOTAL_ZERO_UNITS | INT |
| TOTAL_ZERO_COST_AMT | MONEY (19,4) |

| DBO.F_UNIT_DEMO_FIX | |
|---|---|
| DATA_SOURCE_DIM_ID | INT |
| UNIT_ID | VARCHAR (255) |
| DEMO_DIM_ID | INT |

Fig. 16
CONTINUED

| DBO.F_EVENT | |
|---|---|
| DATE_DIM_ID | INT |
| THE_BLOCK_DIM_ID | INT |
| QUARTER_DIM_ID | INT |
| NETWORK_DIM_ID | INT |
| PROGRAM_DIM_ID | INT |
| COST | MONEY (19,4) |
| DATA_SOURCE_CD | VARCHAR (35) |
| UNITS | NUMERIC (10,2) |

| DBO.F_SCHEDULE_ANALYSIS | |
|---|---|
| DATE_DIM_ID | INT |
| NETWORK_DIM_ID | INT |
| TIME_BLOCK_DIM_ID | INT |
| PROGRAM_DIM_ID | INT |
| BUY_TYPE_DIM_ID | INT |
| DATA_SOURCE_DIM_ID | INT |
| AVG_NORMALIZED_COST | MONEY (19,4) |
| UNITS | NUMERIC (10,2) |

| DBO.F_PACING | |
|---|---|
| 🔑 WEEK_DIM_ID | INT |
| 🔑 BUY_TYPE_DIM_ID | INT |
| 🔑 NETWORK_DIM_ID | INT |
| 🔑 DAY_PART_DIM_ID | INT |
| AVG_CST | MONEY (19,4) |

Fig. 16
CONTINUED

SYSTEM AND METHOD FOR AGGREGATING ADVERTISING PRICING DATA

CROSS-REFERENCE TO RELATED APPLICATION

This application claims the benefit of U.S. Provisional Application Ser. No. 60/543,899, filed on Feb. 11, 2004, and entitled "SYSTEM AND METHOD FOR AGGREGATING ADVERTISMENT PRICING DATA," which is hereby incorporated by reference.

BACKGROUND OF THE INVENTION

1. Field of the Invention

The present invention relates generally to a system and method for compiling advertising data and, more particularly, to a system and method for aggregating actual television (TV) advertising pricing data and providing users customized pricing reports.

2. Description of Related Art

Ever since the early beginnings of broadcast entertainment, whether radio, television, or in the more recent realm of the Internet, advertising has played a major role. Advertising is a major source of revenue for the entities selling the advertising, such as television networks, cable providers and syndicates, as well as a necessary part of doing business for the advertisers wanting to promote their goods and services. The purchasing of advertisements until this point has been quite skewed towards the entities that sell advertising time. For example, networks are able to set the price for a particular advertisement and convince advertisers to purchase advertising time based on that price, while advertisers have no real knowledge of the supply and demand involved for that advertisement and/or what other advertisers are paying or offering for the same time slot. While most advertisers try to plan and negotiate a fair price, because of the way advertising is bought and sold, advertisers do not actually know the cost of the advertisements in the shows they buy. Rather, the advertisers learn the actual prices that they paid after the fact, after their upfront purchases of advertising time have been processed by the networks.

Two methods of evaluating advertising efficiency are cost-per-thousand (CPM) and cost-per-point (CPP). CPM is a ratio based on how much it would cost to reach 1,000 viewers. For example, CPM would be the cost of an advertising spot purchased, divided by the total amount of viewers, divided by 1,000. Thus, an advertiser and/or network is able to determine the efficiency of a particular advertisement. CPP, on the other hand, is a ratio based on how much it would cost to purchase one rating point, namely, 1% of the population in the area being evaluated. For example, in order to calculate a CPP, one would have to divide the cost of the advertisements by the total number of rating points actually obtained. Thus, advertisers are only given actual "prices" for advertisements once networks have processed the viewing numbers and specific unit prices are assigned to specific shows based on the cost per thousand averages that the advertiser negotiated with the network.

Additionally, there are two primary buying methods, or markets, in which advertising time is purchased on network television. These two markets are referred to as the upfront market and the scatter market. The upfront market involves advertisers placing orders for advertisements that will appear in television programs running in future seasons. By buying in advance, or up-front, and committing to a full network season, the advertisers are usually given lowers prices than they would possibly pay later in a scatter market. The scatter market occurs much closer to the actual time that the advertisement is to appear. For example, advertisements may be purchased in September for shows that will run from October through December. In addition, as will be explained below, networks sometimes guarantee a certain CPM for buying in an upfront market. If the network does not deliver the guaranteed rating, it might run free commercials known in the industry as $0 commercials, to make up for the rating shortfall obtained in connection with the paid advertising.

In reality, with regard to TV advertising, advertisers make purchases of advertisements upfront and are not actually given a specific price by a network for the specific advertisement until right before the TV season is to begin. Because buyers have so little information about the overall market, it is easy for the networks to juggle advertisement slots to convince advertisers that they have made "a good deal," while in reality they are paying more money than a competing advertiser is. For example, networks can quote prices for advertisement slots that are not really indicative of a price for that slot but rather an average or compilation of other pricing data.

Thus, a need exists for a method and system for providing advertisers with a more accurate evaluation of advertisement prices.

SUMMARY OF THE INVENTION

The present invention solves the foregoing and other needs. In one embodiment, a method and system is provided for providing aggregated advertising pricing data to a client, such as an advertiser or advertising agency and the like. The system according to one such embodiment receives advertising pricing data from a plurality of clients, of an advertising service provider, for example, via an automatic or manual data feed or via uploading data from a CD-Rom or other memory, aggregates the advertising pricing data and makes the aggregated data available to one or more clients, for example, via a web portal or other application. In one embodiment, one or more reports can be generated which show the aggregated data in different formats that enable a client to make better informed decisions when purchasing advertisements.

Another embodiment of the present invention presents clients with aggregated data and/or reports that include a forecast of future prices for advertisements. These forecasts may be made based on numerous different factors such as the Prime Rate or Consumer Price Index.

A system according to one embodiment of the present invention involves the sharing of advertising pricing data with a client so that the client can incorporate that data into its own system. The method involves compressing a data file, uploading it to a secure FTP site and sending a notification email to a designated user associated with the client. The user can then access the file by providing authentication information, and download it to use it on their system.

BRIEF DESCRIPTION OF THE DRAWINGS

FIG. 5A is a schematic of a database according to one embodiment of the present invention;

FIG. 6A is a user's display while compiling a report according to one embodiment of the present invention;

FIG. 6B is a report according to one embodiment of the present invention;

FIG. 7A is a user's display while compiling a report according to one embodiment of the present invention FIG. 7B is another report according to one embodiment of the present invention;

FIG. 8B is another report according to one embodiment of the present invention;

FIG. 9B is another report according to one embodiment of the present invention;

FIG. 11A is a user's display while compiling a report according to one embodiment of the present invention;

FIG. 11B is another report according to one embodiment of the present invention;

DETAILED DESCRIPTION OF CERTAIN EMBODIMENTS

Figure 1:
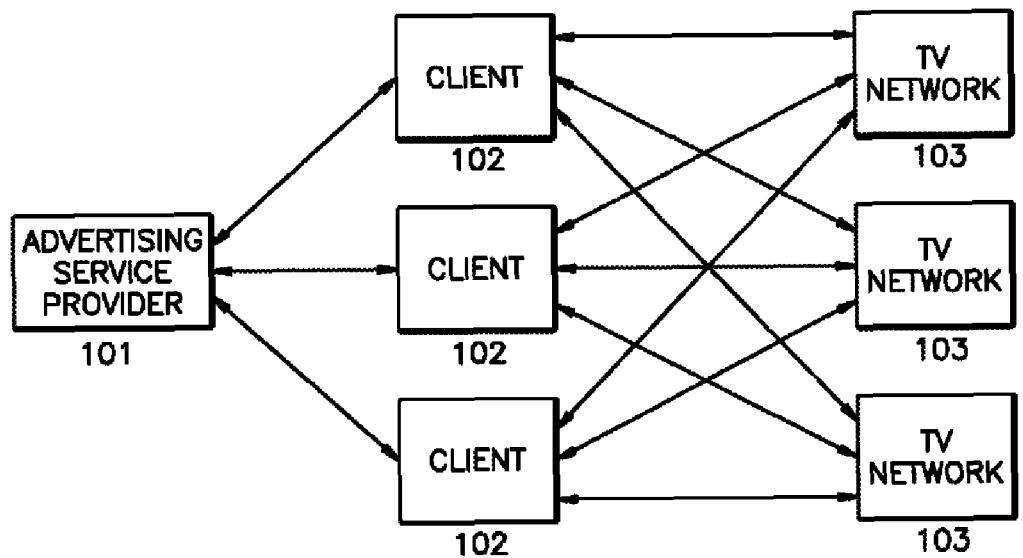
FIG. 1 is a schematic showing the relationships among entities according to one embodiment of the present invention.

Certain embodiments of the present invention will now be discussed in greater detail with reference to the aforementioned figures wherein like reference numerals refer to like components. Turning first to the schematic of FIG. 1, relationships are shown among various parties with regard to one embodiment of the present invention.

In general, a Client 102 negotiates with TV Networks 103 (which may include the networks' agents) to purchase time for advertising. Once an agreement is reached, the Clients 102 and Networks 103 form a relationship by which the Clients 102 have purchased advertisement placement and in turn the Clients 102 are also given advertising pricing data which includes various forms of data about the advertisement units or packages of advertisements that they have purchased. This data includes for example information about the time and date of the advertisement(s), the network that the advertisement is to be viewed on, any guaranteed ratings associated with the advertisement. As was discussed above, the Clients 102 who are purchasing the advertisements do not know the actual price that each individual advertisement had cost in relation to what they have gotten (e.g., the exposure or reach of the advertisement) for their money, but rather only know some details about the overall cost for the advertisement(s) in general, as well as some basic information about the program or group of programs that they are advertising on. Additionally, Clients 102 are unaware of what other advertisers are offering or paying for a particular advertisement. Clients 102 can include any entity that wishes to advertise or purchase an advertisement for television. This can include, for example, individual advertisers, their agents, or media buyers who represent a group of advertisers and the like. Although the embodiments of the present application are being presented with regard to television advertisements, it should be appreciated that a similar method and system can be applied to other mediums such as radio or internet advertising. Furthermore, although the embodiments are described with reference to television networks, it is to be understood that the embodiments and invention are applicable to other sellers of advertising, such as cable providers, syndicates and the like.

Additionally, a relationship, which is typically contractual, is formed between the advertising service provider 101 and the Clients 102. The Clients 102 agree to supply the advertising service provider 101 with the information about their advertisements that they have obtained from the TV Networks 103. In exchange for this information or data, the advertising service provider 101 agrees to supply the Clients 102 with detailed reports obtained from the aggregation of all of the data that the advertising service provider 101 obtained from their Clients 102. Thus, the Clients 102 each supply the information that they have to one advertising service provider 101 who, in turn, is able to combine that data, decipher its meaning and pass it all back to each individual client in a meaningful way that is both accurate and easy to interpret.

Figure 2:
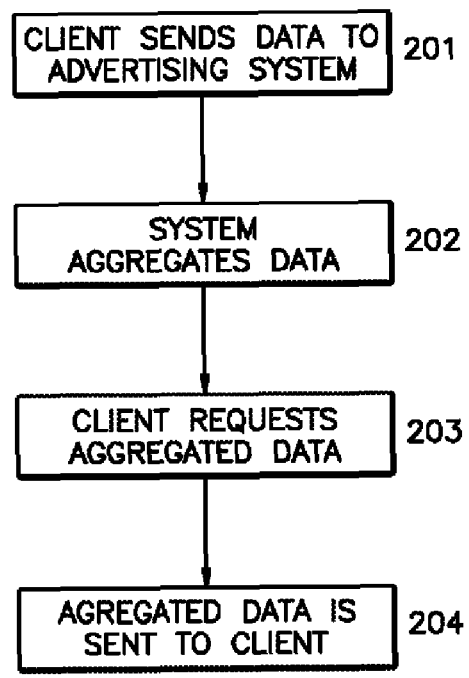
FIG. 2 is a flowchart of the general operation according to one embodiment of the present invention.

Now turning to FIG. 2, a work flow illustrating the overall process by which a Client 102 shares data with the advertising service provider 101 and its advertising computer system and receives aggregated data back is shown. As was discussed earlier with regard to FIG. 1, each Client 102 shares data with the advertising service provider 101. This data includes, for example, the price paid by a Client 102 for each particular advertisement in a given reporting period (e.g., from the last time the Client 102 submitted data, such as every 3 months, etc.), as well as other information regarding the advertisement, including which show the advertisement was purchased for, which demographic the advertiser was attempting to target, as well as any other information that the Client 102 can provide regarding the purchased advertisements (for example, the information reflected in the illustrative reports of FIGS. 6-11). Step 201. As the service provider's Advertising System receives data from Clients 102, it proceeds to aggregate the data. Step 202. Such aggregation includes a normalization process, namely, taking client data in disparate forms and/or electronic formats and converting each into a uniform form and/or format. It should be understood that different degrees of normalization may be used depending upon both the form in which the data is received from Clients 102 and the form used by the Advertising System, which is a matter of design choice. At some later time, once the Client 102 has shared data with the Advertising System, and it has been aggregated, the Client 102 is given access to the data, for example, via a secure web-based application, or through distribution of the application and data (e.g., on CD-Roms). Such access can be to varying degrees, such as a greater number of reports (e.g., premium clients pay relatively more for relatively greater access) for different embodiments. More specifically, in the present embodiment, the Client 102 can generate various reports based on the aggregated data by entering, via a user interface, any number of report criteria, or otherwise requesting a report. This request can come in various forms, depending on which particular aspect of the data the Client 102 wishes to analyze. As explained in greater detail below, there are numerous different ways in which the data can be reported and displayed to the Client 102, each way highlighting a different aspect of the data. Once a request to generate a report is received by the system, the system compiles the relevant data based on the criteria selected by the Client 102. Step 203. Once the report criteria are received, the Advertising System parses the aggregated data and generates the report which is provided to the client. Step 204. It should be appreciated that the aggregation of the data by the Advertising System allows the Client 102 to manipulate data from various multiple Clients 102 in ways that were never before possible, and provides each Client 102 with data not previously evaluated, including actual pricing data.

Figure 3:
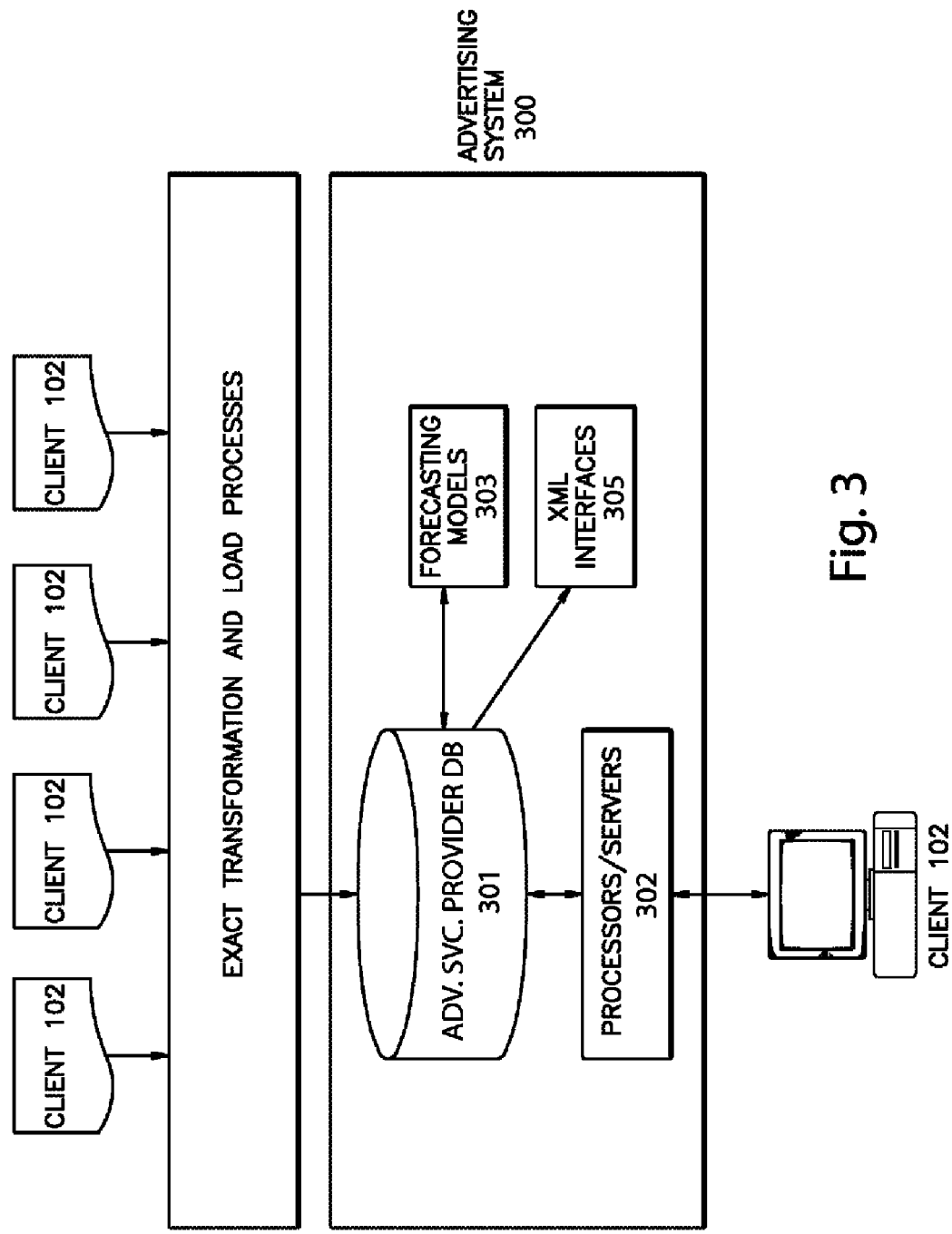
FIG. 3 is a schematic representing the architecture of one embodiment of the present invention.

Referring now to FIG. 3, an overall architecture of the Advertising System 300 of one embodiment of the present invention is shown. It should be noted that in alternate embodiments, different components of the system may be communicatively coupled differently, for example each may be coupled directly to each other wirelessly or by a local area network (LAN), wide area network (WAN), Internet or the like. Additionally, functional components can be distributed so that certain functions of Advertising System 300 may be distributed in modular fashion for operation at different locations and in different systems. Thus, the description herein of function or component being associated with a particular device or component or location herein is merely illustrative. In this embodiment, Clients 102 have a computer or other processor and share data, for example, through a secure FTP server or other communication channel, with the Advertising Service Provider 101 and Advertising System 300. That data is then extracted, transformed and loaded in numerous database tables 301 as will be discussed in more depth with reference to FIGS. 5A, 5B and 5C. In the present embodiment, database tables 301 include three sets of databases that interact with each other, 1) Stage databases; 2) Application databases; 3) Target databases. The Stage databases preferably store the data received from the client. The Application databases preferably store the data as it is being translated and the Target databases preferably store the data used in the various reports. This loading of data into databases includes the taking of data from various different clients that can be stored in different formats and translating that data into a format that is universal for all clients and thus able to be combined or consolidated into different formats by the Advertising System 300. It should be appreciated that while Clients 102 can include advertisers or media buyers who represent a group of advertisers, the data can come from other sources that compile data received from Clients 102. The data is then sent through the Advertising System 300 which will be discussed in more detail with reference to FIG. 4. After being sent through the Advertising System 300, the data is made available to the users of the system (who can be Clients 102) either via a network portal or other means (e.g., CD) in the form of customized reports, which will be discussed with reference to FIGS. 6-11. In this embodiment, the users also have processors (e.g., personal computers connected to the Internet or other network on which the data is made available) with which they can receive the data. Notably, the data in the databases can be used to create forecasting models 303 that forecast future pricing of advertisements (with such forecast being a customizable report generated by a software module, application, component or the like, the report based on any of a number of algorithms, for example, those providing various trend and/or statistical analysis and other factors, such as the prime rate or prime rate or consumer price index). The data can also be put into an XML or other electronic interface 305 to be shared with other Clients 102 or different customers electronically over a network such as the Internet, as will be explained in more detail below. In the present embodiment, the Advertising System 300 also includes one or more Processor(s) and Server(s) 302 that will be discussed in more depth with relation to FIG. 4. In this embodiment, the Processor(s) and Server(s) 302 (i) enable authentication of the Clients 102 who use the Advertising System 300 as well as parsing out certain permission functions for various parts of the system; (ii) provide the user interface to the Client 102; (iii) assist in providing compression mechanisms for compressing the data if for example the Client 102's browser supports such compression; (iv) converts parameters if necessary and routes the data to an appropriate process handler for processing. Although this embodiment is preferably described in terms of using a network such as the Internet to communicate the information it can also utilize other forms of communication over the network heretofore or hereafter known.

Figure 4:
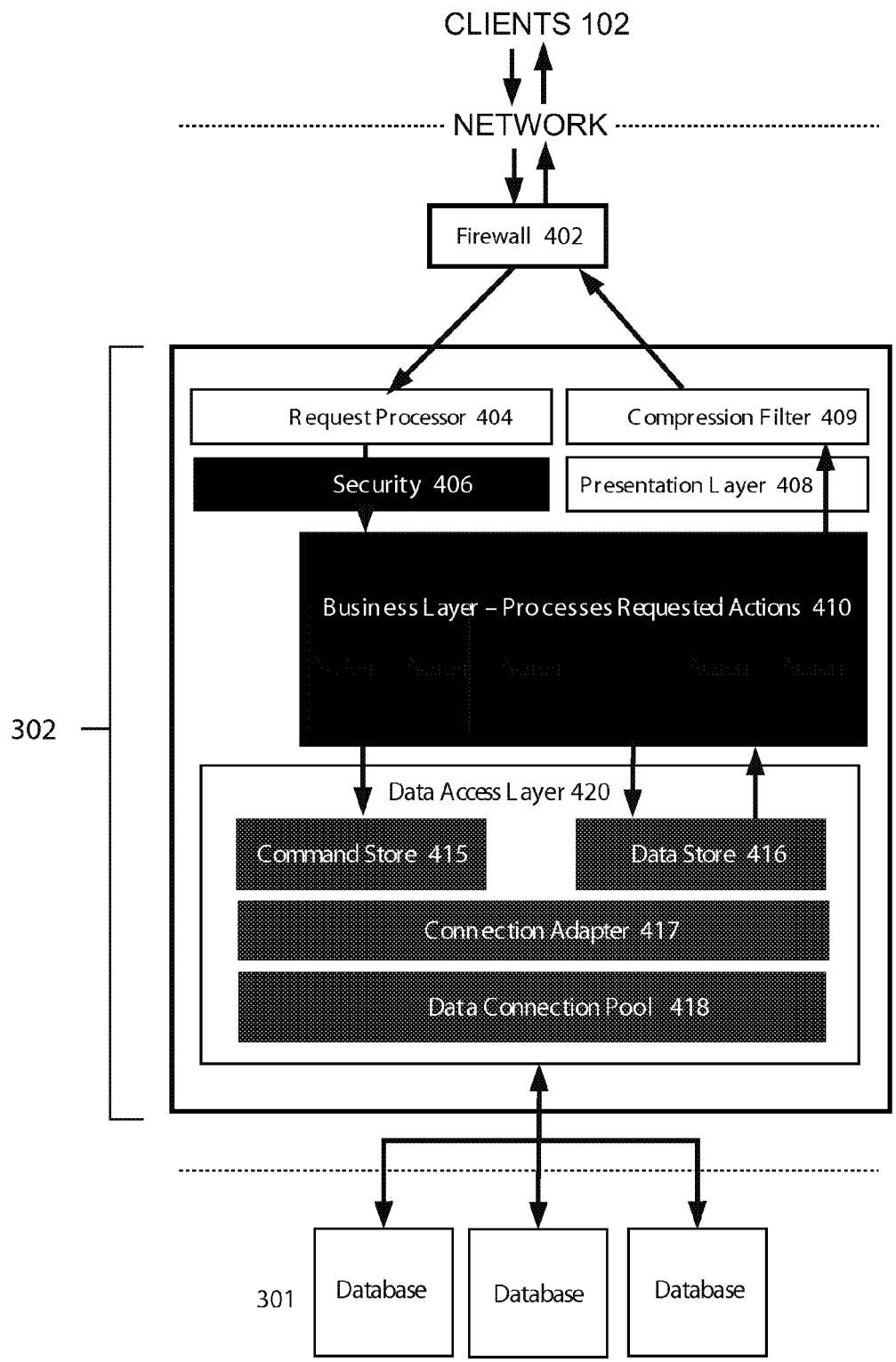
FIG. 4 is a schematic representing the architecture of one embodiment of the present invention.

Referring now to FIG. 4, the architecture of the Processor(s) and Server(s) 302 according to one embodiment of the Advertising System 300 will now be explained. Clients 102 are connected to the Advertising System 300 via the Internet or other network. In one embodiment, a firewall 402, as is well know in the art, is set up between the Advertising System 300 and the Internet to provide the system with added security.

According to this embodiment, the Advertising System 300 is implemented using the Java 2 Enterprise Edition (J2EE) Platform utilizing Java Servlets, Java Server Pages (JSP), Java Objects, Aspects, End DHTML, as is well known in the art, although any platforms and languages can be used. As can be seen further in FIG. 4, the Advertising System 300 contains one or more request processors 404, which is responsible for managing all incoming HTTP service requests by the Client (or user) 102. Upon receiving a request, the Advertising System 300 first ascertains or authenticates the requestor's identity provided by a web/servlet container. A servlet container is an application that implements Java Servlets and Java Server Pages specifications and is used for developing and deploying web applications and web services. In the present embodiment, the web/servlet container is software that manages and processes HTTP connections over network sockets (e.g., Apache, Microsoft IIS). The ascertaining and/or authenticating of the requestor's ID is accomplished by performing a lookup of the user object which is stored in an HTTP session that the Client 102 has initiated with the Advertising System 300. If the user does not yet exist, the processor will create a user object and do a lookup of the Client 102 from the database 422. The lookup will return information regarding the user, including the user's access control level (e.g., control over the extent to which the user can access the data and/or generate reports) for the various functions within the system. Information about each Client 102 is initially inputted into database 301 by an operator so that it can be retrieved at a later time. The system next examines the request to ascertain where to route the request.

The system next queries the security component 406 and, based on the user's access level, validates that the user has sufficient permission to access the requested resource. If the user does not have access rights, the system will return an access denied message to the user. If the user does have sufficient rights, the system passes along the message for further processing. The system then routes the request to the appropriate action. Illustrative XML code for a request processor to pass along information to a business layer 410 in the system is listed below.

```
<action path="/program/tp_programanalysis-report"
    type="com.sqad.netcosts.BaseAction"
    name="TProgramAnalysisForm"
    scope="request"
    parameter="com.sqad.netcosts.program.TPAnalysisProcessBean"
    input="/WEB-INF/jsp/program/tp_programanalysis_input.jsp"
    roles="client, admin">
    <forward name="success" path="/WEB-
INF/jsp/program/tp_programanalysis_report.jsp="/>
    <forward name="export" path="/WEB-
INF/jsp/program/tp_programanalysis_xls.jsp"/>
</action>
```

In the above listed XML code, the "path" variable is the virtual path for the action and is what the Client 102's browser sees. "Type" is the Java object that will handle this particular action. "Name" is the name of the Java object that will hold the incoming form variables as well as any variable the form will need when displayed to the user. The port object may be a concrete class for example:

```
<form-bean name="ScheduleAnalysisForm"
    type="com.sqad.netcosts.program.form.ScheduleAnalysisForm"
</form-bean>
```

In the alternative, the port object may be dynamically created using, for example, the code listed below:

```
<form-bean name="TPProgramAnalysisRpcForm"
    type-"org.apache.struts.action.DynaActionForm">
    <form-property name="guid" type="java.lang.String"/>
    <form-property name="cmd" type="java.lang.String"/>
    <form-property name="groupName" type="java.lang.String"/>
    <form-property name="analysisID"type="java.lang.Integer"/>
    <form-property name="network" type="java.lang.Integer"/>
    <form-property name=""startDate" type="java.lang.String"/>
    <form-property name=""endDate" type="java.lang.String/>
    <form-property name="startTime" type="java.lang.Integer"/>
    <form-property name="endTime" type="java.lang.Integer"/>
    <form-property name="selectedDays" type="java.lang.String"/>
    <form-property name="programs" type="java.lang.String"/>
</form-bean>
```

"Scope" is the scope of the request. "Parameter" is the concrete Java business object channeled to processing. "Input" represents which input page will be used for the particular action. "Roles" specifies particular roles (e.g., client, administrator) that will be allowed to access this action and the forwards are the JSP pages to invoke when processing is complete. Thus, the requested processor looks up the action within the system, validates that the user has the required role and access to that area and routes the form object with the associated data to the action object defined by the type of variable.

Referring once again to FIG. 4, the business layer 410 is comprised of numerous Java objects that represent various actions within the system. Each of the actions are instantiated by the request processor and provided with certain information to accomplish their designated tasks. In the event that the action is a report based action, the action class will adhere to the following general flow: 1) one action class will instantiate a Java process bean that has been defined for this action; 2) pass to the process the required data; and 3) invoke the process execute method. The execute method will then: 1) contact the data access layer and request a connection to a specific database; 2) contact the Commandstore 415 (described below) and acquire the required database query for the particular action; 3) execute the database query; 4) retrieve the returned data set and process it, thus creating numerous Java objects; 5) the resulting objects are then packaged in a result object that is returned to the action. The action class will then consult with the mapping which is assigned to it, insert the resulting Java object into the request stream to be consumed by the presentation layer 408 and forward it to the presentation layer 408.

After receiving the resulting Java object, the presentation layer 408 generates the final output and returns it to the user. The presentation layer 408 in one embodiment has been implemented utilizing JSP end tag libraries. As is well known in the art, tag libraries are specialized Java modules that are defined within the JSP Page as XML tags. The JSP Page is provided with the necessary data to populate itself and it generates the appropriate view to be sent back to the user.

Once again referring to FIG. 4, the data access layer 420 is responsible for handling communication with the database 301. The data access layer 420 is comprised of four distinct components: 1) CommandStore 415; 2) Data Store 416; 3) Data Connection Pool 417; and 4) Connection Adapter 418. The CommandStore 415 is an object which contains all the database SQL commands that are needed to manipulate the database. These commands are defined externally and loaded into the application and may be refreshed dynamically when the application is running. Data Store 416 is an object which holds information regarding the various data sources, that will be needed to be communicated to the Databases 422 during execution. Such information includes for example, what the specific databases are and which databases are associated with which tables as will be discussed below with reference to FIG. 5. Data Connection Pool 417 is responsible for maintaining connections to the database. Connection Adapter 418 is the communication link between the various application components and the Data Connection Pool 418. In one embodiment, caching is implemented for commonly accessed items that are not prone to frequent changes. For example, this may include choices within the report that will be discussed at greater length in connection with FIG. 5. In another embodiment, the data may be compressed before it is sent in a report to the user. For example, the system may first check if the user is capable of compression and, if so, the report may be sent to the Client 102 in this compressed form utilizing compression filter so as to improve throughput.

Referring now to FIG. 5, illustrative tables for databases according to one embodiment of the present invention are shown. Shown in FIG. 5A, are illustrative Tables for the Stage databases which are tables of data received by the Advertising System 300 from various clients. Although the data is in different formats, it contains generally standard fields of information, which include a network code to represent individual networks, a program code, which refers to individual programs on a network, a daypart code which refers to the part of the day that the program is on the Network. Additional information can include information about the unit length and cost of a particular advertisement as well as demographic information (e.g., AD 1824 would refer to Adults 18-24, WM2554 would refer to Women 25-54, M1849 would refer to Men, 18-49 etc.) Other codes used for the databases according to the present embodiment of the invention include: Est_CD, which is a unique code identifying a grouping of units by client; Network_CD, which is a unique code that identifies the distributor on which information is being provided; Package_CD, which is a unique code that groups purchase and pricing information that were purchased together; Program_CD, which is a unique code that designates the show in which a subscriber's commercial is scheduled to air; Daypart_CD, which is a unique code that indicates the primary time of day that a subscriber's schedule is scheduled to air within; Unit_ID, which is a unique code given to each commercial to be aired in a package; Broadcast_DT, which is the date of the Broadcast; Start Time, which is the time when the program the commercial is scheduled to air in begins; End Time, which is the time when the program the commercial is scheduled to air in ends; Unit Length, which designates the length in seconds of the advertising unit that has been purchased; Buy Type, which is a code that designates whether or not a unit was part of an Upfront or Scatter purchase; Rotation_CD, which is a code that refers to a unique rotation value; Unit Cost, which designates the dollar value assigned to the unit; Various Demos which are numerical values assigned to each unit representing the estimated audiences the unit is estimated or guaranteed to receive; Unit Status, which is a code that refers to a Unit's status (i.e. if it is an estimate); Units, which is a code that refers to the number of units.

Figure 5B:
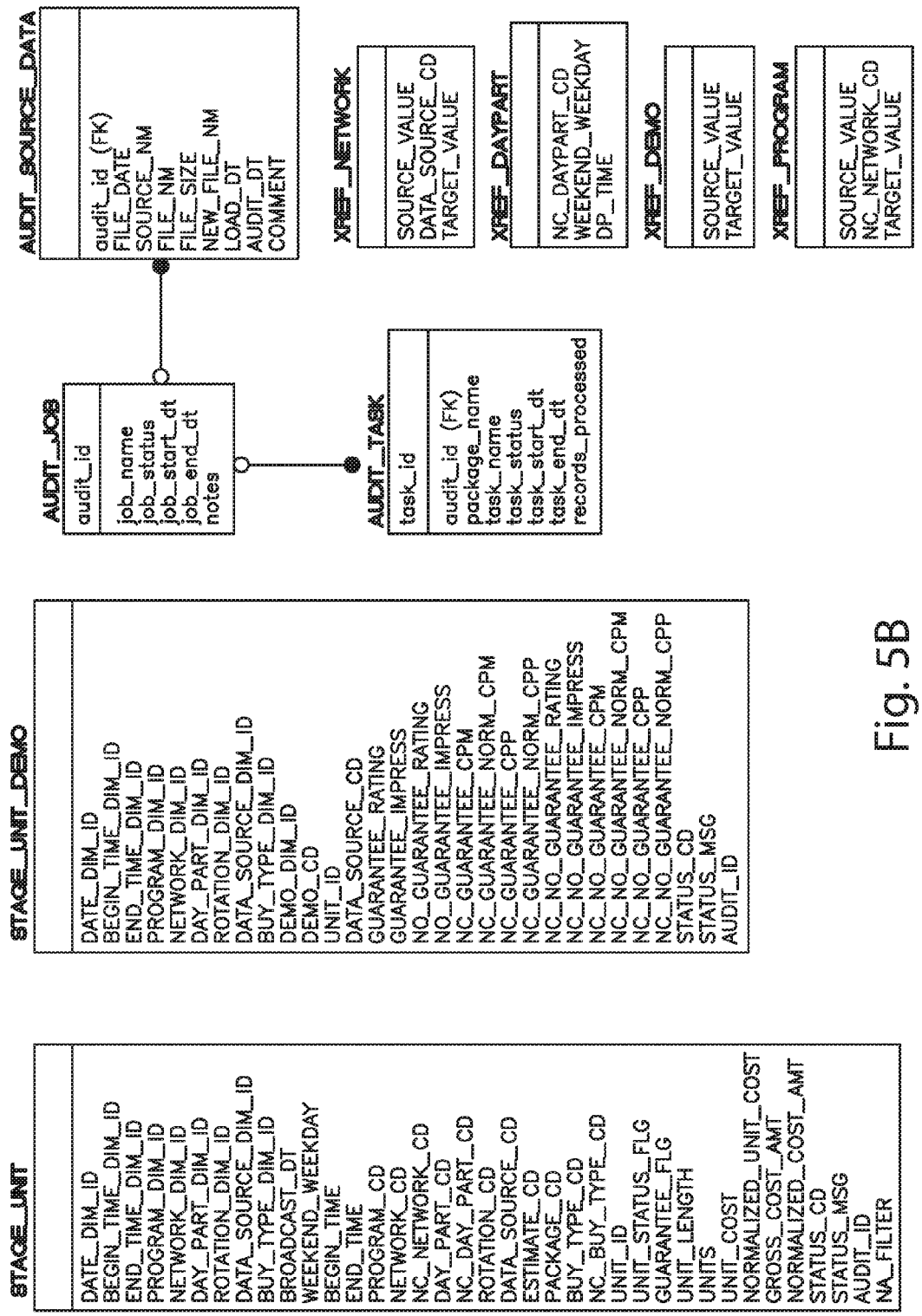
FIG. 5B is a schematic of a database according to one embodiment of the present invention.

Once this data is received by the Advertising System 300, it is translated using the Application databases to correspond to information that can be passed on to Client 102. As can be seen in FIG. 5B, the system translates or normalizes the data received from the sources into data that can be used by the Advertising System 300 and ultimately passed along to the users. The system first takes codes for the Network, Daypart, Demographic and Program and translates those codes into values that can be passed along to the user. A Unit ID is then used to identify each particular advertisement and obtain information that is needed for each report (e.g., unit length, network code, rating or impression guarantee). For example, if one set of data uses the code W18-49 to refer to women ages 18-49 and another one of the sources uses the code WM18-49 to refer to women 18-49, the Advertising System 300 is able to translate these two values and consolidate the data to be passed along to the Target databases.

In one embodiment, the following values from the Stage-Unit table in FIG. 5B are translated according to the below table.

| Column Name | Type | Table Name | Column Name | Type |
| --- | --- | --- | --- | --- |
| DATE_DIM_ID | Long Integer | => F_UNIT | DATE_DIM_ID | Long Integer |
| BEGIN_TIME_DIM_ID | Long Integer | => F_UNIT | BEGIN_TIME_DIM_ID | Long Integer |
| END_TIME_DIM_ID | Long Integer | => F_UNIT | END_TIME_DIM_ID | Long Integer |
| PROGRAM_DIM_ID | Long Integer | => F_UNIT | PROGRAM_DIM_ID | Long Integer |
| NETWORK_DIM_ID | Long Integer | => F_UNIT | NETWORK_DIM_ID | Long Integer |
| DAY_PART_DIM_ID | Long Integer | => F_UNIT | DAY_PART_DIM_ID | Long Integer |
| ROTATION_DIM_ID | Long Integer | => F_UNIT | ROTATION_DIM_ID | Text |
| DATA_SOURCE_DIM_ID | Long Integer | => F_UNIT | DATA_SOURCE_DIM_ID | Long Integer |
| BUY_TYPE_DIM_ID | Long Integer | => F_UNIT | BUY_TYPE_DIM_ID | Long Integer |
| BROADCAST_DT | Date/Time | => D_DATE | THE_DATE | Date/Time |
| WEEKEND/WEEKDAY | Text | => D_DATE | WEEKEND_WEEKDAY | Text |
| BEGIN_TIME | Date/Time | => D_TIME | THE_TIME | Date/Time |
| END_TIME | Date/Time | => D_TIME | THE_TIME | Date/Time |
| PROGRAM_CD | Text | => D_PROGRAM | PROGRAM_NM | Text |
| NETWORK_CD | Text | => D_NETWORK | NETWORK_CD | Text |
| NC_NETWORK_CD | Text | => D_NETWORK | NETWORK_CD | Text |
| DAY_PART_CD | Text | => D_DAY_PART | DAY_PART_CD | Text |
| NC_DAY_PART_CD | Text | => D_DAY_PART | DAY_PART_CD | Text |
| ROTATION_CD | Text | => D_ROTATION | ROTATION_CD | Text |
| DATA_SOURCE_CD | Text | => D_DATASOURCE | DATA_SOURCE_CD | Text |
| ESTIMATE_CD | Text | => F_UNIT | ESTIMATE_CD | Text |
| PACKAGE_CD | Text | => F_UNIT | PACKAGE_CD | Text |
| BUY_TYPE_CD | Text | => D_BUY_TYPE | BUY_TYPE_CD | Text |
| NC_BUY_TYPE_CD | Text | => F_UNIT | BUY_TYPE_CD | Text |
| UNIT_ID | Text | => F_NIT | UNIT_ID | Text |
| UNIT_STATUS_FLG | Text | => F_UNIT | UNIT_STATUS_FLG | Text |
| GUARANTEE_FLG | Text | => F_NIT | GUARANTEE_FLG | Text |
| UNIT_LENGTH | Long Integer | => F_UNIT | UNIT_LENGTH | Long Integer |
| UNITS | Long Integer | => F_NIT | UNITS | Long Integer |
| UNIT_COST | Currency | => F_UNIT | UNIT_COST | Currency |
| NORMALIZED_UNIT_COST | Currency | => F_UNIT | NORMALIZED_UNIT_COST | Currency |
| GROSS_COST_AMT | Currency | => F_UNIT | GROSS_COST_AMT | Currency |
| NORMALIZED_COST_AMT | Currency | => F_UNIT | NORMALIZED_UNIT_COST | Currency |
| STATUS_CD | Text | | | |
| STATUS_MSG | Memo | | | |
| AUDIT_ID | Long Integer | | | |
| NA_FILTER | Long Integer | | | |

Figure 5C:
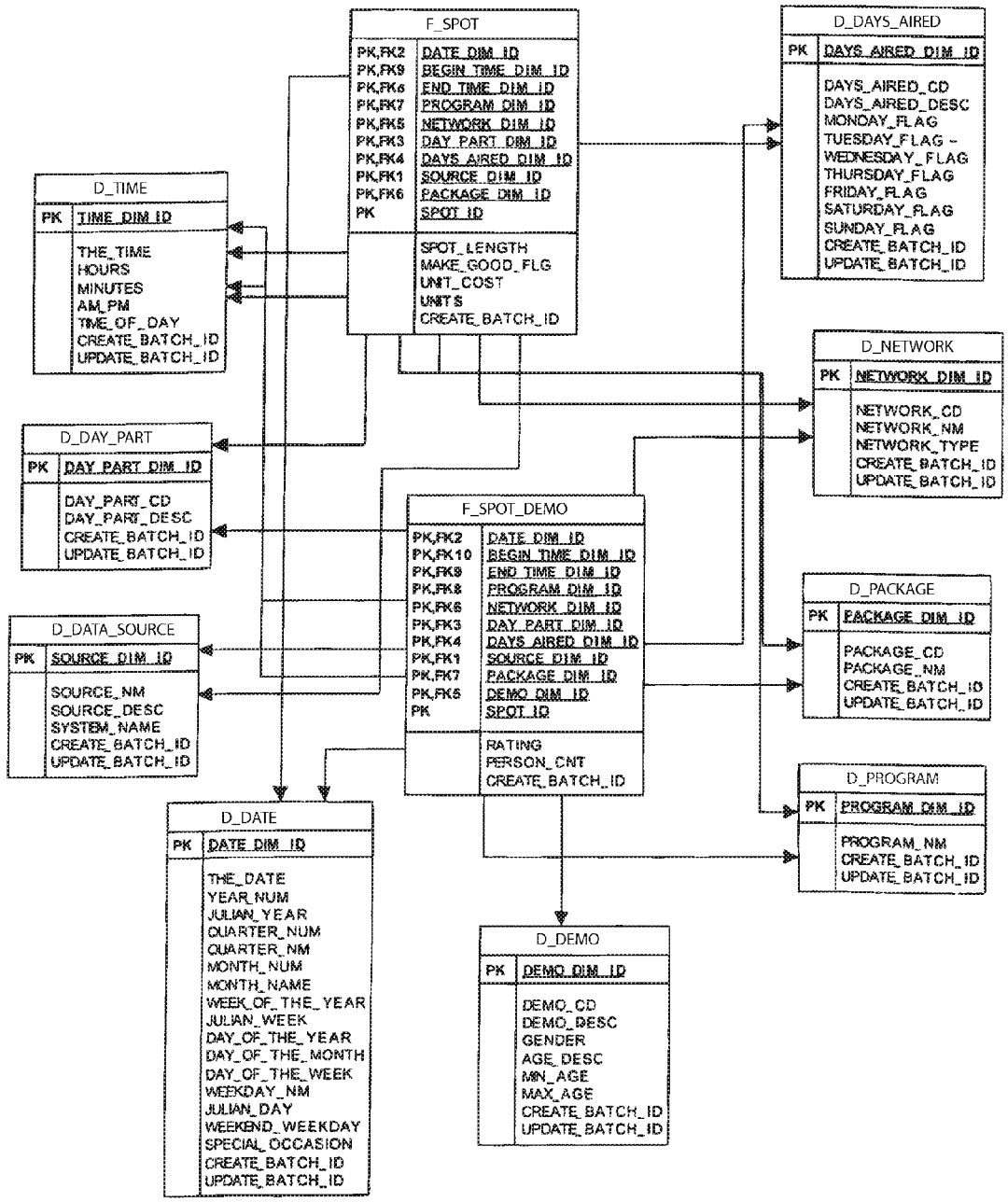
FIG. 5C is a schematic of a database according to one embodiment of the present invention.

Once the data has been translated, the Advertising System 300 passes it along to a target database, an illustrative one of which can be seen in FIG. 5C. The tables in FIG. 5C will now be explained in greater detail.

The D_Data_Source Table contains attributes associated with the source of a record. For example, in the present embodiment, the following attributes represent the described data and are of the below listed Data types:

| Attribute Name | Data Type | Description |
| --- | --- | --- |
| SOURCE_DIM_ID | INTEGER | System Generated Surrogate Data Source Key |
| SOURCE_NM | VARCHAR (35) | Source that provided the record |

-continued

| Attribute Name | Data Type | Description |
|---|---|---|
| SOURCE_DESC | VARCHAR (100) | Long description of the source of a record |
| SYSTEM_NAME | VARCHAR (35) | Source system used by company that provided the record |
| CREATE_BATCH_ID | INTEGER | ID assigned to each new record in order to identify which load batch created it. |

-continued

| Attribute Name | Data Type | Description |
|---|---|---|
| UPDATE_BATCH_ID | INTEGER | ID assigned to each record when it is updated in order to identify which load batch performed the update |

The D_Date Table contains attributes associated with the date. For example, in the present embodiment, the following attributes represent the described data and are of the below listed Data types:

| Attribute Name | Data Type | Description |
|---|---|---|
| DATE_DIM_ID | INTEGER | System Generated Surrogate Date Key |
| THE_DATE | DATETIME | Full Date Value (Jan. 01, 2002) |
| YEAR_NUM | INTEGER | Year Number |
| JULIAN_YEAR | INTEGER | Julian Year Number |
| QUARTER_NUM | INTEGER | Calendar Quarter Number |
| QUARTER_NM | VARCHAR (25) | Calendar Quarter Description |
| MONTH_NUM | INTEGER | Month Number |
| MONTH_NAME | VARCHAR (15) | Name of Month |
| WEEK_OF_THE_YEAR | INTEGER | Week of the Year |
| JULIAN_WEEK | INTEGER | Julian Week Number |
| DAY_OF_THE_YEAR | INTEGER | Day of the Year Number |
| DAY_OF_THE_MONTH | INTEGER | Day of the Month Number |
| DAY_OF_THE_WEEK | INTEGER | Day of the Week Number |
| WEEKDAY_NM | VARCHAR (9) | Date Name |
| JULIAN_DAY | INTEGER | Julian Date Number |
| WEEKEND_WEEKDAY | VARCHAR (12) | Weekday or Weekend Identifier |
| SPECIAL_OCCASION | VARCHAR (50) | Special occasion value |
| CREATE_BATCH_ID | INTEGER | ID assigned to each new record in order to identify which load batch created it. |
| UPDATE_BATCH_ID | INTERGER | ID assigned to each record when it is updated in order to identify which load batch performed the update |

The D_Daypart Table contains the attributes associated with a specific daypart. For example in the present embodiment, the following attributes represent the described data and are of the below listed Data types:

| Attribute Name | Data Type | Description |
|---|---|---|
| DAY_PART_DIM_ID | INTEGER | System Generated Surrogate Daypart Key |
| DAY_PART_CD | VARCHAR (10) | Short hand code representing a daypart |
| DAY_PART_DESC | VARCHAR (50) | Long description for a daypart |
| CREATE_BATCH_ID | INTEGER | ID assigned to each new record in order to identify which load batch created it |
| UPDATE_BATCH_ID | INTEGER | ID assigned to each record when it is updated in order to identify which load batch performed the update |

The D_Days_Aired Table contains attributes associated with the Days that a unit is aired. For example, in the present embodiment, the following attributes represent the described data and are of the below listed Data types:

| Attribute Name | Data Type | Description |
|---|---|---|
| DAYS_AIRED_DIM_ID | INTEGER | System Generated Surrogate Day Aired Key |
| DAYS_AIRED_CD | VARCHAR (25) | Short hand Code representing the days a unit can be aired |

-continued

| Attribute Name | Data Type | Description |
| --- | --- | --- |
| DAYS_AIRED_DESC | VARCHAR (100) | Long Description representing the days a unit can be aired |
| MONDAY_FLAG | INTEGER | Flag Indicating unit could be aired on Monday |
| TUESDAY_FLAG | INTEGER | Flag Indicating unit could be aired on Tuesday |
| WEDNESDAY_FLAG | INTEGER | Flag Indicating unit could be aired on Wednesday |
| THURSDAY_FLAG | INTEGER | Flag Indicating unit could be aired on Thursday |
| FRIDAY_FLAG | INTEGER | Flag Indicating unit could be aired on Friday |
| SATURDAY_FLAG | INTEGER | Flag Indicating unit could be aired on Saturday |
| SUNDAY_FLAG | INTEGER | Flag Indicating unit could be aired on Sunday |
| CREATE_BATCH_ID | INTEGER | ID assigned to each new record in order to identify which load batch created it. |
| UPDATE_BATCH_ID | INTEGER | ID assigned to each record when it is updated in order to identify which load batch performed the update |

The D_Demo Table contains attributes associated with a demographic. For example, in the present embodiment, the following attributes represent the described data and are of the below listed Data types:

| Attribute Name | Data Type | Description |
| --- | --- | --- |
| DEMO_DIM_ID | INTEGER | System Generated Surrogate Demo Key |
| DEMO_CD | VARCHAR (25) | Short hand code used to represent a demo |
| DEMO_DESC | VARCHAR (35) | Long description of a demo |
| GENDER | VARCHAR (15) | Gender represented by demo |
| AGE_DESC | VARCHAR (15) | Categorization used to group ages across demo's |
| MIN_AGE | INT ( ) | Minimum age of a demo |
| MAX_AGE | INT ( ) | Maximum age of a demo |
| CREATE_BATCH_ID | INTEGER | ID assigned to each new record in order to identify which load batch created it. |
| UPDATE_BATCH_ID | INTEGER | ID assigned to each record when it is updated in order to identify which load batch performed the update |

The D_Network Table contains attributes associated with a Network. For example, in the present embodiment, the following attributes represent the described data and are of the below listed Data types:

| Attribute Name | Data Type | Description |
| --- | --- | --- |
| NETWORK_DIM_ID | INTEGER | System Generated Surrogate Network Key |
| NETWORK_CD | VARCHAR (10) | Short hand code representing a network |
| NETWORK_NM | VARCHAR (50) | Long Description of a network |
| NETWORK_TYPE | VARCHAR (10) | Type of network (Cable, Network, etc.) |
| CREATE_BATCH_ID | INTEGER | ID assigned to each new record in order to identify which load batch created it. |
| UPDATE_BATCH_ID | INTEGER | ID assigned to each record when it is updated in order to identify which load batch performed the update |

The D_Program Table contains the attributes associated with a Program. For example, in the present embodiment, the following attributes represent the described data and are of the below listed Data types:

| Attribute Name | Data Type | Description |
| --- | --- | --- |
| PROGRAM_DIM_ID | INTEGER | System Generated Surrogate Program Key |
| PROGRAM_NM | VARCHAR (50) | Long Description of a program |

-continued

| Attribute Name | Data Type | Description |
| --- | --- | --- |
| CREATE_BATCH_ID | INTEGER | ID assigned to each new record in order to identify which load batch created it. |
| UPDATE_BATCH_ID | INTEGER | ID assigned to each record when it is updated in order to identify which load batch performed the update |

The D_Time Table contains the attributes associated with a minute of Time. For example, in the present embodiment, the following attributes represent the described data and are of the below listed Data types:

| Attribute Name | Data Type | Description |
| --- | --- | --- |
| TIME_DIM_ID | INTEGER | System Generated Surrogate Time Key |
| THE_TIME | DATETIME | Full Time Value (01:25) |
| HOURS | INTEGER | Hour value of time |
| MINUTES | INTEGER | Minute value of time |
| AM_PM | VARCHAR (2) | Indicated whether time is AM or PM |
| TIME_OF_DAY | VARCHAR (15) | Categorizes a time into a Time of Day |
| CREATE_BATCH_ID | INTEGER | ID assigned to each new record in order to identify which load batch created it. |
| UPDATE_BATCH_ID | INTEGER | ID assigned to each record when it is updated in order to identify which load batch performed the update |

The D_Day_Part Table contains attributes associated with the daypart for each record. For example, in the present embodiment, the following attributes represent the described data and are of the below listed Data types:

| Attribute Name | Data Type | Description |
| --- | --- | --- |
| DAY_PART_CD | VARCHAR (10) | Short hand code representing a daypart |
| DAY_PART_DESC | VARCHAR (50) | Long description for a daypart |
| CREATE_BATCH_ID | INTEGER | ID assigned to each new record in order to identify which load batch created it. |
| UPDATE_BATCH_ID | INTEGER | ID assigned to each record when it is updated in order to identify which load batch performed the update |

The F_Spot Table contains attributes associated with an individual advertisement For example, in the present embodiment, the following attributes represent the described data and are of the below listed Data types:

| Attribute Name | Data Type | Description |
| --- | --- | --- |
| DATE_DIM_ID | INTEGER | System Generated Surrogate Date Key |
| BEGIN_TIME_DIM_ID | INTEGER | Begin Time Dimension Identifier |
| END_TIME_DIM_ID | INTEGER | End Time Dimension Identifier |
| PROGRAM_DIM_ID | INTEGER | System Generated Surrogate Program Key |
| NETWORK_DIM_ID | INTEGER | System Generated Surrogate Network Key |
| DAY_PART_DIM_ID | INTEGER | System Generated Surrogate Daypart Key |
| DAYS_AIRED_DIM_ID | INTEGER | System Generated Surrogate Day Aired Key |
| SOURCE_DIM_ID | INTEGER | System Generated Surrogate Data Source Key |
| PACKAGE_DIM_ID | INTEGER | Package Dimension Identifier |
| SPOT_ID | INTEGER | Spot Identifier |
| SPOT_LENGTH | INTEGER | Length of a Spot |
| MAKE_GOOD_FLG | VARCHAR (3) | Spot indicator |
| UNIT_COST | CURRENCY | Unit cost amount |
| UNITS | INTEGER | Number of units |
| CREATE_BATCH_ID | INTEGER | ID assigned to each new record in order to identify which load batch created it. |

The F_Spot_Demo Table contains attributes associated with the demographics for each advertisement. For example, in the present embodiment, the following attributes represent the described data and are of the below listed Data types:

| Attribute Name | Data Type | Description |
| --- | --- | --- |
| DATE_DIM_ID | INTEGER | System Generated Surrogate Date Key |
| BEGIN_TIME_DIM_ID | INTEGER | Begin Time Dimension Identifier |
| END_TIME_DIM_ID | INTEGER | End Time Dimension Identifier |
| PROGRAM_DIM_ID | INTEGER | System Generated Surrogate Program Key |
| NETWORK_DIM_ID | INTEGER | System Generated Surrogate Network Key |
| DAY_PART_DIM_ID | INTEGER | System Generated Surrogate Daypart Key |
| DAYS_AIRED_DIM_ID | INTEGER | System Generated Surrogate Day Aired Key |
| SOURCE_DIM_ID | INTEGER | System Generated Surrogate Data Source Key |
| PACKAGE_DIM_ID | INTEGER | Package Dimension Identifier |
| DEMO_DIM_ID | INTEGER | System Generated Surrogate Demo Key |
| SPOT_ID | INTEGER | Spot Identifier |
| RATING | NUMERIC | Rating Total |
| PERSON_CNT | NUMERIC | Person Count Total |
| CREATE_BATCH_ID | INTEGER | ID assigned to each new record in order to identify which load batch created it. |

The D_Package Table contains attributes associated with a group of advertisements that were purchased together. For example, in the present embodiment, the following attributes represent the described data and are of the below listed Data types:

| Attribute Name | Data Type | Description |
| --- | --- | --- |
| PACKAGE_CD | TEXT | Unique code that groups purchase and pricing information that were purchased together |
| PACKAGE_NM | VARCHAR | Package Name |
| CREATE_BATCH_ID | INTEGER | ID assigned to each new record in order to identify which load batch created it. |
| UPDATE_BATCH_ID | INTEGER | ID assigned to each record when it is updated in order to identify which load batch performed the update |

In the present embodiment, once the data has been translated into the tables shown in FIG. 5C, the information about the advertisements can be consolidated and used in the reports that will be discussed below in FIGS. 6-11. For example, in the present embodiment, for each individual advertisement time slot, information is stored in the F_Spot_Demo table relating to that slot including information about the time and date of the advertisement, the program and network associated with the advertisement, the daypart or demographic associated with the advertisement and information about the source where the information about the advertisement initiated from. Once all this information is stored in the F-Spot_Demo table, the other tables that store information about specific times, dates, demographics, programs or sources of data can be populated accordingly. Therefore, based on the information about specific advertisements, consolidated information about numerous advertisements is generated and can be output in multiple formats to the Client 102.

Once stored, the data within the various target database tables according to one embodiment is then used to generate reports, as will now be discussed with reference to FIGS. 6-11. These reports can be divided into two broad categories. The first category being a "Market Analysis Report," which provides the Client 102 with background information about the overall market. The second category of reports is a "Program Analysis Report," which provides the Client 102 with information regarding particular programs, time periods and/or networks.

As noted above, the Clients 102 can access the Advertising System 300 of the present embodiment via a web-based portal having an interface which allows the Clients 102 to select various criteria for compiling each report. The criteria are preferably listed in drop down menus but can be selected by any other selection method that is known in the art.

Figure 6A:
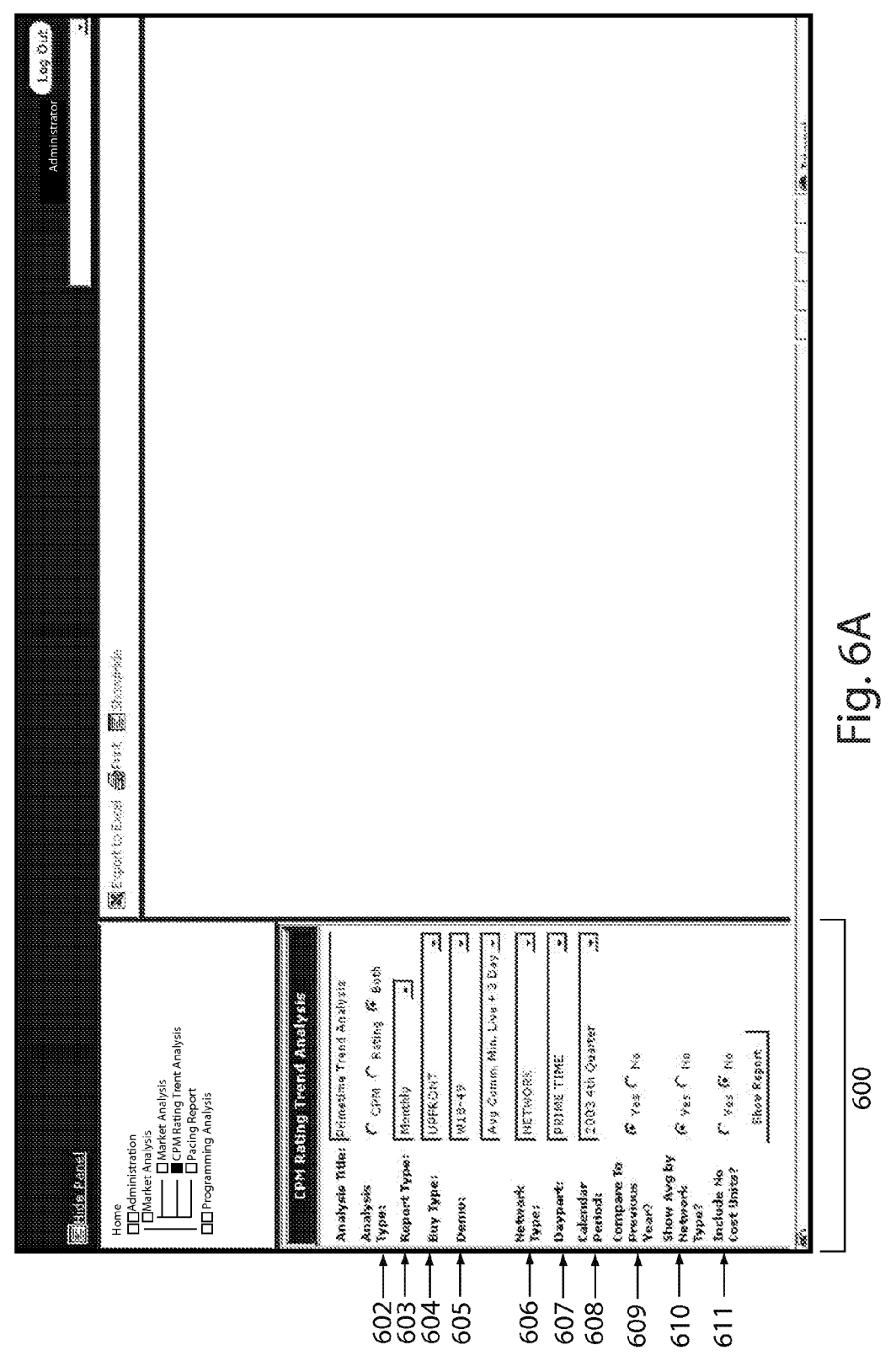

Referring now to FIG. 6A, the Market Analysis Reports will now be described. Once such report is the CPM and rating trend analysis report, which is designed to enable the client to evaluate the average cost and estimated rating level comparisons within networks for defined parts of day and in particular date ranges. Ratings can either be based on known ratings (e.g., Nielsen Ratings) or based on client provided information. As can be seen from FIG. 6A, the Client 102 can choose the analysis type from pane 600 by choosing whether to incorporate CPM, ratings, or both from analysis type field 602. The Client 102 is also able to select the report format from field 603 to determine what format the report will be in (e.g., weekly or monthly). The Client 102 can also choose in the buy type field 604 whether the information displayed in the report will include advertisements that were purchased in an upfront method, scatter method or a combination of the two. Additionally, for this report the Client 102 is also able to select the demographic they wish to analyze by selecting a demographic from "demo" field 605. For example, the demographic may include females in a particular age range or children under the age of 12. It should be appreciated that the ability to analyze data within a particular demographic is helpful to advertisers who wish to direct their advertisements towards a particular group of viewers.

The Client 102 can also choose which particular network type they wish to be included in the report from network type field 606. Network types may include, for example, TV networks, cable channels, syndications, or any combination of the above. Additionally, the Client 102 is able to pick a particular part of the day that they would like to be evaluated from daypart field 607. Part of the day may include early morning, late night, or prime time, for example. Moreover, the Client 102 has the option to choose a particular calendar period from calendar period field 608 for which they view the report. Such calendar period can be divided by year, half-year, quarter or month, for example. The Client 102 is also able to compare the data numbers to a previous year or part thereof from field 609 and can elect to have the report show an average by network type (e.g., Network, Cable, Syndication) from field 610. In one embodiment, a report can be shown in graph form by choosing "yes" from the show graph field 611.

Figure 6B:
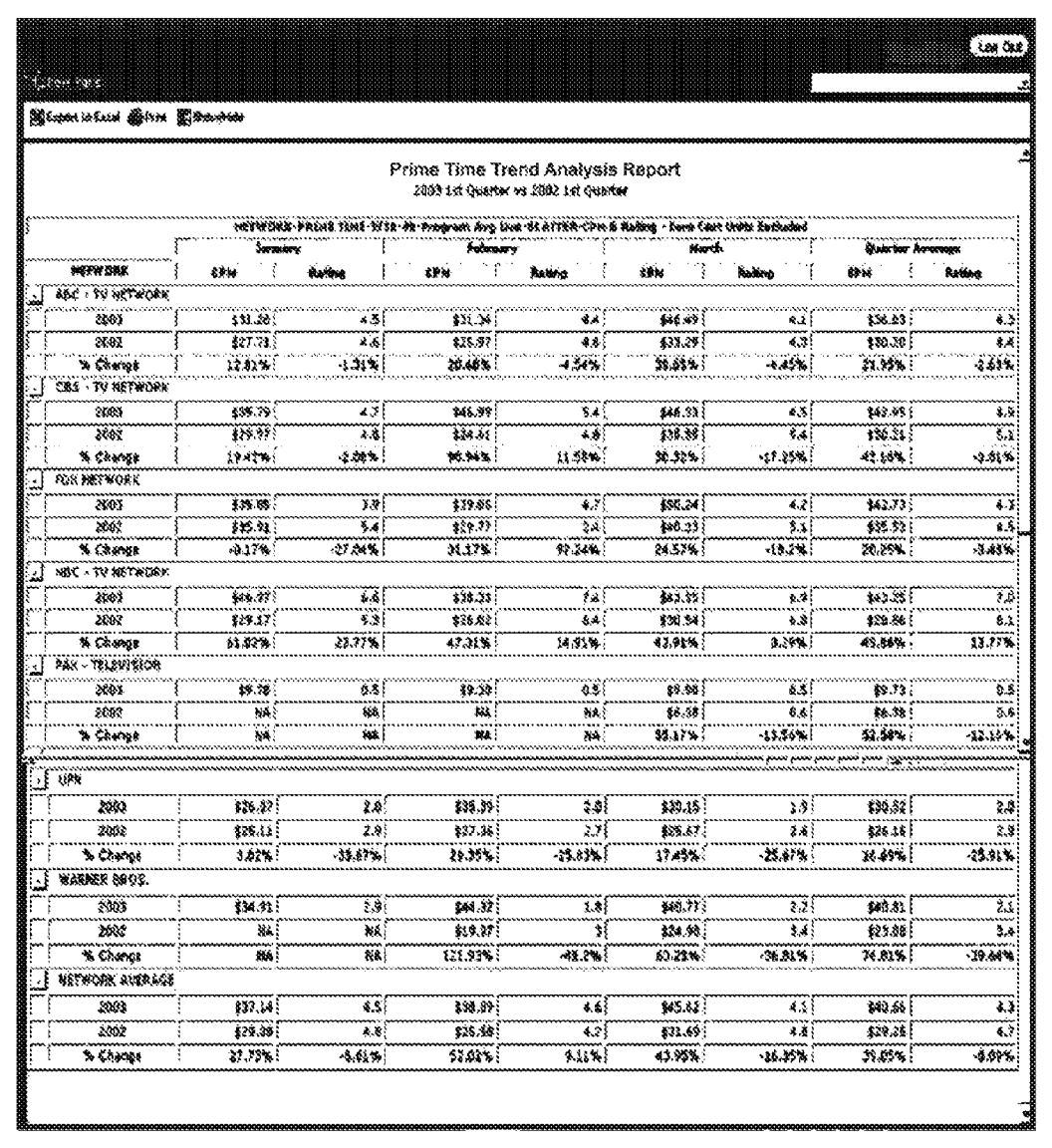

As can be seen in FIG. 6B, an illustrative CPM trend analysis report as generated in accordance with the interface shown in FIG. 6A is shown. As can be seen in FIG. 6B, the sample CPM trend analysis report shows the first quarter of 2003 versus the first quarter of 2002. Additional criteria in this report, as selected by the client, include using TV networks classified for prime time day part for women ages 18 through 49 and both the CPM and rating data is evaluated. As can further be seen in FIG. 6B, the report is further subcategorized among the TV networks (ABC, CBS and NBC, etc.) as well as an overall network average. As can be appreciated by the sample report in FIG. 6B, using this report, a Client 102 would be able to easily compare the overall data between the networks, as well as compare that data to a network averages and to individually compare each network's specific data to the previous year's data for the criteria selected.

Figure 7A:
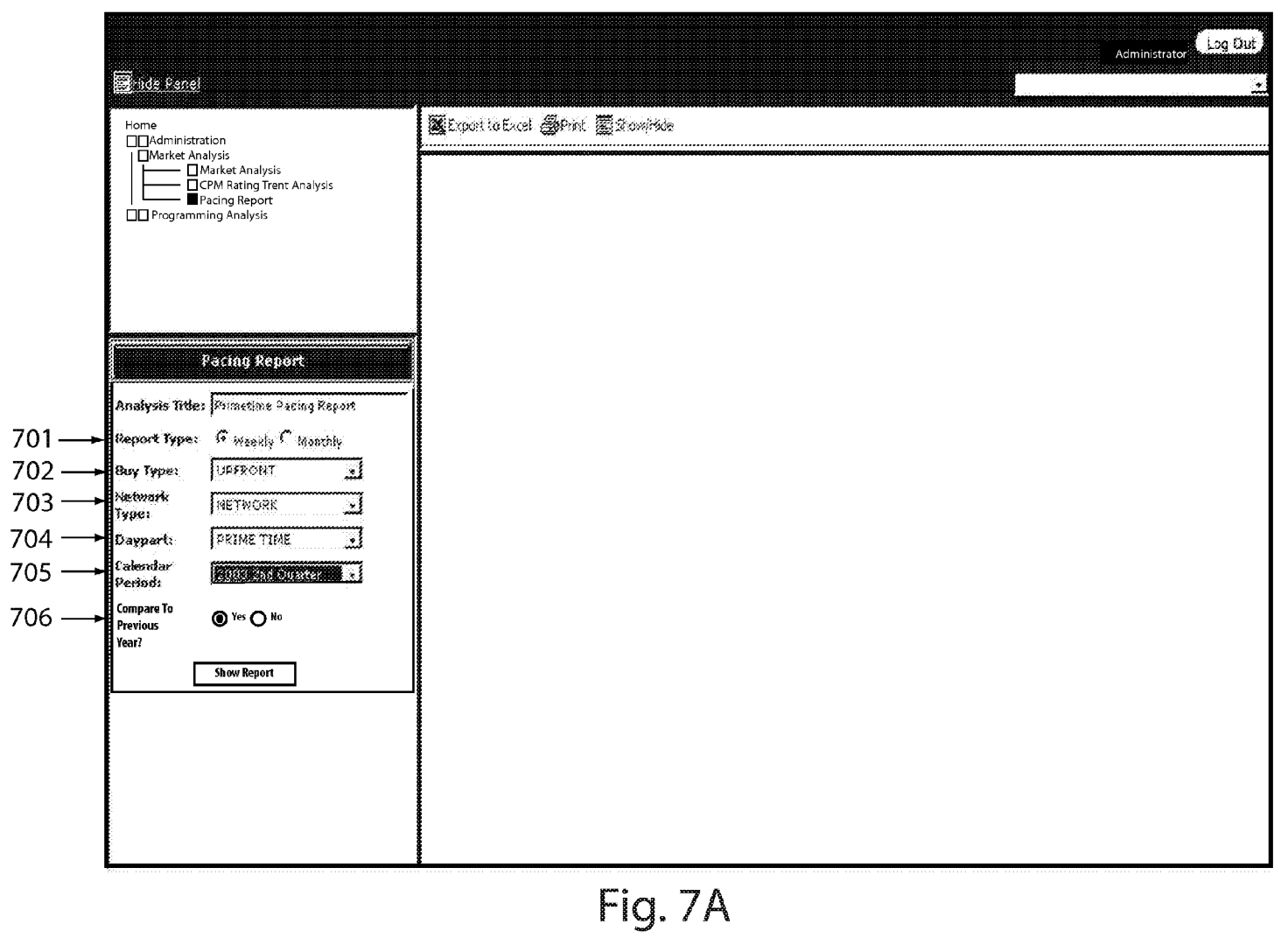

Turning now to FIG. 7A, an interface for generating a second report under the market analysis category called a pacing report will now be discussed in more detail. The pacing report provides information to Clients 102 about actual data supplied by advertisers, which allow Clients 102 to easily compare market price for a particular network for a particular period of time and compare those prices with other periods of time and/or other networks. The information for the reports are either renewed or generated based on information in the database.

Within the compilation of the pacing report, the Client 102 is given the option to choose the report type from field 701, or in other words, whether they would like to see the data in weekly or monthly format. Additionally, the Client 102 can choose the buy type, from buy type field 701 and whether they would like to see the data displayed using only upfront data, only scattered data, or a combination of both upfront and scattered transactions from field 702. Additionally, the Client 102 is allowed to select which network type they wish to evaluate from network type field 703, for example TV networks, cable channels, syndication, or any combination thereof. Client 102 can also choose the daypart that they wish to compare data from (e.g., prime time, early morning, etc.) from daypart field 704. In this embodiment, the Client 102 is also able to select the calendar period from calendar period field 705, for instance a particular year or part thereof to be displayed in their report. Lastly, the client is able to elect to compare the data to previous year's data in field 706.

Once the Client 102 has finished specifying all the particular characteristics, a pacing report will be displayed as, for example, in FIG. 7B. The sample pacing report displayed in FIG. 7B shows one example of a pacing report for the prime time daypart comparing the second quarter of 2003 versus the second quarter of 2002, and the report is displayed in a weekly basis. Additionally, this data only includes broadcasting networks and advertising time that was purchased upfront. As can further be seen in FIG. 7B, the client is able to easily compare the various networks of events (e.g., ABC, CBS, NBC, FOX, WB or UPN) and what the costs for upfront advertisements were for each of the weeks of the season. For example, as can be seen in FIG. 7B, an NBC advertisement for the fifth week of the April-May-June season for the specified criteria was $40.93 million in 2002, while it was $43.08 million in 2001. A decrease of $2.15 million, which translates into a –5.25% change. It should be appreciated that the pacing report allows clients to use actual data from other clients to get an overall feel of the market by viewing the pacing report.

Figure 8A:
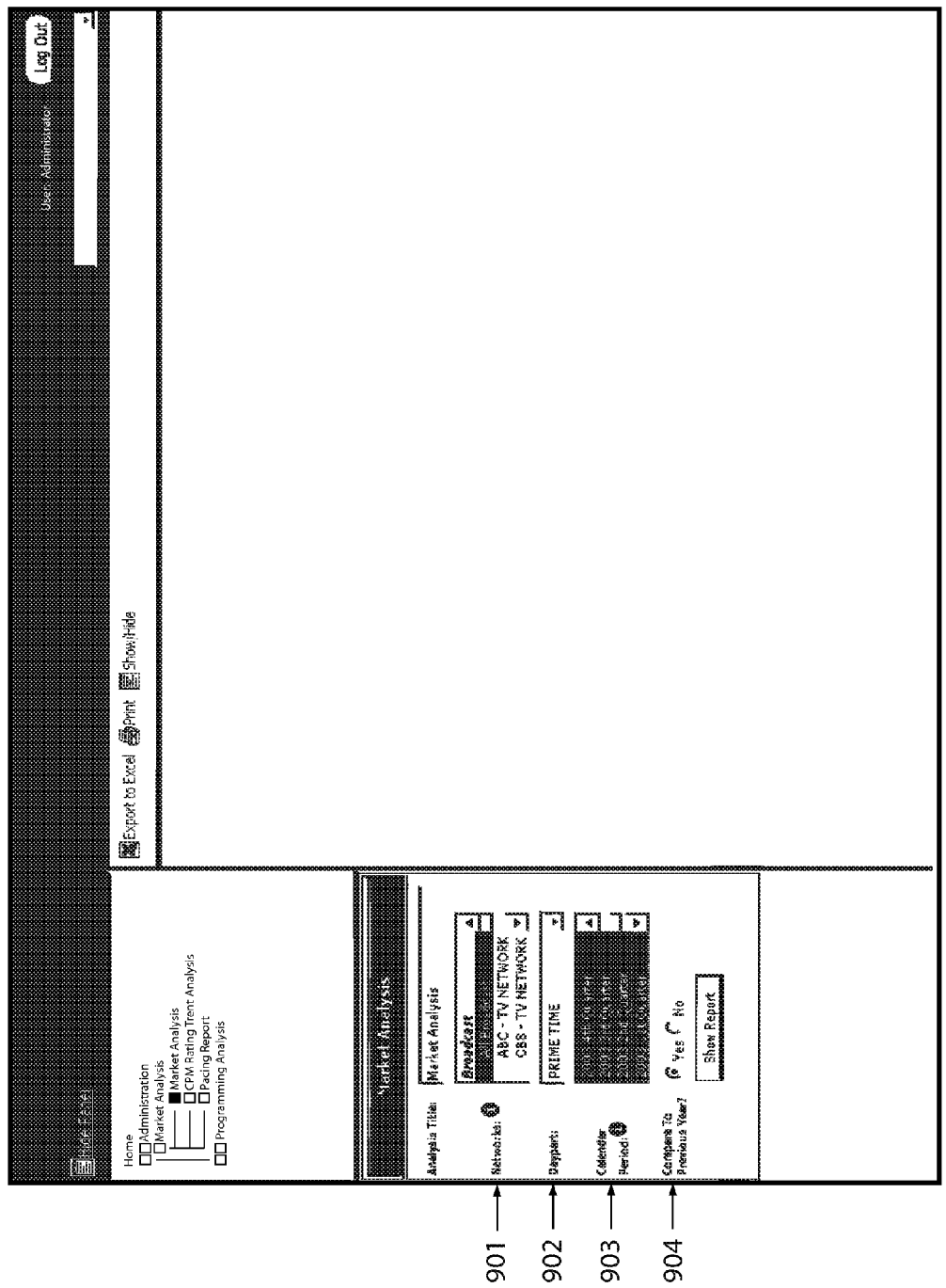
FIG. 8A is a user's display while compiling a report according to one embodiment of the present invention.

Turning now to FIG. 8A, the compilation of an additional report under the market analysis category referred to as the market analysis report will now be discussed. The market analysis report is directed to allowing a client to get a feeling of the status of the market on a weekly basis. As can be seen in FIG. 8A, Client 102s are able to choose which particular networks they wish to include in the report (e.g., ABC, CBS, NBC, etc.) from networks field 901, which part of the day they wish to analyze in their report from daypart field 902 (e.g., prime time, early morning), which particular year, or part of the year they wish to analyze from calendar period field 903, (e.g., 2003, 4th Quarter) and whether they wish the data to be compared to a previous year from field 904. In this embodiment, for example, the D. Network Table, D_Day_Part Table, D_Date Table are accessed by the Advertising System 300 and the data within those tables are used to help populate fields in the report that is generated. It shall be understood that a similar process accessing the tables shown in FIG. 5C can be used to generate a variety of reports.

Figure 8B:
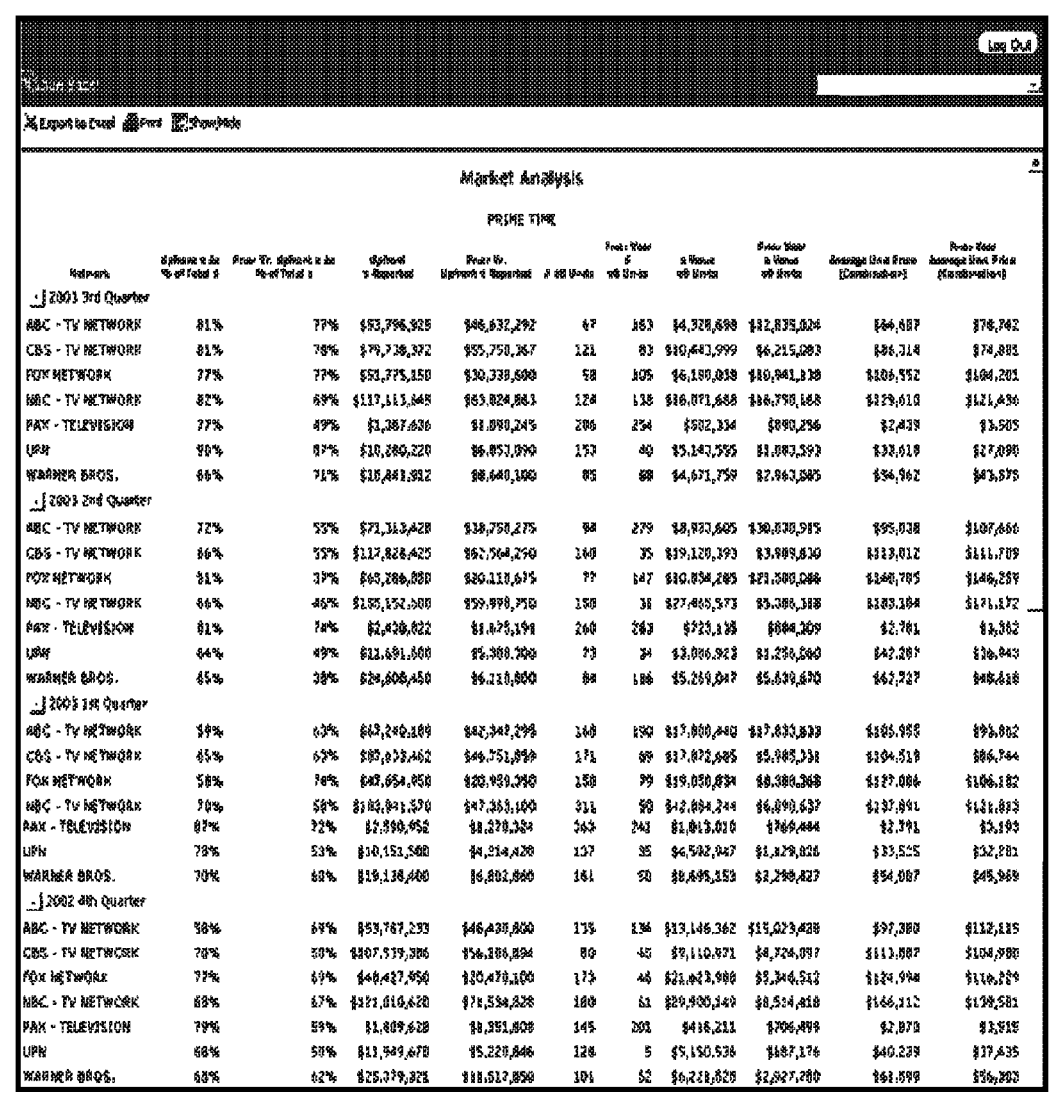

Turning now to FIG. 8B, a sample of a market analysis report generated in accordance with the embodiment of FIG. 8A is shown. This sample report compares the prime time money received upfront by each particular network for each particular time period. As can be seen from FIG. 8B, the market analysis report shows upfront sales and displays them as a percentage of the total sales. Additionally, the market analysis report displays what is referred to as $0 units. As was mentioned above, these units are the number of units that are given away by each particular network for a particular time period. For example, a network that needs to fill a spot might give away to particular advertisers a free advertisement in consideration of their past and future business arrangements. This market analysis report is able to report those free advertisements as well as compare them to other purchased advertisements. It should be appreciated that this market analysis report is a unique indicator of whether a larger amount of business is taking place in an upfront fashion or whether more people are purchasing advertisements as time goes on. This gives the client the unique perspective of whether it is wise in their particular situation to purchase advertising time well in advance of the season or whether it would be more prudent to wait and see how the market plays out before purchasing advertisements.

Figure 9A:
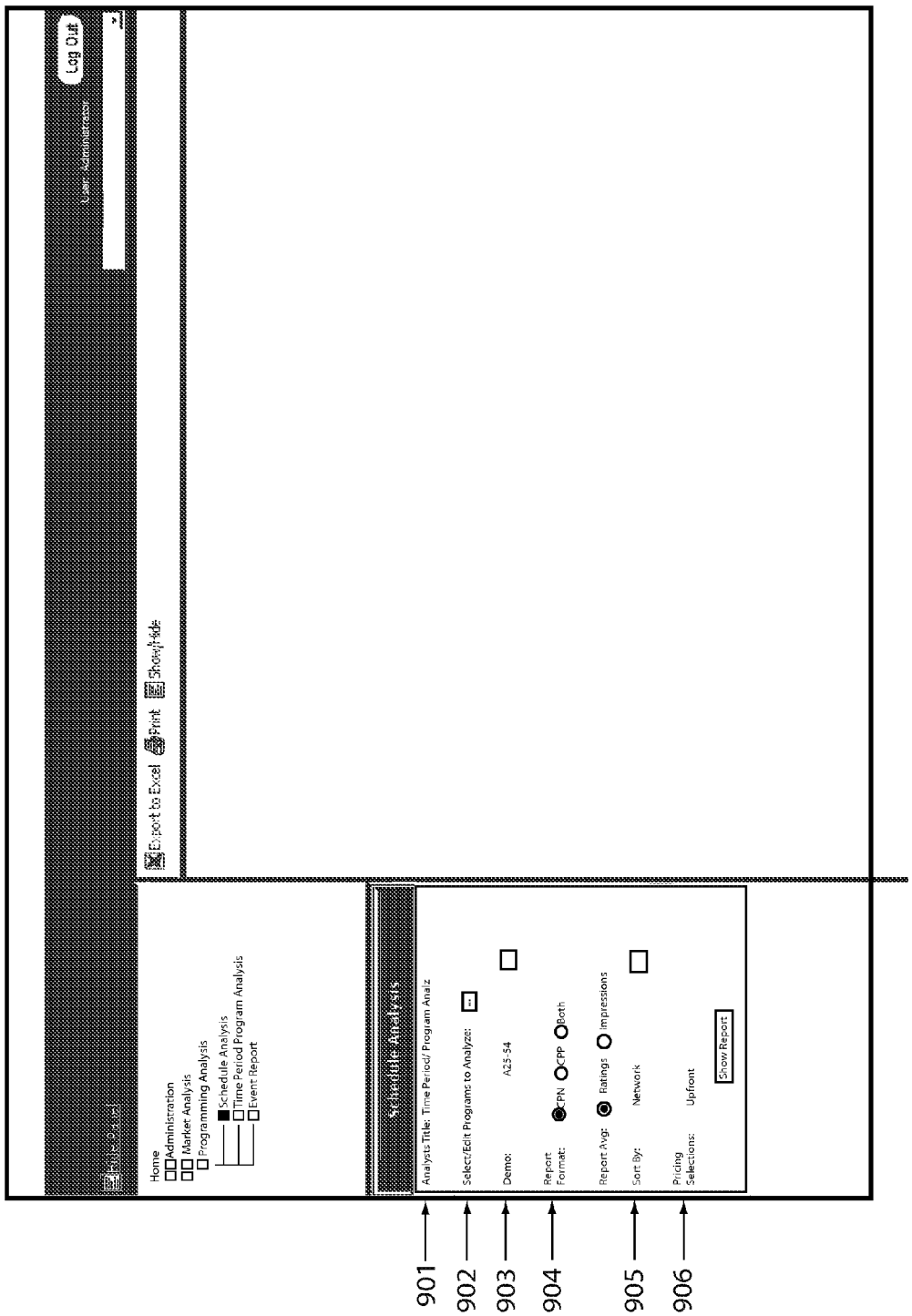
FIG. 9A is a user's display while compiling a report according to one embodiment of the present invention.

Referring now to FIGS. 9-11, the second category of reports, namely, the "Programming Analysis Reports," will now be discussed in more detail. FIG. 9A illustrates the interface for the generation of a schedule analysis report. This report allows a client to compare his or her own actual scheduling with other advertising time already purchased for that particular schedule. In this report, the Client 102 can select or edit a particular program schedule that is being used in the report by choosing the program schedule from drop down menu 901. For example, if a particular client is interested in advertising in a particular group of programs (e.g., news programs, sitcoms, movies), network and/or time, the client can choose the category of programs, network and/or time and have the schedule analysis report limited to those particular criteria. Once a client has chosen the particular program and/or group of programs that they wish to compare in the schedule analysis report, the Client 102 is also able to pick a particular demographic that they wish to target from demo field 902. As was discussed earlier, these demographics can include such criteria as age and/or gender. The Client 102 is then able to choose whether he or she wishes that the format for the report be by CPM or CPP, or both, from report format field 903. The schedule analysis report also allows the Client 102 to generate the report based on ratings or impressions, which as was discussed above is a number generated based on the ratings that represents the total number of people actually watching a particular program, by choosing the appropriate choice from field 904. The Client 102 is also given the option of sorting the report by a particular network, show, or program type from sort field 905. Additionally, the Client 102 is able to sort the pricing selection, based on purchases made upfront, scatter purchases, or a combination thereof from pricing selection field 906.

Referring now to FIG. 9B, an example of a schedule analysis report which shows market CPM for adults (i.e., men and women) ages 25 through 54 for a news program in the early evening on ABC is shown. As can be seen from FIG. 9B, data for the month of February 2003 for news programs on ABC, for the early evening, have been aggregated to show the Client 102 the market cost for particular advertisements on a 30 second cost basis. As should be appreciated, this report allows a Client 102 to determine that the market CPM for the chosen demographic for the program "World News Tonight" on Feb. 15, 2003 was $10.44 for a market rating of 3.4. Thus, the schedule analysis report allows a Client 102 to compare the price that they paid or were offered, with what other entities/Clients 102 had paid for a particular advertisement in that time slot. A Client 102 may also enter the particular cost that they have paid or have been offered and have the report compare that cost directly with the cost paid by others. As can be see in the example in FIG. 9B, if the client enters a client cost of $241,000 and the market cost is figured to be $222,406, the variance of 3.75% is displayed within the report for the client. This report would show a variance allowing the client to easily see whether they are overpaying, underpaying or paying in line with the market price.

Figure 10A:
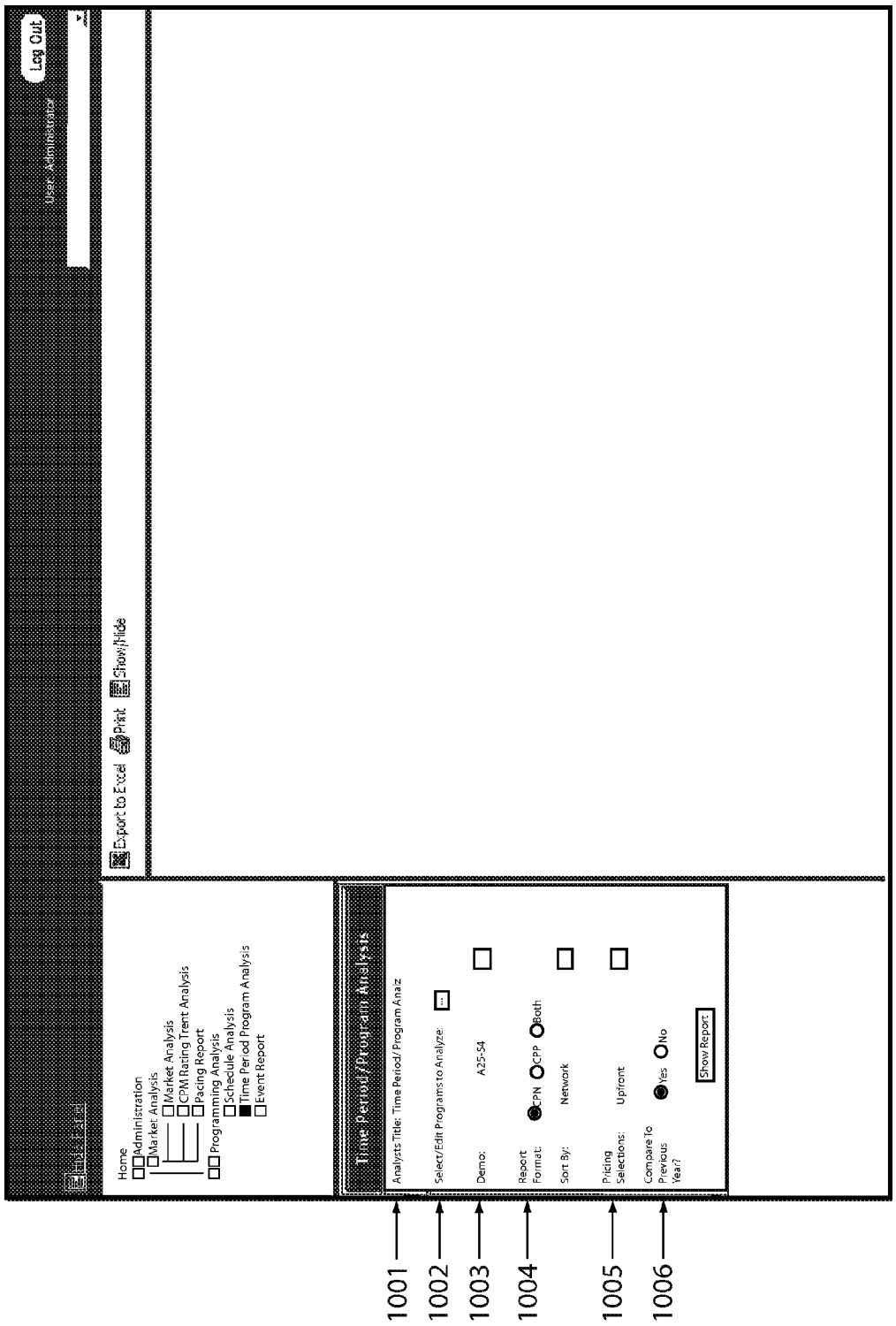
FIG. 10A is a user's display while compiling a report according to one embodiment of the present invention.

Referring now to FIG. 10A, a compilation of a time period—program analysis report is displayed. The time period—program analysis report allows the Client 102 to view the pricing for an advertisement on a particular program. As can be seen in FIG. 10A, similar to the schedule analysis report discussed above, a Client 102 is able to select or edit particular program criteria to analyze from field 1001. For example, the client may choose to analyze the program "Good Morning America," or the "Today Show." The Client 102 is also able to choose a particular demographic for the report from field 1002 and whether the report format should be classified by CPM and/or CPP, from field 1003. Additional criteria that the client may select is which networks the report should be sorted by from field 1004, which pricing selection (e.g., upfront, scatter, or both) from field 1005, and whether the data should be compared to a previous year by choosing that option from field 1006.

Figure 10B:
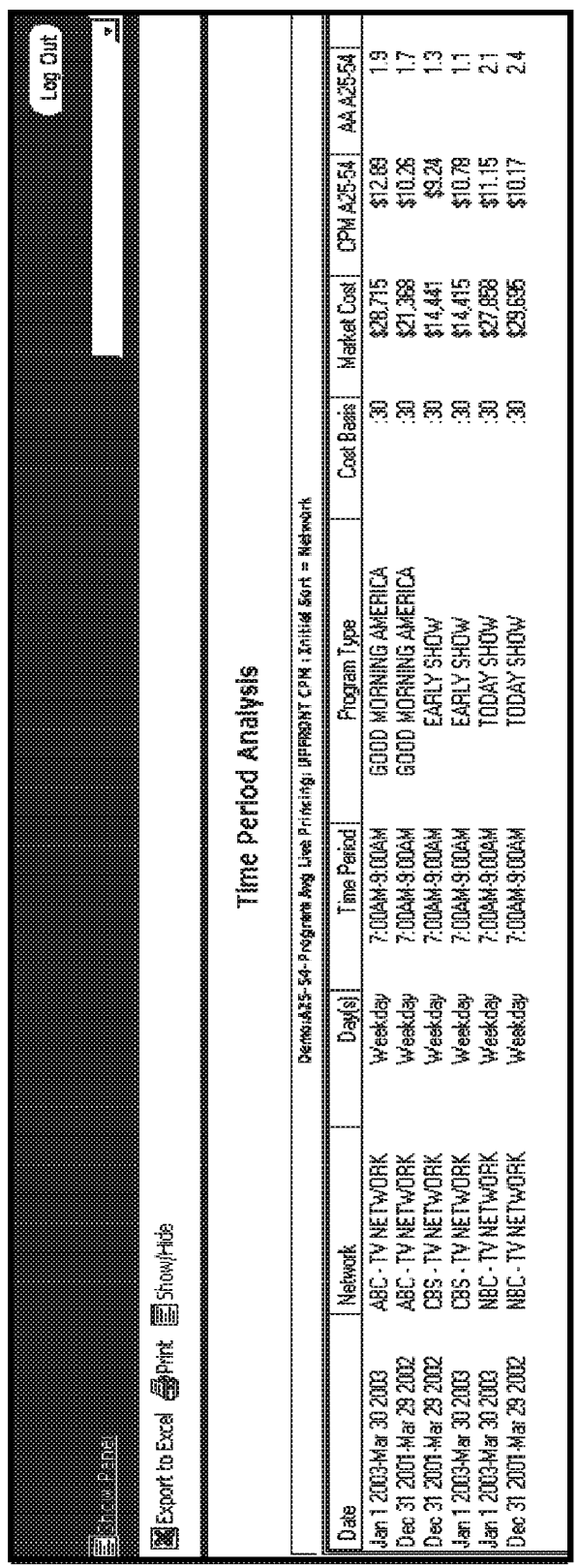
FIG. 10B is another report according to one embodiment of the present invention.

Referring now to FIG. 10B, a time period—program analysis report is shown which shows the CPM for a demographic of men and women aged 24-54 for the particular programs "Good Morning America," the "Early Show" and the "Today Show," for the particular dates chosen. Additionally, this report shows only upfront pricing and is sorted by date. As can be seen from FIG. 10B, this report allows a Client 102 to readily note that between January, 2003 and April, 2003 a 30 second advertisement spot on the "Today Show" was sold at a CPM of $12.04 for a 1.9 rating for the demographic chosen, for example. A similar 30 second spot on the "Today Show," Dec. 31, 2001 to Mar. 29, 2002 was $10.94 CPM for a 2.0 rating for the demographic chosen. It is thus clear that a Client 102 will be able to use such a report to view the price for advertising for a particular program for a particular time for a particular demographic. Thus, this report will enable the Client 102 based on particular programs to easily view advertising costs and make any necessary business decision based on those costs.

Figure 11A:
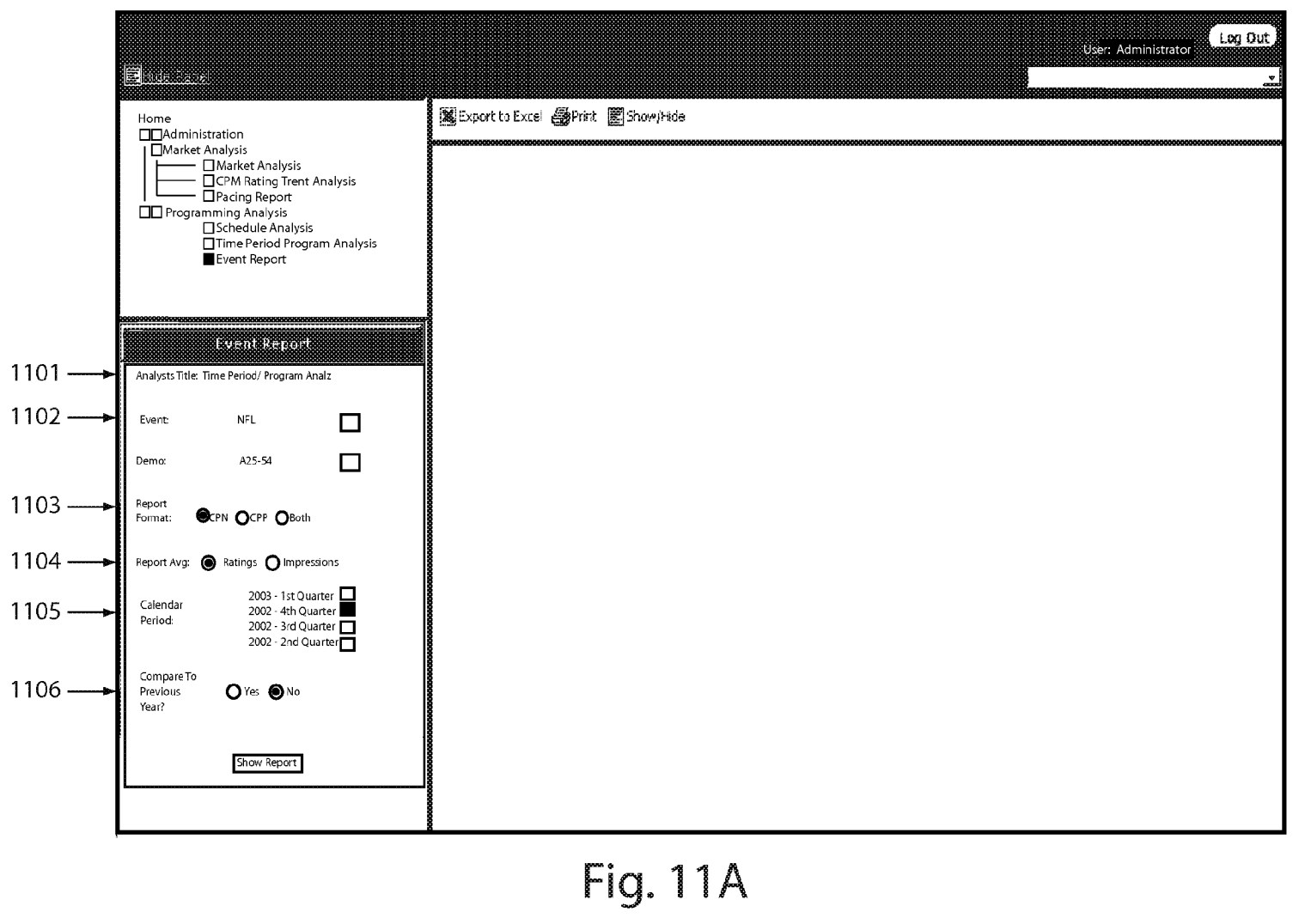

Referring now to FIG. 11A, the interface for generation of an event report is shown. The event report is designed to enable a Client 102 to easily compare program costs within certain categories and sub-categories. As can be seen in FIG. 11A, a Client 102 can choose a category of programming that they wish to evaluate (e.g., news and information, sports, or entertainment) from event field 1101. As was discussed with regard to previous reports, the Client 102 can also choose the demographic it wishes to analyze from field 1102, the format of the report they wish to analyze from field 1103 (e.g., CPMs, ratings, or both), and whether or not to base the report on CPM or Impressions from field 1104. Once again, for the event report, the Client 102 can choose a year, or part thereof, to display in the report and whether or not to compare the data in the report to a previous year from field 1106.

Referring now to FIG. 11B, an illustrative event report for NFL programming is shown. As can be seen in FIG. 9B, a report is shown for a spot on NFL football games for the fourth quarter of 2002. Additionally, ratings are shown in the particular demographic (males, 18-49) that was chosen by the client. For example, as can be seen, in the fourth quarter of 2002, the average price for an advertisement on CBS's "NFL Today" show was $70,000 for an average rating of 5.9, which resulted in an average CPM for the chosen demographic of $17.68. Additionally, as can be seen at the top half of the report, the data can be further broken down within the fourth quarter to particular dates. It should be appreciated that the event report allows Clients 102 to easily view the cost for a particular event thus allowing them to more accurately make business decisions about advertising for a particular event based on actual data.

It should also be appreciated with reference to all the above embodiments that characteristics or criteria can be added or deleted from each report to make each report more useful to an individual client. Additionally, in each of the above embodiments, the client has the ability to title the report with a particular name, thus allowing the client to easily manage various reports that he or she may be generating or requesting. Moreover, in one embodiment of the present invention, each report can easily be converted into a spreadsheet report, such as, for example, Microsoft® EXCEL. This will allow each client to easily manage the report and manipulate whatever information is generated in the report to match their particular needs.

According to one embodiment of the present invention, the Advertising System 300 is also capable of forecasting what future data will look like. For example, in addition to creating the above discussed reports based on aggregated data, the Advertising System 300 can also create reports based on forecasting or, in other words, predicting what certain ratings and/or prices will be in future time periods. These reports can be generated, for example, for a particular quarter of a particular year, or a particular demographic, or daypart. In one embodiment, to predict the future data, historical data that has been compiled and stored in the Advertising System database 301 is compared against data that is known or verified by the industry, such as, for example, Nielsen data to determine a ratio or weighting of the historical client data to the verified data. Once the known data is compared against the historical client data in the database, the data in the database is weighted to assure the accuracy of the data already in the database. It should be noted that the desire for weighting is precipitated by the fact that the data in the database is a compilation of data received from clients, and is not a truly complete reflection of the data in the entire market. As such, the known data or data which has been verified is used to help with the forecasting of future numbers. In order to properly weight the data in the Advertising System databases 301, the data in the databases is directly compared to the data for a specific time frame (e.g., a quarter). Once these numbers are compared for one or more time periods, a weighting value is assigned to that specific time period. For example, if in the first quarter of 2001, impressions noted in the historical data stored in the database 302 equaled ten while in the same quarter in the verified data, the impressions equaled one hundred, the data within the database would be weighted during three different steps. First, since the database in the example above reflects only a tenth of the known universe, to approximate the appropriate totals, all the data in the database would be multiplied by 10 (for that quarter). In the present embodiment, to further increase accuracy, different weight are assigned to each demographic and network type by quarter. Since the subsequent forecasting analyses are performed on aggregated data by demographic grouping, network type, buy type, and daypart, after weighting, in the present embodiment, a known bootstrapping procedure, which takes numerous samples of the data to create a higher level of accuracy, is utilized to obtain multiple random instances of some portion of that total (e.g., ten random samples of fifty percent of the database are drawn, which are multiplied by two to get to one hundred percent of the database upon which analyses are performed). These ten separate totals per demographic, network type, buy type and daypart (by quarter) are then entered into a series of analyses A third level of weighting is applied during the subsequent regression analyses. A final weighting factor (which can be through of as a "confidence" factor—level of confidence the aggregated client data reflects the actual market) is then assigned to each quarter's worth of data for a given demographic, network type, buy type, daypart grouping, to reflect the inverse of the initial weight used (in this example, the confidence weighting would be $\frac{1}{10}$). On the other hand, if for the second quarter of 2001, the data in the database indicated impressions of 60 and the verified data indicated impressions of 120, the data for that specific quarter would be multiplied first by two to approximate the "known" totals, then randomly sampled using a bootstrapping methodology (multiplying each random sample by the weight necessary to approximate a separate estimate of 100%), and then weighted a third time during the regression analyses with a confidence factor of $\frac{1}{2}$. Therefore, the quarter with the data that is known to be more complete and thus more accurate is given greater weight. Using this weighting system, projections and forecasts can be made using an extremely accurate estimation of how accurate/inaccurate, or complete/incomplete the data in the database is. Once this is determined, it becomes easier to more accurately predict and forecast what future numbers (e.g., prices, impressions, and/or ratings may be.

Once the database data has been weighted, a forecast is developed using seasonal factors, and external common factors, such as prime rate or consumer price index, to produce a more accurate prediction. Once weighted accordingly, forecasts can be generated for specific demographic groups (e.g., household, adults aged 18-49, women aged 18-49, children aged 12-16), network type (i.e., network, cable and syndication), buy type (e.g., upfront and scanner), and dayparts (e.g., overnight, day, prime time, weekend, day). In order to obtain proper predictions, a regression analysis using a prime rate, or consumer price index as a predictor can be run on the database data. It should be understood that additional economic indicators can be used, including, for example, housing starts and job rates. After the forecast is developed using seasonal and external economic factors, the results are reviewed for reasonableness and to view the accuracy of the prediction. If the results for a specific time frame or other criteria are too extreme (e.g., projecting negative results or changes of greater than 20 to 30 percent). The results can be recalculated using different quarters or excluding specific time frames that may be skewing the results.

Figure 12A:
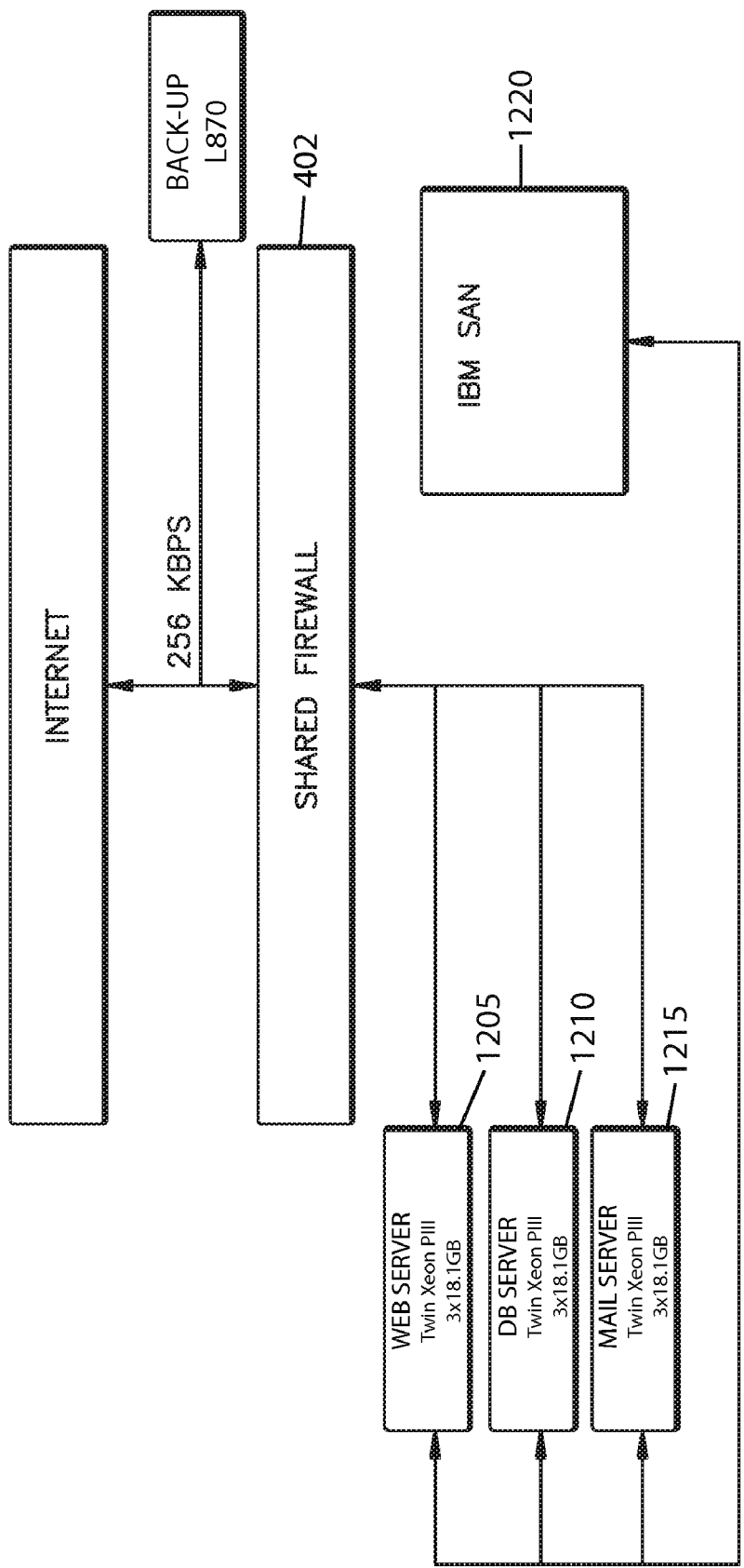
FIG. 12A is a schematic representing the architecture of one embodiment of the present invention.

One illustrative schematic of how the Advertising System 300 is set up according to one embodiment of the present invention and connects with the Internet is shown in FIG. 12A. As can be seen in FIG. 12A, the system utilizes the shared firewall 402; a Web Server 1205; a DB Server 1210 as well as a Mail Server 1215. Additionally, in one embodiment, an IBM Storage Access Network 1220 can be utilized to add additional space for the Advertising System.

Figure 12B:
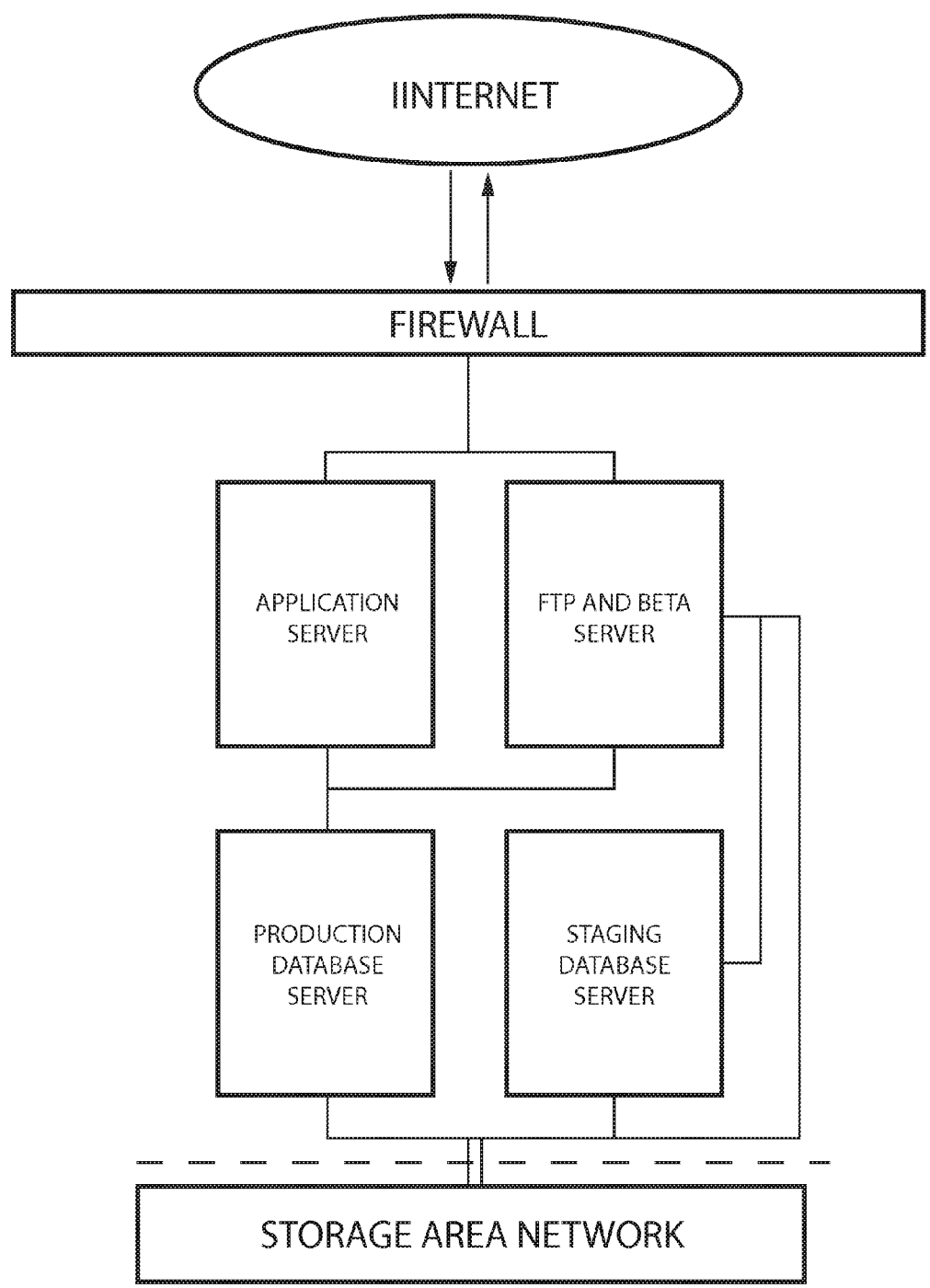
FIG. 12B is a schematic representing the architecture of one embodiment of the present invention.

An additional illustrative schematic of how Advertising System 300 is set up according to an alternative embodiment of the present invention and connects to the Internet is shown in FIG. 12B.

In one embodiment of the present invention, the Advertising System also shares data with clients in its raw form and not as an aggregated report. For example, the advertising service provider may wish to contract with other clients to share the actual data or any part of the data collected and data may be shared back with the other systems used by Clients 102 to facilitate a client's ability to perform an analysis of the data that would otherwise have to be performed directly by the Advertising System 300.

For instance if a client is using the Advertising System to compare it with individual units or prices that the client has paid and hence previously stored on their own bookkeeping system for example, the client would have to enter each unit individually that they wished to compare or use as a benchmark to the market cost into the Advertising System. As these units already exist in the Client's bookkeeping system, the Advertising System could save the client the need to enter each unit one by one by linking the compiled data to their system. The client could simply request a particular report incorporating data stored on their own system, and the Advertising System can integrate the data from the client's system into its display.

Another example of shared system information would be the creation of a file of data compiled by the Advertising System that could be created for use in a client's owned or licensed optimization system. Such client optimization systems generally use program price and rating information to select a mix of dayparts and programming to achieve target viewer reach and frequency at the lowest possible price.

Figure 13A:
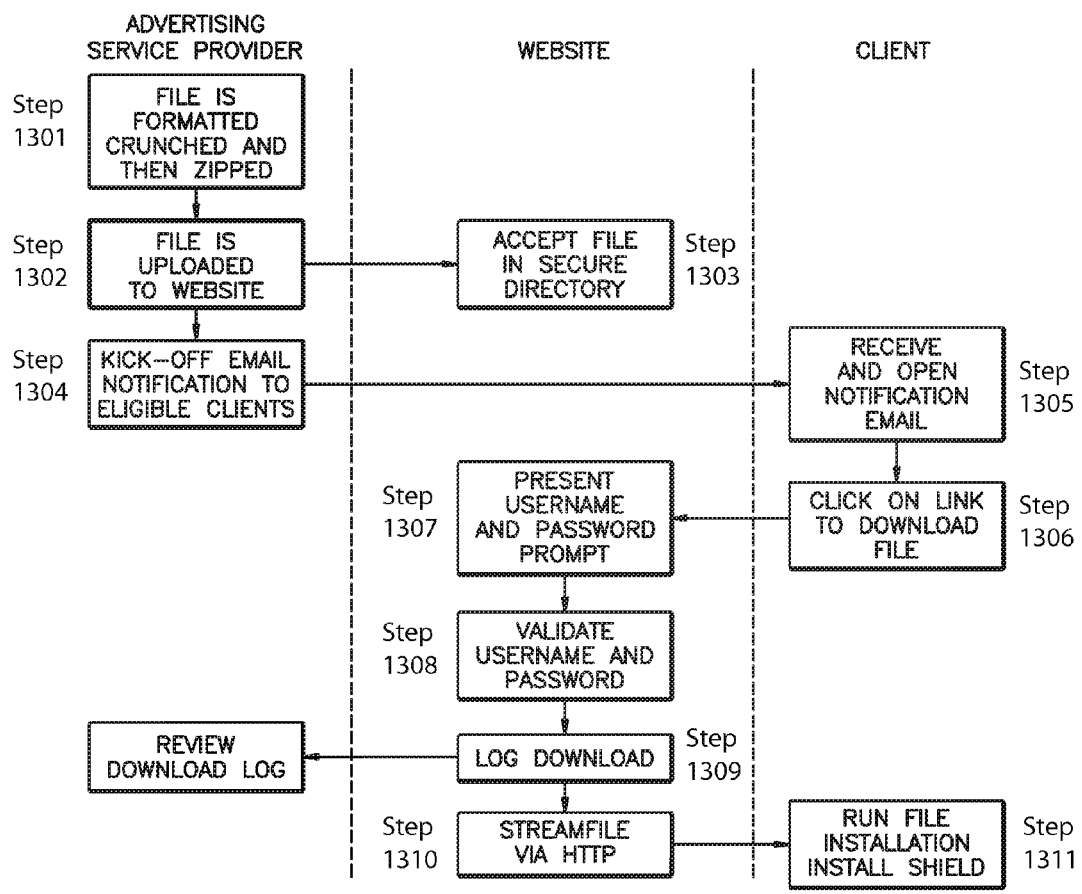
FIG. 13A is a flowchart according to one embodiment of the present invention.

In FIG. 13A, a file for optimization is created that can be compressed so that it can be transmitted to one or more clients. First the file is compressed and zipped to enable its transfer. Step 1301. The file is then uploaded and transferred to a secure FTP site for transfer to a client's optimization system Step 1302, where it is accepted by the website, Step 1303. Upon completion of the transfer, the Advertising System generates an email message with an embedded link to a designated user at the Client informing them that the file has been transferred. Step 1304. The designated user can then open the email Step 1305 and click on a link from within the email to download the file. Step 1306. The link redirects the user to a secure FTP site where they are prompted to enter a unique user name and password. Step 1307. Once the user name and password are validated, Step 1308, the Advertising System logs the download. Step 1309. Next, the file is retrieved, opened and downloaded via a streamed transmission from the FTP site to the Client's system. Step 1310. The client can then run the file on their optimization system. Step 1311. In one embodiment, the download log created in Step 1309 is reviewed by the Advertising Service Provider.

Figure 14:
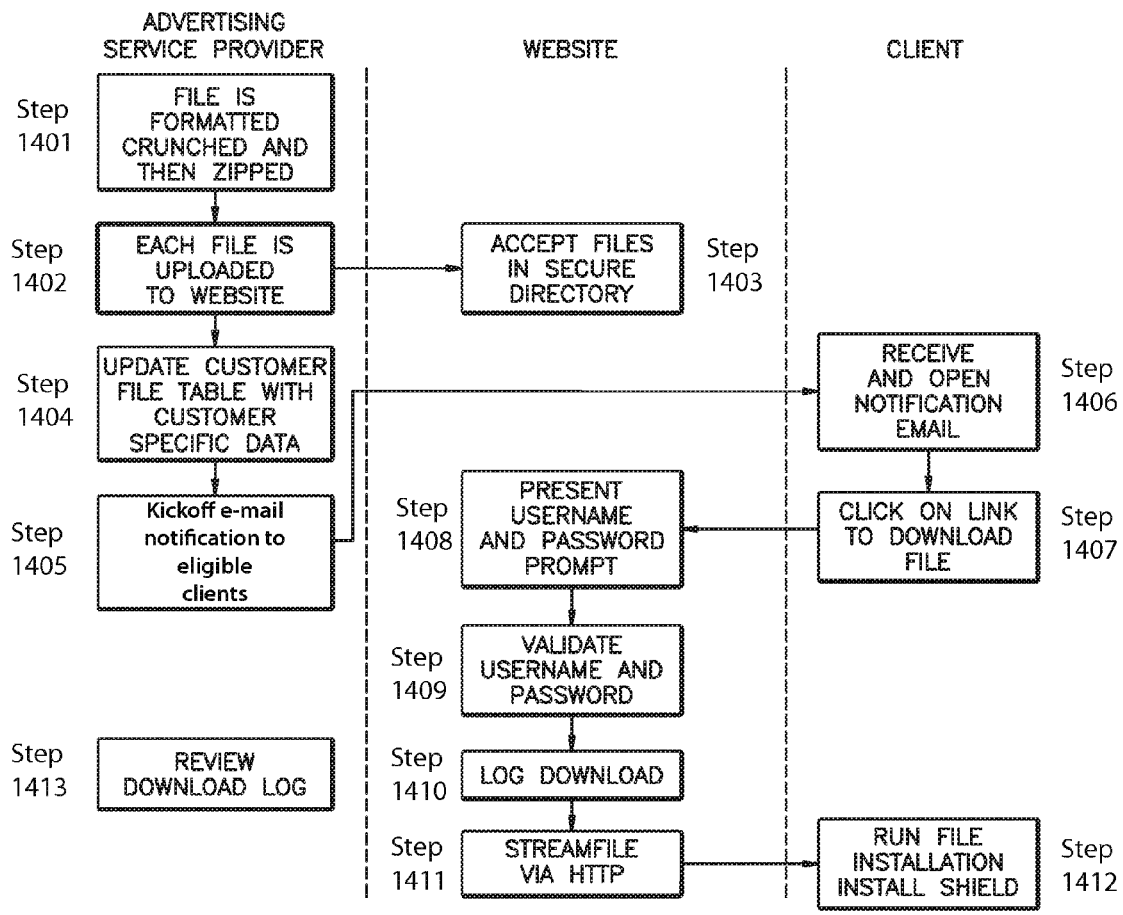
FIG. 14 is a flowchart according to one embodiment of the present invention.

FIG. 14 depicts the creation of a file to fit the format of a particular client housekeeping system (Donovan, DataTech, Encoda) for a particular Client. Similar to the method discussed above with reference to FIG. 13, the file is compressed Step 140 and transferred to a secure FTP site. Step 1402. In this embodiment, once the file has been accepted by the website Step 1403, the Advertising System updated a customer file table with data that is known about the client, so as to make sure the file is compatible with the client's system Step 1404. The Advertising System then generates an email message with an embedded link to a designated user at the Client informing them that the file has been transferred. Step 1405. Once the user has received the link Step 1406, he or she can click on the link to download the file Step 1407. The designated user is then prompted for their name and password. Step 1408. Once the user has entered their name and password, the system validates that information Step 1409 and logs the download. Step 1410. Next, the file is retrieved, opened and streamed from the FTP site to the client's system. Step 1411. The client can then run the file using their own bookkeeping program. Step 1412. According to one embodiment, once the download is completed, the Advertising System generates a log file of the download. Step 1413.

As was discussed above, the Stage, Application, and Target databases that are used to store and translate the data received by Advertising System 300 from Clients 102, can be represented in numerous different forms and formats. Different tables that are used in connection with another embodiment of the present invention for the Application and Target databases will now be discussed below.

Figure 15:
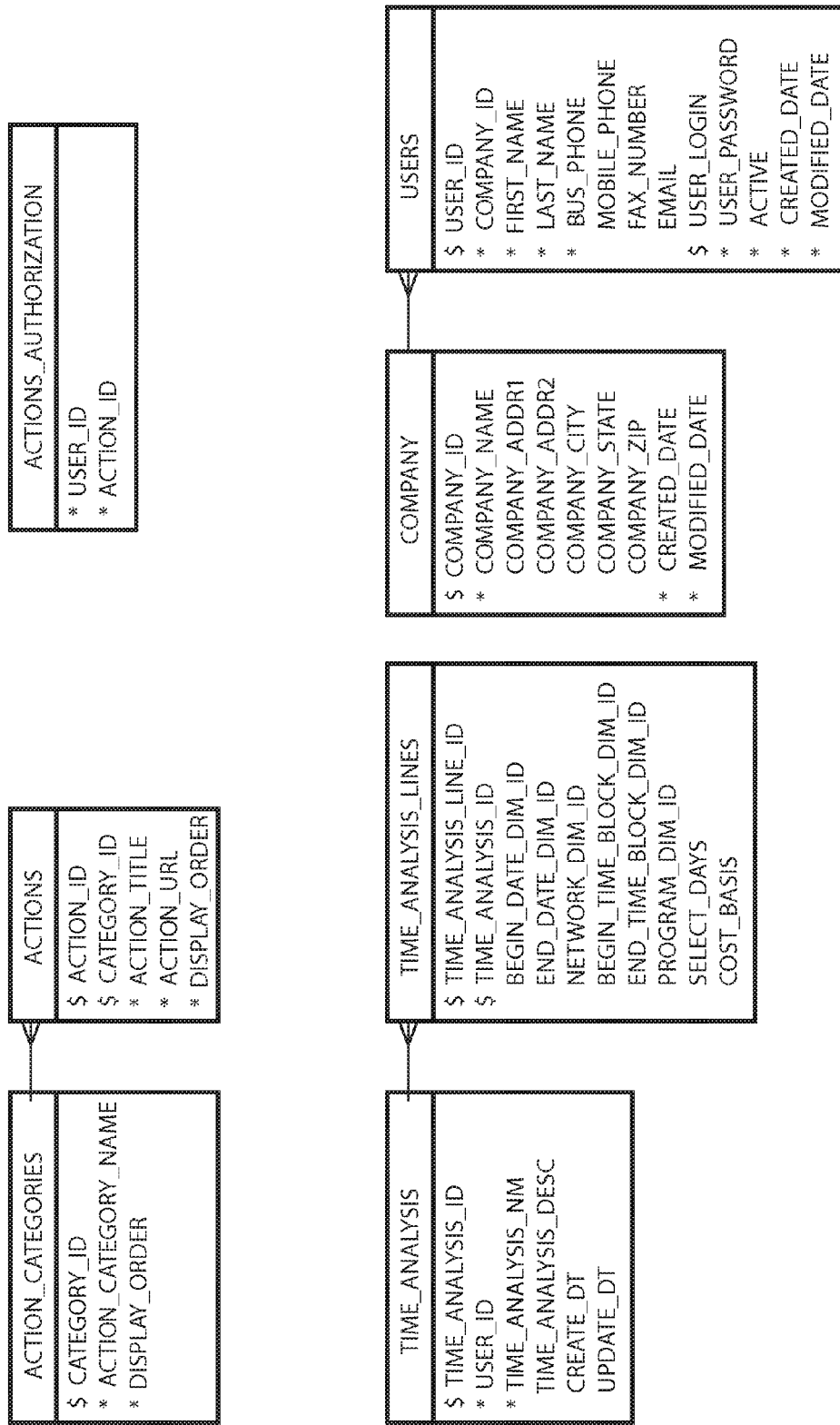
FIG. 15 is a schematic of a database according to one embodiment of the present invention.
Figure 15:
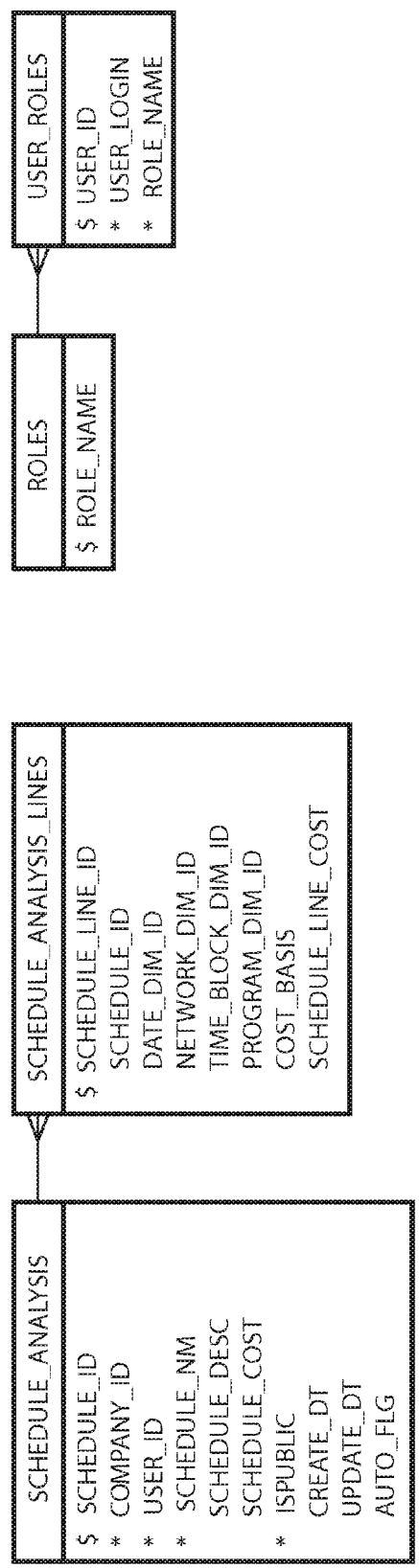

In one embodiment of the present invention as can be seen in FIG. 15 the following Application Databases can be used by the Advertising System 300. The tables in FIG. 15 will now be explained in greater detail.

The Company Table contains basic company information for Clients of the Advertising System. For example, in the present embodiment, the following attributes represent the described data and are of the below listed Data types:

| Field Name | Data Type | Description |
| --- | --- | --- |
| COMPANY_ID | INTEGER | System generated ID for company |
| COMPANY_NAME | VARCHAR (50) | Company name |
| COMPANY_ADDR1 | VARCHAR (50 | Company address |
| COMPANY_ADDR2 | VARCHAR (50 | Company address |
| COMPANY_CITY | VARCHAR (50) | Company City |
| COMPANY_STATE | VARCHAR (50 | Company State |
| COMPANY_ZIP | VARCHAR (50 | Company postal code |
| CREATED_DATE | DATETIME | Date and time record was created |
| MODIFIED_DATE | DATETIME | Date and time record was modified |

The Users Table contains basic user information for users of the system. For example, in the present embodiment, the following attributes represent the described data and are of the below listed Data types:

| Field Name | Data Type | Description |
| --- | --- | --- |
| USER_ID | INTEGER | System generated ID for the user |
| COMPANY_ID | INTEGER | ID linking user to a particular company |
| FIRST_NAME | VARCHAR (50) | User first name |
| LAST_NAME | VARCHAR (50 | User last name |
| BUS_PHONE | VARCHAR (50 | User business phone |
| MOBILE_PHONE | VARCHAR (50) | User mobile phone number |
| FAX_NUMBER | VARCHAR (50 | User fax number |
| EMAIL | VARCHAR (50 | User email address |
| USER_LOGIN | VARCHAR (50) | User login ID |
| USER_PASSWORD | VARCHAR (50) | User password |
| ACTIVE | BIT | Indicates if the user is activated in the system |
| CREATED_DATE | DATETIME | Date and time record was created |
| MODIFIED_DATE | DATETIME | Date and time record was modified |

The Role Table contains the attributes associated with a particular role (e.g., administrator, Client). A particular user may have numerous roles. t For example, in the present embodiment, the following attributes represent the described data and are of the below listed Data types:

| Field Name | Data Type | Description |
|---|---|---|
| ROLE_NAME | VARCHAR (25) | Defines a role |

The User Roles Table contains the attributes associated with a particular user and what role he or she has in the Advertising System. This information can be used for example to grant the user access in conformity with his or her allowed rights when the user logs on to the Advertising System. For example, in the present embodiment, the following attributes represent the described data and are of the below listed Data types:

| Field Name | Data Type | Description |
|---|---|---|
| USER_ID | INTEGER | User ID |
| USER_LOGIN | VARCHAR (50) | User Login |
| ROLE_NAME | VARCHAR (25) | Role the user has in the system |

The Actions_Authorization Table contains the attributes to associate a user with a particular action on the Advertising System. For example, in the present embodiment, the following attributes represent the described data and are of the below listed Data Types:

| Field Name | Data Type | Description |
|---|---|---|
| USER_ID | INTEGER | User ID |
| ACTION_ID | INTEGER | Action ID for this user |

The Action_Categories Table contains the attributes associated with a particular application category. In one embodiment these values can be manually maintained by the Advertising System operator. For example, in the present embodiment, the following attributes represent the described data and are of the below listed Data types:

| Field Name | Data Type | Description |
|---|---|---|
| CATEGORY_ID | INTEGER | System ID for category |
| ACTION_CATEGORY_NAME | VARCHAR (50) | Category title displayed to end user |
| DISPLAY_ORDER | INTEGER | Order to display |

The Actions Table contains the attributes associated with an application action. In one embodiment these values can be manually maintained by the Advertising System operator. For example, in the present embodiment, the following attributes represent the described data and are of the below listed Data types:

| Field Name | Data Type | Description |
|---|---|---|
| ACTION_ID | INTEGER | System ID for action |
| CATEGORY_ID | INTEGER | Category this action belongs to |
| ACTION_TITLE | VARCHAR (255) | Title displayed to end user |
| ACTION_URL | VARCHAR (100) | System URL for action |
| DISPLAY_ORDER | INTEGER | Order to display |

The Schedule_Analysis Table contains the attributes associated with a particular schedule. For example, in the present embodiment, the following attributes represent the described data and are of the below listed Data types:

| Field Name | Data Type | Description |
|---|---|---|
| SCHEDULE_ID | INTEGER | System generated identifier |
| COMPANY_ID | INTEGER | Company ID schedule belongs to |
| USER_ID | INTEGER | User ID schedule belongs to |
| SCHEDULE_NAME | VARCHAR (50) | Display name of schedule |
| SCHEDULE_DESC | VARCHAR (25) | Short description |
| SCHEDULE_COST | MONEY | User specified cost for this schedule |
| ISPUBLIC | CHAR (1) | Indicator flag. Specifies if it is global to company |
| CREATE_DT | DATETIME | Date schedule was created |
| UPDATE_DT | DATETIME | Date schedule was last updated |
| AUTO_FLG | INTEGER | Auto load indicator. (see comments) |

The Schedule_Analysis_Lines Table contains unit information associated with a schedule. For example, in the present embodiment, the following attributes represent the described data and are of the below listed Data types:

| Field Name | Data Type | Description |
|---|---|---|
| SCHEDULE_LINE_ID | INTEGER | System generated identifier |
| SCHEDULE_ID | INTEGER | Schedule ID |
| DATE_DIM_ID | INTEGER | Date Identifier |
| NETWORK_DIM_ID | INTEGER | Network Identifier |
| TIME_BLOCK_DIM_ID | INTEGER | Time block identifier |
| PROGRAM_DIM_ID | INTEGER | Program identifier |
| COST_BASIS | INTEGER | Cost basis |
| SCHEDULE_LINE_COST | MONEY | Cost for this unit |

The :Time_Analysis_Time Table contains the attributes associated with a time period of schedules. For example, in the present embodiment, the following attributes represent the described data and are of the below listed Data types

| Field Name | Data Type | Description |
|---|---|---|
| TIME_ANALYSIS_ID | INTEGER | System generated identifier |
| USER_ID | INTEGER | User ID schedule belongs to |
| TIME_ANALYSIS_NM | VARCHAR (50) | Display name of schedule |
| TIME_ANALYSIS_DESC | VARCHAR (25) | Short description |
| CREATE_DT | DATETIME | Date schedule was created |
| UPDATE_DT | DATETIME | Date schedule was last updated |

Lastly, The TIME_ANALYSIS_LINES Table contains unit information related to time period schedules. For example, in the present embodiment, the following attributes represent the described data and are of the below listed Data types:

| Field Name | Data Type | Description |
| --- | --- | --- |
| TIME_ANALYSIS_LINE_ID | INTEGER | System generated identifier |
| TIME_ANALYSIS_ID | INTEGER | Schedule ID |
| BEGIN_DATE_DIM_ID | INTEGER | Start date Identifier |
| END_DATE_DIM_ID | INTEGER | End date Identifier |
| NETWORK_DIM_ID | INTEGER | Network Identifier |
| BEGIN_TIME_BLOCK_DIM_ID | INTEGER | Begin Time |
| END_TIME_BLOCK_DIM_ID | INTEGER | End Time |
| PROGRAM_DIM_ID | INTEGER | Program identifier |
| SELECT_DAYS | VARCHAR (25) | Selected Days |
| COST_BASIS | INTEGER | Cost basis |

Figure 16:
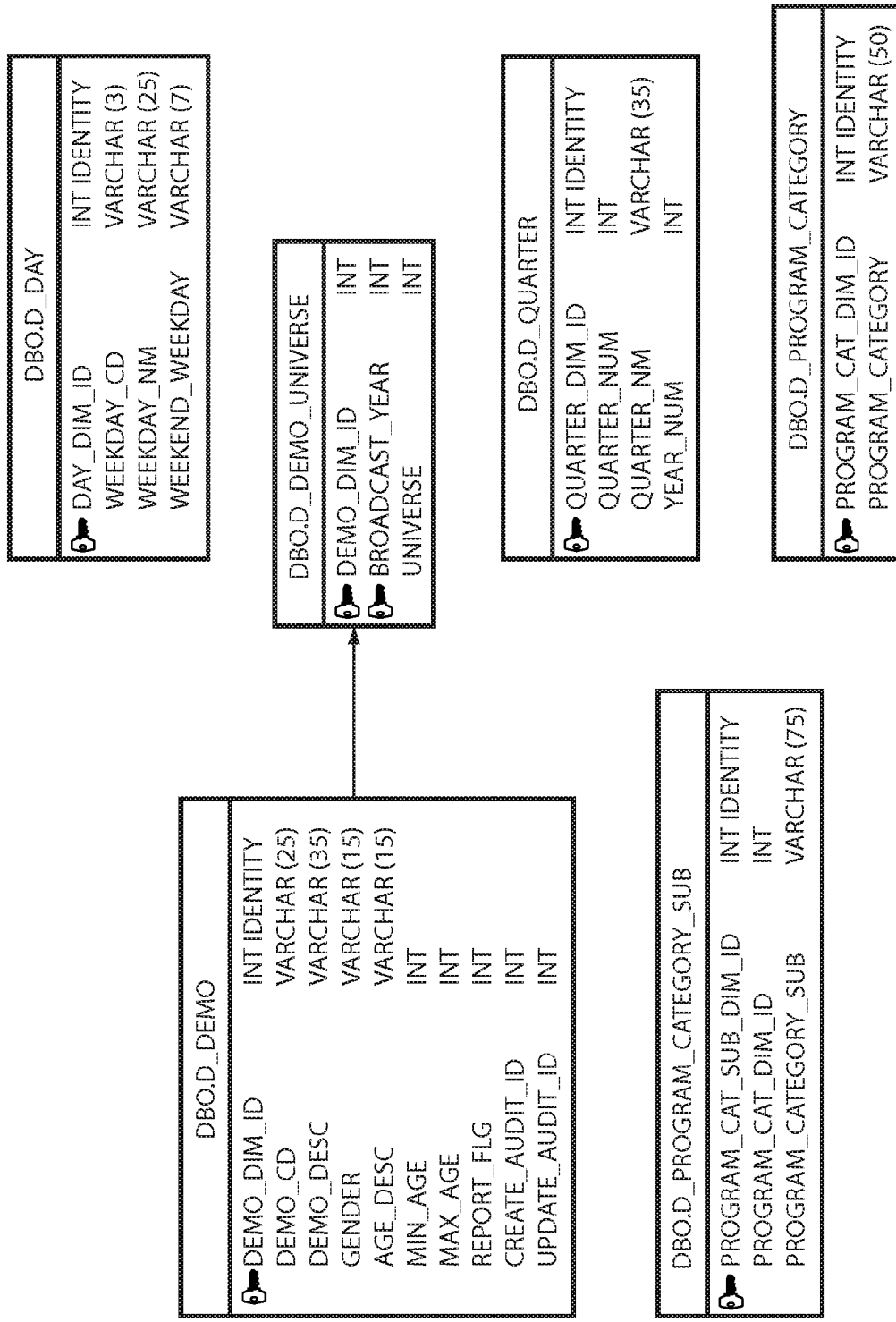
FIG. 16 is a schematic of a database according to one embodiment of the present invention.

In one embodiment of the present invention as can be seen in FIG. 16 the following Target Databases can be used by the Advertising System 300. The tables in FIG. 16 will now be explained in greater detail.

The D_BUY_TYPE Table contains the attributes associated with a particular type of Buy Unit. In one embodiment, the values in this table may be entered manually by the Advertising System operator. For example, in the present embodiment, the following attributes represent the described data and are of the below listed Data types:

| Field Name | Data Type | Description |
| --- | --- | --- |
| BUY_TYPE_DIM_ID | INTEGER | System Generated Key |
| BUY_TYPE_CD | VARCHAR (5) | Unique Buy Type Identifier |
| BUY_TYPE_NM | VARCHAR (25) | Buy Type Name |
| BUY_TYPE_DESC | VARCHAR (100) | Buy Type Descriptions |
| CREATE_AUDIT_ID | INTEGER | System Generated Create Job ID |
| UPDATE_AUDIT_ID | INTEGER | System Generated Update Job ID |

The D_DATASOURCE Table contains the attributes associated with a Client data source. In one embodiment, the values in this table can be entered manually by the Advertising System operator. For example, in the present embodiment, the following attributes represent the described data and are of the below listed Data types:

| Field Name | Data Type | Description |
| --- | --- | --- |
| DATA_SOURCE_DIM_ID | INTEGER | System Generated Key |
| COMPANY_ID | INTEGER | Advertising System Application Company Identifier |
| DATA_SOURCE_CD | VARCHAR (25) | Unique Data Source Identifier |
| DATA_SOURCE_NM | VARCHAR (50) | Data Source Name |
| SYSTEM_NM | VARCHAR (50) | Client Source System Name |
| FTP_DIR_NM | VARCHAR (50) | SQAD FTP Directory Name |
| FTP_USERNAME | VARCHAR (50) | SQAD FTP User Name |
| FTP_PASSWORD | VARCHAR (50) | SQAD FTP Password |
| TECH_CONTACT_NM | VARCHAR (50) | Client Contact Name |
| TECH_EMAIL_ADDR | VARCHAR (150) | Client Contact Email Address |
| TECH_PHONE_NUM | VARCHAR (25) | Client Contact Phone Number |
| PIPELINE_STATUS | VARCHAR (50) | Pipeline Status (Waiting, Development, Production, etc.) |
| STATUS_COMMENT | VARCHAR (500) | Pipeline Comment |

The D_DATE Table contains the attributes associated with a specific date. For example, in the present embodiment, the following attributes represent the described data and are of the below listed Data types:

| Field Name | Data Type | Description | Related Table |
| --- | --- | --- | --- |
| DATE_DIM_ID | INTEGER | System Generated Key | |
| THE_DATE | DATETIME | Unique Date Value | |
| YEAR_NUM | INTEGER | Year of Day | |
| QUARTER_NUM | INTEGER | Calendar Quarter Number | |
| QUARTER_NM | VARCHAR (25) | Calendar Quarter Name | |
| MONTH_YEAR | VARCHAR (35) | Calendar Month/Year Descriptions | |
| MONTH_NUM | INTEGER | Calendar Month Number | |
| MONTH_NM | VARCHAR (25) | Calendar Month Name | |
| WEEK_OF_YEAR | INTEGER | Calendar Week of the Year | |
| DAY_OF_YEAR | INTEGER | Calendar Day of the Year | |
| DAY_OF_MONTH | INTEGER | Calendar Day of the Month | |
| DAY_OF_THE_WEEK | INTEGER | Day of the Week | |
| DAY_DIM_ID | INTEGER | Day of the Week Dimension Identifier | D_DAY |
| WEEKDAY_NM | VARCHAR (25) | Weekday Name | |
| WEEKEND_WEEKDAY | VARCHAR (25) | Weekend Weekday Indicator | |
| SPECIAL_OCCASION | VARCHAR (100) | Used to support Special Occasion Reporting | |
| BROADCAST_YEAR | INTEGER | Broadcast Year | |
| BROADCAST_QUARTER_DIM_ID | INTEGER | Broadcast Quarter Dimension Identifier | D_QUARTER |
| BROADCAST_QTR_NUM | INTEGER | Broadcast Quarter Number | |
| BROADCAST_QTR_NM | VARCHAR (50) | Broadcast Quarter Name | |
| BROADCAST_MONTH_DIM_ID | INTEGER | Broadcast Month Dimension Identifier | D_MONTH |
| BROADCAST_MONTH_NUM | INTEGER | Broadcast Month Number | |

| Field Name | Data Type | Description | Related Table |
|---|---|---|---|
| BROADCAST_MONTH_NM | VARCHAR (50) | Broadcast Month Name | |
| BROADCAST_WEEK_DIM_ID | INTEGER | Broadcast Week Dimension Identifier | D_WEEK |
| BROADCAST_WEEK_NUM | INTEGER | Broadcast Week Number | |
| BROADCAST_SEASON | VARCHAR (25) | Broadcast Season Name | |
| BROADCAST_PRICE_GROUP | INTEGER | Broadcast Price Group Category | |
| CREATE_AUDIT_ID | INTEGER | System Generated Create Job ID | |
| UPDATE_AUDIT_ID | INTEGER | System Generated Update Job ID | |

The D_DAY Table contains the attributes associated with a specific day of the week. For example, in the present embodiment, the following attributes represent the described data and are of the below listed Data types:

| Field Name | Data Type | Description |
|---|---|---|
| DAY_DIM_ID | INTEGER | System Generated Key |
| WEEKDAY_CD | VARCHAR (3) | Weekday Unique Value |
| WEEKDAY_NM | VARCHAR (25) | Weekday Name |
| WEEKEND_WEEKDAY | VARCHAR (7) | Weekend Weekday Indicator |

The D_DAY_PART Table contains the attributes associated with a specific daypart. In one embodiment, the values in this table can be entered manually by the Advertising System operator. For example, in the present embodiment, the following attributes represent the described data and are of the below listed Data types:

| Field Name | Data Type | Description |
|---|---|---|
| DAY_PART_DIM_ID | INTEGER | System Generated Key |
| DAY_PART_CD | VARCHAR (10) | Unique Day Part Value |
| DAY_PART_DESC | VARCHAR (50) | Day Part Description |
| WEEKEND_WEEKDAY | VARCHAR (10) | Weekend Weekday Indicator |
| START_TIME | DATETIME | Day Part Start Time |
| END_TIME | DATETIME | Day Part End Time |
| CREATE_AUDIT_ID | INTEGER | System Generated Create Job ID |
| UPDATE_AUDIT_ID | INTEGER | System Generated Update Job ID |

The D_DEMO Table contains the attributes associated with a specific demographic. In one embodiment, the values in this table can be entered manually by the Advertising System operator. For example, in the present embodiment, the following attributes represent the described data and are of the below listed Data types:

| Field Name | Data Type | Description |
|---|---|---|
| DEMO_DIM_ID | INTEGER | System Generated Key |
| DEMO_CD | VARCHAR (25) | Unique Demo Value |
| DEMO_DESC | VARCHAR (35) | Demo Description |
| GENDER | VARCHAR (15) | Gender Description |
| AGE_DESC | VARCHAR (15) | Age Description |
| MIN_AGE | INTEGER | Minimum Age Value |
| MAX_AGE | INTEGER | Maximum Age Value |
| REPORT_FLG | INTEGER | Flag indicating whether demo should be viewed within the Application |
| CREATE_AUDIT_ID | INTEGER | System Generated Create Job ID |
| UPDATE_AUDIT_ID | INTEGER | System Generated Update Job ID |

The D_DEMO_UNIVERSE Table contains the attributes associated with the universe for a demographic for a specific year. In one embodiment, the values in this table can be entered manually by the Advertising System operator. For example, in the present embodiment, the following attributes represent the described data and are of the below listed Data types:

| Field Name | Data Type | Description | Related Table |
|---|---|---|---|
| DEMO_DIM_ID | INTEGER | D_DEMO System Generated Key | D_DEMO |
| BROADCAST_YEAR | INTEGER | Broadcast Year Value | |
| UNIVERSE | INTEGER | Universe Count | |

The D_MONTH Table contains the attributes associated with a broadcast month. In one embodiment, the values in this table can be entered manually by the Advertising System operator. For example, in the present embodiment, the following attributes represent the described data and are of the below listed Data types:

| Field Name | Data Type | Description | Related Table |
|---|---|---|---|
| MONTH_DIM_ID | INTEGER | System Generated Key | |
| YEAR_NUM | INTEGER | Broadcast Year | |
| MONTH_NUM | INTEGER | Month Number | |
| MONTH_NM | VARCHAR (50) | Month Name | |
| QUARTER_DIM_ID | INTEGER | Broadcast Quarter Dimension Identifier | D_QUARTER |
| QTR_NUM | INTEGER | Broadcast Quarter Number | |
| QTR_NM | VARCHAR (50) | Broadcast Quarter Name | |

The D_Network Table contains the attributes associated with a specific broadcast network. For example, in the present embodiment, the following attributes represent the described data and are of the below listed Data types:

| Field Name | Data Type | Description |
|---|---|---|
| NETWORK_DIM_ID | INTEGER | System Generated Key |
| NETWORK_CD | VARCHAR (25) | Unique Network Value |
| NETWORK_NM | VARCHAR (100) | Network Name |
| NETWORK_TYPE | VARCHAR (50) | Network Type (BROADCAST, CABLE, SYDICATION) |
| NETWORK_CATEGORY_CD | VARCHAR (15) | Network Category Name (See Larry Fried) |

-continued

| Field Name | Data Type | Description |
|---|---|---|
| NETWORK_TIER_NUM | INTEGER | Network Tier Number (See Larry Fried) |
| USERNAME | VARCHAR (50) | Application User name that created network |
| NETWORK_PARENT_NM | VARCHAR (50) | Network Parent Name |

The D_PROGRAM Table contains the attributes associated with a program. For example, in the present embodiment, the following attributes represent the described data and are of the below listed Data types:

| Field Name | Data Type | Description | Related Table |
|---|---|---|---|
| PROGRAM_DIM_ID | INTEGER | System Generated Key | |
| PROGRAM_CD | VARCHAR (50) | Unique Program Code | |
| PROGRAM_NM | VARCHAR (50) | Program Name | |
| PROGRAM_CAT_DIM_ID | INTEGER | Program Category Dimension Identifier | D_PROGRAM_CATEGORY |
| PROGRAM_CATEGORY | VARCHAR (50) | Program Category Name | |
| PROGRAM_CAT_SUB_DIM_ID | INTEGER | Program Sub Category Dim Identifier | D_PROGRAM_CATEGORY_SUB |
| PROGRAM_CATEGORY_SUB | VARCHAR (50) | Program Sub Category Name | |
| USERNAME | VARCHAR (50) | Application Username that created program | |

The D_PROGRAM_CATEGORY Table contains the attributes associated with a program category. In one embodiment, the values in this table can be entered manually by the Advertising System operator. For example, in the present embodiment, the following attributes represent the described data and are of the below listed Data types:

| Field Name | Data Type | Description |
|---|---|---|
| PROGRAM_CAT_DIM_ID | INTEGER | System Generated Key |
| PROGRAM_CATEGORY | VARCHAR (50) | Program Category Name |

The D_PROGRAM_CATEGORY_SUB Table contains the attributes associated with a program sub-category. In one embodiment, the values in this table can be entered manually by the Advertising System operator. For example, in the present embodiment, the following attributes represent the described data and are of the below listed Data types:

| Field Name | Data Type | Description | Related Table |
|---|---|---|---|
| PROGRAM_CAT_SUB_DIM_ID | INTEGER | System Generated Key | |
| PROGRAM_CAT_DIM_ID | INTEGER | Program Category Dimension Identifier | D_PROGRAM_CATEGORY |
| PROGRAM_CATEGORY_SUB | VARCHAR (75) | Program Sub Category Name | |

The D_QUARTER Table contains the attributes associated with a specific broadcast quarter. In one embodiment, the values in this table can be entered manually by the Advertising System operator. For example, in the present embodiment, the following attributes represent the described data and are of the below listed Data types:

| Field Name | Data Type | Description |
|---|---|---|
| QUARTER_DIM_ID | INTEGER | System Generated Key |
| QUARTER_NUM | INTEGER | Broadcast Quarter Number |
| QUARTER_NM | VARCHAR (35) | Broadcast Quarter Name |
| YEAR_NUM | INTEGER | Broadcast Year |

The D_ROTATION Table contains the attributes associated with a unit rotation. In one embodiment, the values in this table can be entered manually by the Advertising System operator. For example, in the present embodiment, the following attributes represent the described data and are of the below listed Data types:

| Field Name | Data Type | Description |
|---|---|---|
| ROTATION_DIM_ID | INTEGER | System Generated Key |
| ROTATION_CD | VARCHAR (25) | Unique Rotation Value |
| ROTATION_DESC | VARCHAR (100) | Rotation Description |
| MONDAY_FLAG | INTEGER | Monday Rotation Indicator Flag |
| TUESDAY_FLAG | INTEGER | Tuesday Rotation Indicator Flag |
| WEDNESDAY_FLAG | INTEGER | Wednesday Rotation Indicator Flag |
| THURSDAY_FLAG | INTEGER | Thursday Rotation Indicator Flag |
| FRIDAY_FLAG | INTEGER | Friday Rotation Indicator Flag |
| SATURDAY_FLAG | INTEGER | Saturday Rotation Indicator Flag |
| SUNDAY_FLAG | INTEGER | Sunday Rotation Indicator Flag |
| MATCH_CD | VARCHAR (25) | Match code initially used within Schedule and Time Analysis Reports |
| MATCH_VALUE | INTEGER | Match value initially used within Schedule and Time Analysis Reports |

The D_TIME Table contains the attributes associated with a specific minute in the day. In one embodiment, the values in this table can be entered manually by the Advertising System operator. For example, in the present embodiment, the following attributes represent the described data and are of the below listed Data types:

| Field Name | Data Type | Description | Related Table |
|---|---|---|---|
| TIME_DIM_ID | INTEGER | System Generated Key | |
| THE_TIME | DATETIME | Unique Date Value | |
| HOURS | INTEGER | Hour value of the time | |
| MINUTES | INTEGER | Minute value of the time | |
| AM_PM | VARCHAR (2) | AM/PM Indicator Flag | |
| TIME_OF_DAY | VARCHAR (15) | Time of Day Description | |
| DAY_PART | VARCHAR (50) | Day Part Description | |
| TIME_HOUR_DIM_ID | INTEGER | Hour Time Block Dimension Identifier | |
| TIME_HOUR_BLOCK | DATETIME | Hour Time Block Value | |
| TIME_HALF_DIM_ID | INTEGER | Half Hour Time Block Dimension Identifier | D_TIME_BLOCK |
| TIME_HALF_BLOCK | DATETIME | Half Hour Time Block Value | |
| CREATE_AUDIT_ID | INTEGER | System Generated Create Job ID | |
| UPDATE_AUDIT_ID | INTEGER | System Generated Update Job ID | |

The D_TIME_BLOCK Table contains the attributes associated with a specific time block. In one embodiment, the values in this can be entered manually by the Advertising System operator. For example, in the present embodiment, the following attributes represent the described data and are of the below listed Data types:

| Field Name | Data Type | Description |
|---|---|---|
| TIME_BLOCK_DIM_ID | INTEGER | System Generated Key |
| TIME_BLOCK | DATETIME | Time Block Name |

The :D_WEEK Table contains the attributes associated with a broadcast week. In one embodiment, the values in this table can be entered manually by the Advertising System operator. For example, in the present embodiment, the following attributes represent the described data and are of the below listed Data types

| Field Name | Data Type | Description | Related Table |
|---|---|---|---|
| WEEK_DIM_ID | INTEGER | System Generate Key | |
| WEEK_NUM | INTEGER | Broadcast Week Number | |
| WEEK_IN_QUARTER | INTEGER | Week in Quarter Number | |
| MONTH_NUM | INTEGER | Broadcast Month Number | |
| MONTH_NM | VARCHAR (50) | Broadcast Month Name | |
| QUARTER_DIM_ID | INTEGER | Broadcast Quarter Dimension Identifier | D_QUARTER |
| QUARTER_NUM | INTEGER | Broadcast Quarter Number | |
| QUARTER_NM | VARCHAR (35) | Broadcast Quarter Name | |
| YEAR_NUM | INTEGER | Broadcast Year | |

The F_CPM_TREND Table contains the attributes associated with the CPM Trend Report. For example, in the present embodiment, the following attributes represent the described data and are of the below listed Data types:

| Field Name | DataType | Description | Related Table |
|---|---|---|---|
| DATE_DIM_ID | INTEGER | Date Dimension Identifier | D_DATE |
| WEEK_DIM_ID | INTEGER | Week Dimension Identifier | D_WEEK |
| MONTH_DIM_ID | INTEGER | Month Dimension Identifier | D_MONTH |
| QUARTER_DIM_ID | INTEGER | Quarter Dimension Identifier | D_QUARTER |
| NETWORK_DIM_ID | INTEGER | Network Dimension Identifier | D_NETWORK |

-continued

| Field Name | DataType | Description | Related Table |
|---|---|---|---|
| DAY_PART_DIM_ID | INTEGER | Day Part Dimension Identifier | D_DAY_PART |
| BUY_TYPE_DIM_ID | INTEGER | Buy Type Dimension Identifier | D_BUY_TYPE |

-continued

| Field Name | DataType | Description | Related Table |
|---|---|---|---|
| AVG_COST | NUMERIC | Unit Cost Amount | |
| UNITS | NUMERIC | Unit Quantity | |

The F_DEMO_TEMP Table contains the attributes associated with the overall demographics. For example, in the present embodiment, the following attributes represent the described data and are of the below listed Data types:

| Field Name | DataType | Description | Related Table |
|---|---|---|---|
| DATE_DIM_ID | INTEGER | Date Dimension Identifier | D_DATE |
| WEEK_DIM_ID | INTEGER | Week Dimension Identifier | D_WEEK |
| MONTH_DIM_ID | INTEGER | Month Dimension Identifier | D_MONTH |
| QUARTER_DIM_ID | INTEGER | Quarter Dimension Identifier | D_QUARTER |
| NETWORK_DIM_ID | INTEGER | Network Dimension Identifier | D_NETWORK |
| PROGRAM_DIM_ID | INTEGER | Program Dimension Identifier | D_PROGRAM |
| DAY_PART_DIM_ID | INTEGER | Day Part Dimension Identifier | D_DAY_PART |
| TIME_BLOCK_DIM_ID | INTEGER | Time Block Dimension Identifier | D_TIME_BLOCK |
| DEMO_DIM_ID | INTEGER | Demo Dimension Identifier | D_DEMO |
| BLENDED_UNITS | NUMERIC | Blended Units | |
| BLENDED_RATING | NUMERIC | Blended Ratings | |
| BLENDED_IMPRESS | BIGINT | Blended Impressions | |
| GUARANTEE_UNITS | NUMERIC | Guaranteed Units | |
| GUARANTEE_RATING | NUMERIC | Guaranteed Ratings | |
| GUARANTEE_IMPRESS | BIGINT | Guaranteed Impressions | |
| NO_GUARANTEE_UNITS | NUMERIC | No Guaranteed Units | |
| NO_GUARANTEE_RATING | NUMERIC | No Guaranteed Ratings | |
| NO_GUARANTEE_IMPRESS | BIGINT | No Guaranteed Impressions | |
| ALL_SCATTER_UNITS | NUMERIC | All Scatter Units | |
| ALL_SCATTER_RATING | NUMERIC | All Scatter Ratings | |
| ALL_SCATTER_IMPRESS | BIGINT | All Scatter Impressions | |
| UNIVERSE | INTEGER | Unit Cost Amount | |
| UNITS | NUMERIC | Unit Quantity | |

The F_EVENT Table contains the attributes associated with the Event Report For example, in the present embodiment, the following attributes represent the described data and are of the below listed Data types:

| Field Name | DataType | Description | Related Table |
|---|---|---|---|
| DATE_DIM_ID | INTEGER | Date Dimension Identifier | D_DATE |
| TIME_BLOCK_DIM_ID | INTEGER | Time Block Identifier | D_TIME_BLOCK |
| QUARTER_DIM_ID | INTEGER | Quarter Dimension Identifier | D_QUARTER |
| NETWORK_DIM_ID | INTEGER | Network Dimension Identifier | D_NETWORK |
| PROGRAM_DIM_ID | INTEGER | Program Dimension Identifier | D_PROGRAM |
| COST | MONEY | Unit Cost | |
| DATA_SOURCE_CD | VARCHAR (35) | Data Source Code used for One Source Filter | |

The F_MARKET_ANALYSIS Table contains the attributes associated with the Market Analysis Report. For example, in the present embodiment, the following attributes represent the described data and are of the below listed Data types:

| Field Name | DataType | Description | Related Table |
|---|---|---|---|
| QUARTER_DIM_ID | INTEGER | Quarter Dimension Identifier | D_QUARTER |
| NETWORK_DIM_ID | INTEGER | Network Dimension Identifier | D_NETWORK |
| DAY_PART_DIM_ID | INTEGER | Day Part Dimension Identifier | D_DAY_PART |

-continued

| Field Name | DataType | Description | Related Table |
|---|---|---|---|
| BUY_TYPE_DIM_ID | INTEGER | Buy Type Dimension Identifier | D_BUY_TYPE |
| NUMBER_OF_BUYS | INTEGER | Number of Buys | |
| TOTAL_UNITS | NUMERIC | Total Units | |
| TOTAL_COST_AMT | MONEY | Total Cost | |

The F_PACING Table contains the attributes associated with the Pacing Report. In one embodiment, the values in this can be entered manually by the Advertising System operator. For example, in the present embodiment, the following attributes represent the described data and are of the below listed Data types:

| Field Name | DataType | Description | Related Table |
|---|---|---|---|
| WEEK_DIM_ID | INTEGER | Week Dimension Identifier | D_WEEK |
| BUY_TYPE_DIM_ID | INTEGER | Buy Type Dimension Identifier | D_BUY_TYPE |
| NETWORK_DIM_ID | INTEGER | Network Dimension Identifier | D_NETWORK |
| DAY_PART_DIM_ID | INTEGER | Day Part Dimension Identifier | D_DAY_PART |
| AVG_CST | MONEY | Unit Cost | |

The F_RESEARCH Table contains the attributes associated with research estimates relating to advertisements. For example, in the present embodiment, the following attributes represent the described data and are of the below listed Data types:

| Field Name | DataType | Description |
|---|---|---|
| QUARTER_DIM_ID | INTEGER | Quarter Dimension Identifier |
| NETWORK_DIM_ID | INTEGER | Network Dimension Identifier |
| PROGRAM_DIM_ID | INTEGER | Program Dimension Identifier |
| DAY_PART_DIM_ID | INTEGER | Day Part Dimension Identifier |
| DAY_DIM_ID | INTEGER | Day Dimension Identifier |
| START_TIME_DIM_ID | INTEGER | Time Dimension Identifier |
| END_TIME_DIM_ID | INTEGER | Time Dimension Identifier |
| DEMO_DIM_ID | INTEGER | Demo Dimension Identifier |
| UNIVERSE | NUMERIC | Universe Total |
| VPH | NUMERIC | VPH Total |
| IMPRESSION | NUMERIC | Impression Total |
| SHARE | NUMERIC | Share Total |
| RATING | NUMERIC | Rating Total |
| HUT | NUMERIC | HUT Total |

The F_SCHEDULE_ANALYSIS Table contains the attributes associated with the Schedule Analysis Report. In one embodiment, the values in this can be entered manually by the Advertising System operator. For example, in the present embodiment, the following attributes represent the described data and are of the below listed Data types:

| Field Name | DataType | Description | Related Table |
|---|---|---|---|
| DATE_DIM_ID | INTEGER | Date Dimension Identifier | D_DATE |

-continued

| Field Name | DataType | Description | Related Table |
|---|---|---|---|
| NETWORK_DIM_ID | INTEGER | Network Dimension Identifier | D_NETWORK |
| TIME_BLOCK_DIM_ID | INTEGER | Time Block Dimension Identifier | D_TIME_BLOCK |
| PROGRAM_DIM_ID | INTEGER | Program Dimension Identifier | D_PROGRAM |
| BUY_TYPE_DIM_ID | INTEGER | Buy Type Dimension Identifier | D_BUY_TYPE |
| DATA_SOURCE_DIM_ID | INTEGER | Data Source Dimension Identifier | D_DATA-SOURCE |
| AVG_NORMA-LIZED_COST | MONEY | Normalized Cost Amount | |
| UNITS | NUMERIC | Units | |

The F_TIME_ANALYSIS Table contains the attributes used in connection with the Time Analysis Report. For example, in the present embodiment, the following attributes represent the described data and are of the below listed Data types:

| Field Name | DataType | Description | Related Table |
|---|---|---|---|
| DATE_DIM_ID | INTEGER | Date Dimension Identifier | D_DATE |
| NETWORK_DIM_ID | INTEGER | Network Dimension Identifier | D_NETWORK |
| TIME_BLOCK_DIM_ID | INTEGER | Time Block Dimension Identifier | D_TIME_BLOCK |
| PROGRAM_DIM_ID | INTEGER | Program Dimension Identifier | D_PROGRAM |
| BUY_TYPE_DIM_ID | INTEGER | Buy Type Dimension Identifier | D_BUY_TYPE |
| DATA_SOURCE_CD | VARCHAR (50) | Data Source Code | |
| WEEKDAY_NM | VARCHAR (25) | Weekday Name | |
| WEEKEND_WEEKDAY | VARCHAR (25) | Weekend/Weekday Indicator | |
| TOTAL_UNITS | NUMERIC | Units | |
| AVG_NORMALIZED_COST | MONEY | Normalized Cost | |

The F_UNIT Table contains the attributes associated with all units send by a Client. For example, in the present embodiment, the following attributes represent the described data and are of the below listed Data types:

| Field Name | DataType | Description | Related Table |
|---|---|---|---|
| DATE_DIM_ID | INTEGER | Date Dimension Identifier | D_DATE |
| BEGIN_TIME_DIM_ID | INTEGER | Begin Time Dimension Identifier | D_TIME |
| END_TIME_DIM_ID | INTEGER | End Time Dimension Identifier | D_TIME |
| PROGRAM_DIM_ID | INTEGER | Program Dimension Identifier | D_PROGRAM |
| NETWORK_DIM_ID | INTEGER | Network Dimension Identifier | D_NETWORK |
| DAY_PART_DIM_ID | INTEGER | Day Part Dimension Identifier | D_DAY_PART |
| ROTATION_DIM_ID | VARCHAR (35) | Source Rotation Code | |
| DATA_SOURCE_DIM_ID | INTEGER | Date Source Dimension Identifier | D_DATASOURCE |
| BUY_TYPE_DIM_ID | INTEGER | Buy Type Dimension Identifier | D_BUY_TYPE |
| UNIT_ID | VARCHAR (255) | Unit Unique Identifier | |
| UNIT_STATUS_FLG | VARCHAR (10) | Unit Status Value (ESTIMATE, NOT COST) | |
| GUARANTEE_FLG | VARCHAR (3) | Indicates whether unit is guaranteed or not | |
| UNIT_LENGTH | INTEGER | Length of Unit is seconds | |
| UNITS | INTEGER | Number of units | |
| NC_UNITS | NUMERIC | | |
| UNIT_COST | MONEY | Units Cost | |
| NORMALIZED_UNIT_COST | MONEY | | |
| GROSS_COST_AMT | MONEY | | |
| NORMALIZED_COST_AMT | MONEY | | |
| NC_NORMALIZED_COST_AMT | MONEY | | |
| CREATE_AUDIT_ID | INTEGER | | |
| NORMALIZED_UNIT_CST_LOG | NUMERIC | Logarithm of Normalized Cost | |
| STD_DEV_3_FLG | BIT | Standard Deviation of NORMALIZED_UNIT_CST_LOG | |
| ESTIMATE_CD | VARCHAR (50) | Source Estimate Code | |
| PACKAGE_CD | VARCHAR (50) | Source Package Code | |
| FILE_NM | VARCHAR (100) | Source File Name | |

The F_UNIT_DEMO Table contains the attributes associated with a unit sent by a Client. For example, in the present embodiment, the following attributes represent the described data and are of the below listed Data types:

| Field Name | DataType | Description |
|---|---|---|
| DATE_DIM_ID | INTEGER | Date Dimension Identifier |
| BEGIN_TIME_DIM_ID | INTEGER | Begin Time Dimension Identifier |
| END_TIME_DIM_ID | INTEGER | End Time Dimension Identifier |
| PROGRAM_DIM_ID | INTEGER | Program Dimension Identifier |
| NETWORK_DIM_ID | INTEGER | Network Dimension Identifier |
| DAY_PART_DIM_ID | INTEGER | Day Part Dimension Identifier |
| DAYS_AIRED_DIM_ID | INTEGER | Source Rotation Code |
| DATA_SOURCE_DIM_ID | INTEGER | Data Source Dimension Identifier |
| BUY_TYPE_DIM_ID | INTEGER | Buy Type Dimension Identifier |
| DEMO_DIM_ID | INTEGER | Demo Dimension Identifier |
| UNIT_ID | VARCHAR (150) | Unit Unique Identifier |
| GUARANTEE_FLG | VARCHAR (3) | Indicates whether unit is guaranteed or not |

-continued

| Field Name | DataType | Description |
|---|---|---|
| GUARANTEE_RATING | NUMERIC | Guarantee Ratings |
| GUARANTEE_IMPRESS | BIGINT | Guarantee Impressions |
| GUARANTEE_CPM | MONEY | Guarantee CPM |
| GUARANTEE_NORM_CPM | MONEY | |
| GUARANTEE_CPP | MONEY | Guarantee CPP |
| GUARANTEE_NORM_CPP | MONEY | |
| NO_GUARANTEE_RATING | NUMERIC | Guarantee Ratings |
| NO_GUARANTEE_IMPRESS | BIGINT | Guarantee Impressions |
| NO_GUARANTEE_CPM | MONEY | Guarantee CPM |
| NO_GUARANTEE_NORM_CPM | MONEY | |
| NO_GUARANTEE_CPP | MONEY | Guarantee CPP |
| NO_GUARANTEE_NORM_CPP | MONEY | |
| CREATE_AUDIT_ID | INTEGER | System Generated Create Job ID |
| IMPRESS_LOG | NUMERIC | Logarithm of Impressions |
| STD_DEV_3_FLG | BIT | Standard Deviation of IMPRESS_LOG |

The F_UNIT_DEMO_FIX Table contains the attributes associated with a fix that had to be applied to a bad value relating to demographic data. In one embodiment, the values in this table can be entered manually by the Advertising System operator. For example, in the present embodiment, the following attributes represent the described data and are of the below listed Data types:

| Field Name | DataType | Description | Related Table |
|---|---|---|---|
| DATA_SOURCE_DIM_ID | INTEGER | Data Source Dimension Identifier | D_DATA-SOURCE |
| UNIT_ID | VARCHAR (255) | Source Unit ID | |
| DEMO_DIM_ID | VARCHAR (25) | Demo Dimension Identifier | D_DEMO |

The F_UNIT_FIX Table contains the attributes associated with a fix that had to be applied to a bad value in the data. In one embodiment, the values in this table can be entered manually by the Advertising System operator. For example, in the present embodiment, the following attributes represent the described data and are of the below listed Data types:

| Field Name | DataType | Description | Related Table |
|---|---|---|---|
| DATA_SOURCE_DIM_ID | INTEGER | Data Source Dimension Identifier | D_DATA-SOURCE |
| UNIT_ID | VARCHAR (255) | Source Unit ID | |

Those skilled in the art will recognize that the method and system of the present invention has many applications, may be implemented in many manners and as such is not to be limited to the foregoing illustrative embodiments and examples. In other words, functional elements being performed by a single or multiple components, in various combinations of hardware and software, and individual functions can be distributed among software applications at either the client or server level. In this regard, any number of the features of the different embodiments described herein may be combined into one single embodiment and alternate embodiments having fewer than or more than all of the features herein described are possible. Moreover, the scope of the present invention covers conventionally known and future developed variations and modifications to the system components described herein, as would be understood by those skilled in the art.

What is claimed is:

1. A computer implemented method of providing aggregated advertising pricing data to a plurality of remote clients for assisting the remote clients in the purchasing of advertisements, each client having a client terminal coupled to a computer network, the method comprising:

electronically receiving client advertising pricing data from at least two of the plurality of remote clients wherein the advertising pricing data comprises data related to actual purchases of advertisements from a plurality of sellers and wherein at least two of the plurality of remote clients have each purchased a comparable advertisement from a first seller;

aggregating the received client advertising pricing data to generate pricing information for the comparable advertisement, and storing the aggregated advertising pricing data in an electronic database system wherein the client advertising pricing data is not readily ascertainable from the aggregated advertising pricing data;

making the aggregated pricing data, but not the client advertising pricing data of another client, electronically available over the computer network to one or more of the plurality of clients at the client terminals; and generating customized advertising pricing reports for at least one of the plurality of remote clients to assist the remote client in the purchasing of advertisements based on the aggregated advertising pricing data;

wherein one of the plurality of remote clients makes an advertising business decision based on the customized advertising pricing reports.

2. The method of claim 1 wherein one or more of the plurality of the clients are advertisers.

3. The method of claim 1 wherein one or more of the plurality of remote clients are advertising agencies, and the client advertising pricing data includes advertising pricing data for clients of the advertising agencies.

4. The method of claim 1 further comprising:
receiving report criteria from a client; and
generating a customized report for the client based on the criteria.

5. The method of claim 4 wherein the criteria includes an indication of specific television programs and specific television networks.

6. The method of claim 4 wherein the criteria includes an indication about a specific demographic of people.

7. The method of claim 4 wherein the report includes an indication of the prices of the advertising market for a given time period.

8. The method of claim 4 wherein the report includes an indication of the prices or ratings for a given television program.

9. The method of claim 4 wherein the report displays information about ratings.

10. The method of claim 4 wherein the report displays information about a particular calendar period.

11. The method of claim 4 wherein the report compares information about two or more calendar periods.

12. The method of claim 4 wherein the report displays information for a program schedule.

13. The method of claim 4 wherein the report displays information about a particular time period of the day.

14. The method of claim 1 further comprising normalizing each individual client's client advertising pricing data prior to aggregating said individual client's client advertising pricing data.

15. The method of claim 14 wherein normalizing includes:
translating the client advertising pricing data into a common language; and
storing the translated data in the database.

16. The method of claim 1 further comprising:
providing interface to one or of the plurality of clients; and
receiving report criteria via the interface.

17. The method of claim 16 wherein the interface is part of a web portal.

18. A system for providing aggregated advertising pricing data to a plurality of remote clients for assisting the remote clients in the purchasing of advertisements, each client having a client terminal coupled to a computer network, the system comprising one or more computer servers that are configured in accordance with computer programming stored in electronic memory to:
receive advertising pricing data from at least two of the plurality of remote clients wherein the advertising pricing data comprises data related to actual purchases of advertisements from a plurality of sellers and wherein at least two of the plurality of remote clients have each purchased a comparable advertisement from a first seller;
aggregate the received client advertising pricing data to generate pricing information for the comparable advertisement, and store the aggregated pricing data in an electronic database wherein the client advertising pricing data is not readily ascertainable from the aggregated advertising pricing data;
make the aggregated data, but not the client advertising pricing data of another client, available to one or more of the plurality of clients; and
generate customized advertising pricing reports for at least one of the plurality of remote clients based on the aggregated pricing data, wherein a decision whether or not to purchase an advertisement is made by one of the plurality of remote clients based on the customized advertising pricing reports.

19. The system of claim 18 wherein the plurality of clients are advertisers.

20. The system of claim 18 wherein the clients are advertising agencies.

21. The system of claim 18 further comprising one or more servers configured to: allow the client to generate a report that includes the aggregated data.

22. The system of claim 18 wherein the report comprises data about specific television programs.

23. The system of claim 18 wherein the report comprises data about specific television networks.

24. The system of claim 18 wherein the report comprises data about a specific demographic of people.

25. The system of claim 18 further comprising one or more servers configured to normalize the advertising pricing data.

26. The system of claim 18 wherein at least one of the client terminals is electronically connected to the one or more servers using a processor.

27. The system of claim 26 wherein one or more servers is configured to electronically communicate via a network with the client's processor.

28. A computer-implemented method of forecasting advertising pricing data for a plurality of remote clients for assisting the remote clients in the purchasing of advertisements, each client having a client terminal coupled to a computer network the method comprising:
receiving first advertising pricing data from one or more of the clients wherein the first advertising pricing data comprises data related to actual purchases of advertisements from a plurality of sellers and wherein at least two of the plurality of remote clients have each purchased a comparable advertisement from a first seller;
comparing the first advertising pricing data with second advertising pricing data;
generating forecast advertising pricing data by weighting the first advertising pricing data based on the comparison; and
producing a forecasting report based on the forecast advertising pricing data;
wherein one of the plurality of remote clients utilizes the forecasting report to make an advertising business decision.

29. The method of claim 28 wherein the forecast advertising pricing data is further generated based on a prime rate.

30. The method of claim 28 wherein the forecast advertising pricing data is further generated based on a consumer price index.

31. The method of claim 28 wherein the forecast advertising pricing data is further generated based on a job rate.

* * * * *